US011832761B2

(12) United States Patent
Anthony et al.

(10) Patent No.: US 11,832,761 B2
(45) Date of Patent: Dec. 5, 2023

(54) COOKING DEVICE AND COMPONENTS THEREOF

(71) Applicant: SHARKNINJA OPERATING LLC, Needham, MA (US)

(72) Inventors: Joshua D. Anthony, Billerica, MA (US); Christopher T. Martin, Concord, MA (US); Thomas Guerin, Boston, MA (US); John M. Steinmetz, Boston, MA (US); Ethan T. Brown, Cambridge, MA (US); Chad P. Woodrow, Somerville, MA (US); Michaela Dubeau, Uxbridge, MA (US); Jennifer Kathryn Marsden, London (GB); Roger Neil Jackson, Cornwall (GB); Christina J. Crowley, London (GB); Rupert Elliston, London (GB); Andrew John Roy Tattersfield, London (GB)

(73) Assignee: SHARKNINJA OPERATING LLC, Needham, MA (US)

( * ) Notice: Subject to any disclaimer, the term of this patent is extended or adjusted under 35 U.S.C. 154(b) by 491 days.

(21) Appl. No.: 16/925,866

(22) Filed: Jul. 10, 2020

(65) Prior Publication Data
US 2020/0337497 A1 Oct. 29, 2020

Related U.S. Application Data

(63) Continuation of application No. 16/402,029, filed on May 2, 2019, now Pat. No. 11,033,146, which is a (Continued)

(51) Int. Cl.
A47J 37/06 (2006.01)

(52) U.S. Cl.
CPC ......... A47J 37/0641 (2013.01); A47J 37/067 (2013.01); A47J 37/0623 (2013.01);
(Continued)

(58) Field of Classification Search
None
See application file for complete search history.

(56) References Cited

U.S. PATENT DOCUMENTS 472,002 A 3/1892 Ross et al.
1,254,384 A 1/1918 Albro
(Continued)

FOREIGN PATENT DOCUMENTS

CN 1139304 1/1997
CN 2253170 Y 4/1997
(Continued)

OTHER PUBLICATIONS

International Search Report for International Application No. PCT/US2019/065662 filed Dec. 11, 2019; dated Mar. 25, 2020; 7 pages.
(Continued)

Primary Examiner — Joseph M. Pelham
(74) Attorney, Agent, or Firm — MINTZ LEVIN COHN FERRIS GLOVSKY AND POPEO, PC

(57) ABSTRACT

A cooking system includes a housing having a hollow interior and a container disposable within the hollow interior and including a bottom surface. The container defines a container cavity for receiving food to be cooked. A support body is positionable within the hollow interior to support food. The support body is disposable within the container cavity. The container cavity includes a clearance area between a bottom of the support body and the bottom surface of the container. A heating element operably coupled to the support body.

13 Claims, 18 Drawing Sheets

Related U.S. Application Data continuation of application No. 16/402,023, filed on May 2, 2019.

(60) Provisional application No. 62/810,249, filed on Feb. 25, 2019.

(52) U.S. Cl.
CPC ....... *A47J 37/0629* (2013.01); *A47J 37/0664* (2013.01); *A47J 37/0676* (2013.01); *A47J 2202/00* (2013.01)

(56) References Cited

U.S. PATENT DOCUMENTS

| | | |
|---|---|---|
| 2,055,972 A | 9/1934 | Fritsche |
| 1,986,088 A | 1/1935 | Wild |
| 2,313,968 A | 10/1937 | Reich |
| 2,378,950 A | 10/1937 | Reich |
| 2,188,757 A | 8/1938 | Moon |
| 2,253,833 A | 12/1939 | Volks |
| 2,235,911 A | 3/1941 | Wilcox |
| 2,429,282 A | 10/1947 | Ness |
| 2,430,582 A | 11/1947 | Reich |
| 2,462,287 A | 2/1949 | Richeson et al. |
| 2,622,591 A | 12/1952 | Bramberry |
| 2,952,764 A | 9/1960 | Minami |
| 3,076,405 A | 2/1963 | Lang |
| 3,122,134 A | 2/1964 | Reeves |
| 3,514,301 A | 5/1970 | Berger |
| 3,529,582 A | 9/1970 | Hurko et al. |
| 3,610,885 A | 10/1971 | Zingg |
| 3,760,156 A * | 9/1973 | Kehl .................. F24C 15/104 99/422 |
| 3,821,454 A | 6/1974 | Lobel |
| 3,828,760 A | 8/1974 | Farber et al. |
| 3,850,331 A * | 11/1974 | Oxel .................. A47J 36/066 220/744 |
| 4,071,739 A | 1/1978 | Jenn et al. |
| 4,106,486 A | 8/1978 | Lee |
| 4,148,250 A | 4/1979 | Miki et al. |
| 4,162,741 A | 7/1979 | Walker et al. |
| 4,210,072 A | 7/1980 | Pedrini |
| 4,241,288 A | 12/1980 | Aoshima et al. |
| 4,268,741 A | 5/1981 | O'Brien |
| 4,313,051 A | 1/1982 | Aoshima |
| 4,315,138 A | 2/1982 | Miwa |
| 4,374,318 A | 2/1983 | Gilliom |
| 4,374,319 A | 2/1983 | Guibert |
| 4,397,875 A | 8/1983 | Gilliom |
| 4,410,030 A | 10/1983 | Skala |
| 4,430,557 A | 2/1984 | Eichelberger et al. |
| 4,484,063 A | 11/1984 | Whittenburg et al. |
| 4,509,412 A | 4/1985 | Whittenburg et al. |
| 4,528,975 A | 7/1985 | Wang |
| 4,591,698 A | 5/1986 | Chang |
| 4,625,097 A | 11/1986 | Miwa |
| 4,670,282 A | 6/1987 | Onishi et al. |
| 4,728,762 A | 3/1988 | Roth et al. |
| 4,771,162 A | 9/1988 | Schatz |
| 4,829,158 A | 5/1989 | Burnham |
| 4,848,217 A | 7/1989 | Koziol |
| 4,889,972 A | 12/1989 | Chang |
| 4,995,313 A | 2/1991 | Delau et al. |
| 5,000,085 A | 3/1991 | Archer |
| 5,012,071 A | 4/1991 | Henke |
| 5,029,519 A | 7/1991 | Boyen |
| 5,031,519 A | 7/1991 | Toida et al. |
| 5,036,179 A | 7/1991 | Westerberg et al. |
| 5,048,400 A | 9/1991 | Ueda et al. |
| 5,067,396 A | 11/1991 | Sorensen et al. |
| 5,092,229 A | 3/1992 | Chen |
| 5,105,725 A | 4/1992 | Haglund |
| 5,205,274 A | 4/1993 | Smith et al. |
| 5,239,917 A | 8/1993 | Lutkie et al. |
| 5,251,542 A | 10/1993 | Itoh |
| 5,280,749 A | 1/1994 | Smit |
| 5,329,919 A | 7/1994 | Chang |
| 5,355,777 A | 10/1994 | Chen et al. |
| 5,355,779 A * | 10/1994 | O'Brien .................. H05B 3/72 99/446 |
| 5,416,950 A | 5/1995 | Dornbush et al. |
| 5,445,061 A | 8/1995 | Barradas |
| 5,466,912 A | 11/1995 | Dornbush et al. |
| 5,485,780 A | 1/1996 | Koether et al. |
| 5,513,558 A | 5/1996 | Erickson et al. |
| 5,526,734 A | 6/1996 | Harrison |
| 5,549,039 A | 8/1996 | Ito et al. |
| 5,567,458 A | 10/1996 | Wu |
| 5,582,094 A * | 12/1996 | Peterson ............. A47J 37/0786 99/425 |
| 5,588,352 A | 12/1996 | Harrison |
| 5,590,583 A | 1/1997 | Harrison |
| 5,615,607 A | 4/1997 | Delaquis et al. |
| 5,619,983 A | 4/1997 | Smith |
| 5,632,403 A | 5/1997 | Deng |
| 5,649,476 A | 7/1997 | Montagnino et al. |
| 5,676,044 A | 10/1997 | Lara, Jr. |
| 5,699,722 A | 12/1997 | Erickson et al. |
| 5,701,804 A | 12/1997 | Liebermann |
| 5,740,721 A | 4/1998 | Bizard et al. |
| 5,768,976 A | 6/1998 | Suk |
| 5,839,357 A | 11/1998 | Ha et al. |
| 5,896,808 A | 4/1999 | Graur |
| 5,932,130 A | 8/1999 | Taino |
| 5,967,021 A | 10/1999 | Yung |
| 5,970,858 A | 10/1999 | Boehm et al. |
| 6,006,939 A | 12/1999 | Wai |
| 6,014,986 A | 1/2000 | Baumgarten |
| 6,016,797 A | 1/2000 | Nowicke, Jr. |
| 6,019,029 A | 2/2000 | Chan |
| 6,023,050 A | 2/2000 | Violi |
| 6,060,698 A | 5/2000 | Petrides et al. |
| 6,066,837 A | 5/2000 | McCormick et al. |
| 6,067,896 A | 5/2000 | Elorza |
| 6,070,518 A | 6/2000 | Kao |
| 6,082,249 A | 7/2000 | Su |
| 6,083,543 A | 7/2000 | Kim et al. |
| 6,097,016 A | 8/2000 | Hirata et al. |
| 6,104,004 A | 8/2000 | Ragland et al. |
| 6,105,808 A | 8/2000 | Mendonca |
| 6,116,151 A | 9/2000 | Fickert et al. |
| 6,125,737 A | 10/2000 | Chang |
| 6,135,012 A * | 10/2000 | Kao .................. A47J 27/0802 219/453.11 |
| 6,135,013 A | 10/2000 | Barrena |
| 6,158,606 A | 12/2000 | Oliver |
| 6,173,643 B1 | 1/2001 | Qian et al. |
| 6,178,876 B1 | 1/2001 | Kao |
| 6,191,393 B1 | 2/2001 | Park |
| 6,201,217 B1 | 3/2001 | Moon et al. |
| 6,242,025 B1 | 6/2001 | Lesky et al. |
| 6,252,206 B1 | 6/2001 | Leukhardt, III et al. |
| 6,255,630 B1 | 7/2001 | Barnes et al. |
| 6,257,124 B1 | 7/2001 | Chen |
| 6,262,396 B1 | 7/2001 | Witt et al. |
| 6,262,399 B1 * | 7/2001 | Lau .................. A47J 37/0676 99/425 |
| 6,267,046 B1 | 7/2001 | Wanat |
| 6,268,592 B1 | 7/2001 | Hu et al. |
| 6,269,737 B1 | 8/2001 | Rigney et al. |
| 6,271,504 B1 | 8/2001 | Barritt |
| 6,283,014 B1 | 9/2001 | Ng et al. |
| 6,283,015 B1 | 9/2001 | Kwon et al. |
| 6,320,166 B1 | 11/2001 | Park |
| 6,355,914 B1 | 3/2002 | Stockley |
| 6,384,381 B2 | 5/2002 | Witt et al. |
| 6,393,969 B1 | 5/2002 | Kim |
| D458,078 S | 6/2002 | Lin |
| 6,399,925 B1 | 6/2002 | Pickering et al. |
| 6,414,254 B1 | 7/2002 | McNair |
| 6,425,320 B1 | 7/2002 | Chameroy et al. |
| 6,450,085 B1 | 9/2002 | Riesselman |
| 6,450,361 B1 | 9/2002 | Mendelson et al. |

(56) References Cited

U.S. PATENT DOCUMENTS

| | | |
|---|---|---|
| 6,455,085 B1 | 9/2002 | Duta |
| 6,467,645 B2 | 10/2002 | Park |
| 6,486,453 B1 | 11/2002 | Bales et al. |
| 6,494,337 B1 | 12/2002 | Moroni |
| 6,505,545 B2 | 1/2003 | Kennedy et al. |
| 6,509,550 B1 | 1/2003 | Li |
| 6,513,420 B1 | 2/2003 | Park |
| 6,523,459 B1 | 2/2003 | Chameroy et al. |
| 6,528,772 B1 | 3/2003 | Graves et al. |
| 6,540,097 B1 | 4/2003 | Beck et al. |
| 6,545,252 B2 | 4/2003 | Wang |
| 6,552,309 B1 | 4/2003 | Kish et al. |
| 6,559,427 B1 | 5/2003 | Barnes et al. |
| 6,565,903 B2 | 5/2003 | Ng et al. |
| 6,568,314 B1 | 5/2003 | Stepanova |
| 6,573,483 B1 | 6/2003 | Decobert et al. |
| 6,602,530 B1 | 8/2003 | Weber et al. |
| 6,603,099 B2 | 8/2003 | Gouthiere |
| 6,604,453 B2 | 8/2003 | Niese |
| 6,615,706 B1 | 9/2003 | Wu |
| 6,615,708 B1 | 9/2003 | Lin |
| 6,631,824 B2 | 10/2003 | Park |
| 6,669,047 B2 | 10/2003 | Wooderson et al. |
| 6,648,162 B1 | 11/2003 | Wooderson et al. |
| 6,617,554 B2 | 12/2003 | Moon et al. |
| 6,657,167 B2 | 12/2003 | Loveless |
| 6,695,319 B1 | 2/2004 | Anota et al. |
| D487,212 S | 3/2004 | Park |
| 6,698,337 B1 | 3/2004 | Park |
| 6,703,061 B2 | 3/2004 | Kennedy et al. |
| 6,705,209 B2 | 3/2004 | Yang et al. |
| 6,723,963 B2 | 4/2004 | Ronda |
| 6,730,881 B1 | 5/2004 | Arntz et al. |
| 6,730,882 B2 | 5/2004 | Atkinson |
| 6,730,889 B1 | 5/2004 | Jones-Lawlor |
| 6,736,131 B2 | 5/2004 | Yamamoto et al. |
| 6,740,855 B1 | 5/2004 | Decobert et al. |
| 6,742,445 B2 | 6/2004 | Backus et al. |
| 6,747,250 B1 | 6/2004 | Cha |
| 6,755,319 B2 | 6/2004 | Park |
| 6,758,132 B1 | 7/2004 | Kuo et al. |
| 6,777,651 B1 | 8/2004 | Boyer |
| 6,782,805 B2 | 8/2004 | Backus et al. |
| 6,782,806 B2 | 8/2004 | Backus et al. |
| 6,802,429 B1 | 10/2004 | Wildman |
| 6,809,297 B2 | 10/2004 | Moon et al. |
| 6,812,433 B1 | 11/2004 | Barritt |
| 6,815,644 B1 | 11/2004 | Muegge et al. |
| 6,831,254 B2 | 12/2004 | Barritt |
| 6,833,534 B2 | 12/2004 | Bellassai et al. |
| 6,837,150 B2 | 1/2005 | Backus et al. |
| 6,841,762 B2 | 1/2005 | Suzuki |
| 6,845,707 B1 | 1/2005 | Xu et al. |
| 6,846,504 B1 | 1/2005 | Yarnell |
| 6,851,351 B2 | 2/2005 | Payen et al. |
| 6,872,921 B1 | 3/2005 | Decobert et al. |
| 6,874,408 B2 | 4/2005 | Backus et al. |
| 6,877,633 B2 | 4/2005 | Niese |
| 6,903,310 B2 | 6/2005 | Lee |
| 6,917,017 B2 | 7/2005 | Moon et al. |
| 6,930,286 B2 | 8/2005 | Kim |
| 6,933,477 B2 | 8/2005 | Becker et al. |
| 6,935,223 B2 | 8/2005 | Kobayashi |
| 6,936,795 B1 | 8/2005 | Moon et al. |
| 6,936,801 B1 | 8/2005 | Head |
| 6,941,857 B2 | 9/2005 | McLemore |
| 6,972,397 B2 | 12/2005 | Ha |
| 7,009,147 B1 | 3/2006 | Schulte |
| 7,012,220 B2 | 3/2006 | Boyer et al. |
| 7,012,221 B2 | 3/2006 | Li |
| 7,021,203 B2 | 4/2006 | Backus et al. |
| 7,021,204 B2 | 4/2006 | Backus et al. |
| 7,024,104 B2 | 4/2006 | Moore, Jr. et al. |
| 7,045,745 B2 | 5/2006 | Kim |
| 7,053,337 B2 | 5/2006 | Ragan et al. |
| 7,060,941 B1 | 6/2006 | Embury et al. |
| 7,060,943 B2 | 6/2006 | Hwang |
| 7,081,601 B2 | 7/2006 | Boyer et al. |
| 7,082,871 B2 | 8/2006 | Schultz |
| 7,086,326 B2 | 8/2006 | Yokoyama |
| 7,087,873 B2 | 8/2006 | Hayakawa et al. |
| 7,091,454 B2 | 8/2006 | Cho et al. |
| 7,105,780 B2 | 9/2006 | De Longhi |
| 7,126,088 B2 | 10/2006 | Horton et al. |
| 7,148,451 B2 | 12/2006 | Miyake et al. |
| 7,154,069 B1 | 12/2006 | Gordon |
| 7,156,087 B1 | 1/2007 | Churchill et al. |
| 7,157,675 B2 | 1/2007 | Imura |
| 7,166,822 B1 | 1/2007 | Chang et al. |
| 7,171,923 B2 | 2/2007 | Hayakawa et al. |
| 7,208,701 B2 | 4/2007 | Fraccon et al. |
| 7,208,702 B2 | 4/2007 | Choi |
| 7,238,921 B2 | 7/2007 | Beesley et al. |
| 7,250,587 B2 | 7/2007 | Ely et al. |
| 7,250,588 B2 | 7/2007 | Ely et al. |
| 7,261,101 B2 | 8/2007 | Kim |
| 7,274,003 B2 * | 9/2007 | Baumann ............ A47J 37/0676 219/385 |
| 7,276,677 B1 | 10/2007 | Shelton |
| 7,285,751 B2 | 10/2007 | Li et al. |
| 7,304,271 B2 | 12/2007 | Cho et al. |
| 7,317,173 B2 | 1/2008 | Bartelick et al. |
| 7,322,279 B2 | 1/2008 | Cartigny et al. |
| 7,322,280 B2 | 1/2008 | Seurat Guiochet et al. |
| 7,325,481 B2 | 2/2008 | Helm |
| 7,368,688 B2 | 5/2008 | Kim et al. |
| 7,373,874 B2 | 5/2008 | Seurat Guiochet et al. |
| 7,377,208 B2 | 5/2008 | Ho et al. |
| 7,389,721 B2 | 6/2008 | Wanat |
| 7,411,159 B2 | 8/2008 | Oosterling |
| 7,412,922 B2 | 8/2008 | Mclemore |
| 7,418,960 B2 | 9/2008 | Saksena |
| 7,451,691 B2 | 11/2008 | Robertson |
| 7,451,692 B2 | 11/2008 | Baraille et al. |
| 7,468,495 B2 | 12/2008 | Carbone et al. |
| 7,523,696 B2 | 4/2009 | Seurat Guiochet et al. |
| 7,530,302 B2 | 5/2009 | Stephanou |
| 7,537,004 B2 | 5/2009 | Reay |
| 7,565,862 B2 | 7/2009 | Cartigny et al. |
| 7,605,349 B2 | 10/2009 | Gaynor et al. |
| D604,098 S | 11/2009 | Hamlin |
| 7,619,186 B2 | 11/2009 | Cavada et al. |
| 7,624,674 B2 | 12/2009 | Chameroy et al. |
| 7,637,206 B2 | 12/2009 | Seurat Guiochet et al. |
| 7,669,521 B2 | 3/2010 | Cartigny et al. |
| 7,669,591 B2 | 3/2010 | Fossati et al. |
| 7,677,160 B2 | 3/2010 | Tippmann, Sr. et al. |
| 7,703,385 B2 | 4/2010 | Seurat Guiochet et al. |
| 7,718,928 B2 | 5/2010 | He et al. |
| 7,726,508 B2 | 6/2010 | Hasegawa |
| 7,745,763 B2 | 6/2010 | Fraccon et al. |
| 7,759,615 B2 | 7/2010 | Ando et al. |
| 7,762,420 B2 | 7/2010 | Auwarter et al. |
| 7,766,003 B2 | 8/2010 | Kim |
| 7,775,390 B2 | 8/2010 | De Bastos Reis Portugal et al. |
| 7,800,022 B2 | 9/2010 | Kim |
| 7,810,488 B2 | 10/2010 | Manganiello et al. |
| 7,838,799 B2 | 11/2010 | Freedman |
| 7,856,875 B2 | 12/2010 | Jeon et al. |
| 7,875,836 B2 | 1/2011 | Imura et al. |
| 7,915,568 B2 | 3/2011 | Wang |
| D635,393 S | 4/2011 | Nakatani |
| 7,921,768 B2 | 4/2011 | Fernandez et al. |
| 7,935,914 B2 | 5/2011 | Imura |
| 7,943,888 B2 | 5/2011 | Barnes et al. |
| 7,964,824 B2 | 6/2011 | Moon |
| 7,968,824 B2 | 6/2011 | Lee et al. |
| 7,980,171 B2 | 7/2011 | Groll |
| 8,006,684 B2 | 8/2011 | Lee et al. |
| 8,006,685 B2 | 8/2011 | Bolton et al. |
| 8,011,293 B2 | 9/2011 | Mcfadden et al. |
| 8,042,533 B2 | 10/2011 | Dobie et al. |
| 8,080,766 B2 | 12/2011 | Frock et al. |
| 8,096,436 B2 | 1/2012 | Rhetat et al. |

(56) References Cited

U.S. PATENT DOCUMENTS

| | | |
|---|---|---|
| 8,096,440 B2 | 1/2012 | Rhetat et al. |
| 8,152,083 B2 | 4/2012 | Bower et al. |
| 8,166,871 B2 | 5/2012 | Veltrop et al. |
| 8,205,543 B2 | 6/2012 | Rhetat et al. |
| 8,247,751 B2 | 8/2012 | Jagannathan |
| 8,258,435 B2 | 9/2012 | Bonuso et al. |
| 8,267,008 B2 | 9/2012 | Yasuhara |
| D669,730 S | 10/2012 | Mandil |
| 8,276,507 B1 | 10/2012 | Walker |
| 8,286,548 B2 | 10/2012 | Krishnan et al. |
| 8,299,404 B2 | 10/2012 | Van Der Weij |
| 8,302,800 B2 | 11/2012 | Hasegawa |
| 8,304,695 B2 | 11/2012 | Bonuso et al. |
| 8,330,083 B2 | 12/2012 | Moon et al. |
| 8,338,757 B2 | 12/2012 | Isoda et al. |
| 8,369,695 B2 | 2/2013 | Lee et al. |
| 8,378,265 B2 | 2/2013 | Greenwood et al. |
| 8,381,712 B1 | 2/2013 | Simms, II |
| 8,393,262 B1 | 3/2013 | Molayem |
| 8,420,983 B2 | 4/2013 | Ohashi et al. |
| 8,461,488 B2 | 6/2013 | Jeong et al. |
| 8,517,006 B2 | 8/2013 | Frock et al. |
| 8,517,205 B2 | 8/2013 | Thelen |
| 8,525,081 B2 | 9/2013 | Colburn et al. |
| 8,544,381 B2 | 10/2013 | Cartigny et al. |
| 8,546,731 B2 | 10/2013 | Pellerin et al. |
| 8,561,525 B2 | 10/2013 | Bauchot et al. |
| 8,578,293 B2 | 11/2013 | Breunig et al. |
| 8,581,137 B2 | 11/2013 | Egenter |
| 8,601,939 B2 | 12/2013 | Saksena et al. |
| 8,604,394 B2 | 12/2013 | Wu et al. |
| 8,618,447 B2 | 12/2013 | De' Longhi |
| 8,637,797 B2 | 1/2014 | Imura |
| D699,514 S | 2/2014 | Lovley, II et al. |
| 8,640,908 B2 | 2/2014 | Yang et al. |
| 8,674,270 B2 | 3/2014 | Anderson et al. |
| 8,689,680 B2 | 4/2014 | Park |
| 8,695,487 B2 | 4/2014 | Sakane et al. |
| 8,709,905 B2 | 4/2014 | Crayfourd |
| 8,714,391 B2 | 5/2014 | Milanesi |
| 8,726,792 B2 | 5/2014 | Shealy et al. |
| 8,733,574 B2 | 5/2014 | Heidrich et al. |
| D707,078 S | 6/2014 | Rivera et al. |
| 8,739,690 B2 | 6/2014 | Chameroy et al. |
| 8,747,933 B1 | 6/2014 | McGinn |
| 8,766,144 B2 | 7/2014 | McLoughlin et al. |
| 8,777,038 B2 | 7/2014 | Wen |
| 8,783,498 B2 | 7/2014 | Li |
| 8,783,947 B2 | 7/2014 | Ferron et al. |
| D710,647 S | 8/2014 | Mandil et al. |
| 8,800,803 B2 | 8/2014 | Stellwag |
| 8,808,772 B2 | 8/2014 | Lubrina et al. |
| 8,813,635 B2 | 8/2014 | Dragan |
| 8,813,989 B2 | 8/2014 | Hoffmann et al. |
| 8,820,220 B2 | 9/2014 | Thelen et al. |
| 8,847,129 B2 | 9/2014 | Kim et al. |
| 8,869,829 B2 | 10/2014 | Hasegawa |
| 8,887,939 B2 | 11/2014 | Chameroy et al. |
| D719,398 S | 12/2014 | Deters |
| D720,571 S | 1/2015 | Deters |
| 8,931,402 B2 | 1/2015 | Chameroy et al. |
| 8,931,659 B2 | 1/2015 | Rhetat et al. |
| 8,944,272 B2 | 2/2015 | Chameroy et al. |
| 8,944,273 B2 | 2/2015 | Chameroy et al. |
| 8,946,604 B2 | 2/2015 | Kaiser et al. |
| 8,960,081 B2 | 2/2015 | Beard et al. |
| 8,973,770 B2 | 3/2015 | He et al. |
| 8,985,372 B2 | 3/2015 | Yang et al. |
| 8,991,307 B2 | 3/2015 | Grozinger et al. |
| 8,993,934 B2 | 3/2015 | Giazzon et al. |
| D727,095 S | 4/2015 | Bak |
| 9,018,566 B2 | 4/2015 | Wang |
| 9,027,468 B2 | 5/2015 | Rhetat et al. |
| 9,035,223 B2 | 5/2015 | Noguchi et al. |
| 9,055,618 B2 | 6/2015 | Bunzel et al. |
| 9,057,526 B2 | 6/2015 | Barritt |
| 9,066,523 B2 | 6/2015 | Seitz et al. |
| 9,115,905 B2 | 8/2015 | Giazzon et al. |
| 9,119,501 B2 | 9/2015 | Xie |
| 9,125,513 B2 | 9/2015 | Kim |
| 9,127,849 B2 | 9/2015 | Kang et al. |
| 9,138,106 B2 | 9/2015 | Walker |
| 9,173,408 B2 | 11/2015 | Yamamoto et al. |
| 9,177,460 B2 | 11/2015 | Fissler |
| 9,182,126 B2 | 11/2015 | Cartwright et al. |
| 9,191,998 B2 | 11/2015 | Hegedis et al. |
| 9,220,362 B2 | 12/2015 | Eades et al. |
| 9,237,829 B2 | 1/2016 | Alet Vidal et al. |
| D749,906 S | 2/2016 | Lee |
| 9,247,842 B2 | 2/2016 | Cheung et al. |
| 9,271,595 B2 | 3/2016 | Lee |
| 9,295,354 B2 | 3/2016 | Sloot et al. |
| 9,295,355 B2 | 3/2016 | Kwag et al. |
| D754,469 S | 4/2016 | Deters |
| 9,301,644 B2 | 4/2016 | Payen et al. |
| 9,314,134 B2 | 4/2016 | Molnar |
| 9,320,381 B2 | 4/2016 | Chameroy et al. |
| 9,326,633 B2 | 5/2016 | Lin |
| 9,339,145 B1 | 5/2016 | Owczarzak |
| 9,341,382 B2 | 5/2016 | Kim |
| 9,345,358 B2 | 5/2016 | Zhang et al. |
| 9,351,495 B2 | 5/2016 | Mcfadden |
| 9,353,954 B2 | 5/2016 | Linnewiel |
| 9,375,021 B2 | 6/2016 | Raghavan et al. |
| 9,414,713 B2 | 8/2016 | Jinzhao |
| 9,433,036 B2 | 8/2016 | Kurtimoto et al. |
| 9,439,530 B2 | 9/2016 | Logan et al. |
| D769,058 S | 10/2016 | Lee |
| 9,456,713 B2 | 10/2016 | Backaert et al. |
| 9,470,423 B2 | 10/2016 | Jacob et al. |
| 9,474,412 B2 | 10/2016 | Fung et al. |
| D772,648 S | 11/2016 | Palermo |
| 9,480,364 B2 | 11/2016 | McKee et al. |
| D774,350 S | 12/2016 | Mandil |
| D774,356 S | 12/2016 | Maiorana et al. |
| 9,526,367 B2 | 12/2016 | Anota et al. |
| 9,545,168 B2 | 1/2017 | Gabara |
| 9,565,963 B2 | 2/2017 | Jeon et al. |
| 9,565,964 B2 | 2/2017 | Yang et al. |
| 9,585,509 B2 | 3/2017 | Wassmus et al. |
| 9,596,954 B2 | 3/2017 | Park |
| 9,615,408 B2 | 4/2017 | Metz et al. |
| 9,615,688 B2 | 4/2017 | Shibuya et al. |
| 9,615,691 B2 | 4/2017 | Xiao |
| 9,615,692 B2 | 4/2017 | Hoffmann et al. |
| 9,615,694 B2 | 4/2017 | Yoshidome |
| 9,629,499 B2 | 4/2017 | Kim |
| 9,629,500 B2 | 4/2017 | Chance |
| 9,636,618 B2 | 5/2017 | Fung et al. |
| 9,642,487 B1 | 5/2017 | McGinn |
| 9,648,975 B2 | 5/2017 | Imura |
| 9,648,985 B2 | 5/2017 | Huang et al. |
| 9,675,197 B2 | 6/2017 | Schobloch et al. |
| 9,681,770 B2 | 6/2017 | Backaert et al. |
| 9,681,773 B2 | 6/2017 | McKee et al. |
| 9,683,747 B2 | 6/2017 | Raghavan et al. |
| 9,700,172 B2 | 7/2017 | Tanaka et al. |
| 9,706,870 B2 | 7/2017 | Hoehn et al. |
| 9,706,871 B2 | 7/2017 | Matthijs |
| 9,717,363 B2 | 8/2017 | Pan |
| 9,717,364 B2 | 8/2017 | Sladecek |
| 9,737,936 B2 | 8/2017 | Linglin et al. |
| 9,743,794 B2 | 8/2017 | Shibuya et al. |
| 9,750,089 B2 | 8/2017 | Wiedemann et al. |
| 9,756,980 B1 | 9/2017 | Li et al. |
| 9,756,981 B2 | 9/2017 | Fung |
| 9,763,531 B2 | 9/2017 | Baraille et al. |
| D801,106 S | 10/2017 | Mirchandani et al. |
| 9,775,461 B2 | 10/2017 | Yang et al. |
| 9,788,678 B2 | 10/2017 | Abe et al. |
| 9,795,250 B2 | 10/2017 | Huang |
| 9,801,487 B2 | 10/2017 | Park et al. |
| 9,801,491 B2 | 10/2017 | Cohade et al. |
| 9,814,355 B2 | 11/2017 | Winter et al. |

(56) References Cited

U.S. PATENT DOCUMENTS

| | | |
|---|---|---|
| 9,841,261 B2 | 12/2017 | Raghavan et al. |
| 9,854,931 B2 | 1/2018 | Rocklinger et al. |
| 9,854,932 B2 | 1/2018 | Tiruvallur |
| 9,854,941 B2 | 1/2018 | Bonaccorso |
| 9,861,231 B2 | 1/2018 | Kim |
| 9,867,234 B2 | 1/2018 | Thomann et al. |
| 9,872,581 B2 | 1/2018 | Braden et al. |
| 9,872,582 B2 | 1/2018 | Song et al. |
| 9,877,610 B2 | 1/2018 | Bucher et al. |
| 9,883,768 B2 | 2/2018 | Starflinger |
| 9,888,811 B2 | 2/2018 | Zwanenburg et al. |
| 9,890,946 B2 | 2/2018 | Shibuya et al. |
| 9,895,028 B2 | 2/2018 | Gerard et al. |
| 9,900,936 B2 | 2/2018 | Imm et al. |
| 9,903,597 B2 | 2/2018 | Nishijima et al. |
| 9,907,435 B2 | 3/2018 | Kohler et al. |
| 9,909,764 B2 | 3/2018 | Bach |
| 9,924,825 B2 | 3/2018 | Zakowski et al. |
| 9,924,830 B1 | 3/2018 | Glucksman et al. |
| D815,491 S | 4/2018 | Hollinger |
| 9,930,990 B1 | 4/2018 | Gupta et al. |
| 9,936,837 B1 | 4/2018 | Granberry |
| D817,697 S | 5/2018 | Zhao |
| 9,961,721 B2 | 5/2018 | Guilleminot et al. |
| 9,961,929 B2 | 5/2018 | Olsson |
| 9,962,029 B2 | 5/2018 | Baraille et al. |
| 9,980,605 B2 | 5/2018 | De Haas et al. |
| 10,016,085 B2 | 7/2018 | Sapire |
| 10,021,889 B2 | 7/2018 | Vinett |
| 10,022,015 B2 | 7/2018 | Marco et al. |
| 10,022,021 B2 | 7/2018 | Sudhir |
| 10,034,578 B2 | 7/2018 | Ahmed |
| D824,717 S | 8/2018 | Allen |
| D826,638 S | 8/2018 | Zhang |
| 10,045,651 B2 | 8/2018 | Huang |
| 10,047,961 B2 | 8/2018 | Choi |
| 10,051,986 B2 | 8/2018 | Schultz et al. |
| 10,051,995 B2 | 8/2018 | Buckley et al. |
| 10,054,317 B2 | 8/2018 | Franzolin |
| 10,057,946 B2 | 8/2018 | Mills et al. |
| 10,058,210 B2 | 8/2018 | Palermo |
| 10,060,632 B2 | 8/2018 | Lim et al. |
| 10,064,518 B2 | 9/2018 | Xiao et al. |
| 10,076,206 B2 | 9/2018 | Chameroy et al. |
| D832,023 S | 10/2018 | Barberi et al. |
| D832,030 S | 10/2018 | Veldeman |
| 10,088,371 B2 | 10/2018 | Kaiser et al. |
| 10,092,128 B2 | 10/2018 | Seitz et al. |
| 10,094,576 B2 | 10/2018 | Kim et al. |
| 10,098,354 B2 | 10/2018 | Faraldi et al. |
| D833,204 S | 11/2018 | Lee |
| 10,117,546 B2 | 11/2018 | Le Grand |
| 10,119,708 B2 | 11/2018 | Bartelick et al. |
| 10,123,556 B2 | 11/2018 | Distaso et al. |
| 10,123,656 B2 | 11/2018 | Shanmugam |
| 10,125,978 B2 | 11/2018 | Shibuya et al. |
| 10,130,205 B2 | 11/2018 | Fung et al. |
| D834,889 S | 12/2018 | Moon et al. |
| 10,143,324 B2 | 12/2018 | Kataoka et al. |
| 10,143,327 B2 | 12/2018 | Freeman et al. |
| 10,154,750 B2 | 12/2018 | Allemand et al. |
| D838,548 S | 1/2019 | Schutte |
| 10,172,494 B2 | 1/2019 | Long |
| 10,178,924 B2 | 1/2019 | French et al. |
| 10,208,964 B2 | 2/2019 | Cupp et al. |
| D842,649 S | 3/2019 | Mishan |
| 10,231,292 B2 | 3/2019 | Kim et al. |
| 10,231,565 B2 | 3/2019 | Song et al. |
| 10,231,574 B2 | 3/2019 | Strang |
| 10,244,883 B2 | 4/2019 | Chameroy et al. |
| 10,253,989 B2 | 4/2019 | Helm et al. |
| 10,258,049 B2 | 4/2019 | Engstrom |
| 10,260,755 B2 | 4/2019 | Bach |
| 10,260,758 B2 | 4/2019 | Colozzo et al. |
| 10,260,759 B2 | 4/2019 | Colozzo et al. |
| 10,271,686 B2 | 4/2019 | Roy |
| 10,274,206 B2 | 4/2019 | Chen |
| 10,278,241 B2 | 4/2019 | Shibuya et al. |
| 10,278,532 B2 | 5/2019 | Metz |
| 10,281,159 B2 | 5/2019 | Park et al. |
| 10,288,311 B2 | 5/2019 | Cho et al. |
| 10,295,192 B2 | 5/2019 | Yoshimura et al. |
| 10,299,621 B1 | 5/2019 | Bourgeois et al. |
| 10,327,587 B2 | 6/2019 | Liao |
| 10,330,323 B2 | 6/2019 | Kim et al. |
| 10,342,375 B2 | 7/2019 | Chen |
| 10,344,988 B2 | 7/2019 | Gattei |
| 10,349,775 B2 | 7/2019 | Lego et al. |
| 10,360,812 B2 | 7/2019 | Koennings et al. |
| 10,368,395 B1 | 7/2019 | Norman et al. |
| 10,368,403 B2 | 7/2019 | Hayashi et al. |
| 10,368,681 B2 | 8/2019 | Kataoka et al. |
| 10,376,087 B2 | 8/2019 | Cornelissen |
| 10,398,249 B2 | 9/2019 | Becker et al. |
| 10,405,686 B2 | 9/2019 | Patel et al. |
| 10,413,109 B2 | 9/2019 | Krebs et al. |
| 10,448,785 B2 | 10/2019 | Van Der Weij |
| 10,451,290 B2 | 10/2019 | Mayberry |
| 10,463,186 B2 | 11/2019 | Di Ronco et al. |
| 10,470,609 B2 | 11/2019 | Gerard et al. |
| 10,470,614 B2 | 11/2019 | Lang et al. |
| 10,492,637 B2 | 12/2019 | Abe et al. |
| 10,492,638 B2 | 12/2019 | Guegan et al. |
| 10,499,760 B2 | 12/2019 | Blond |
| 10,512,359 B2 | 12/2019 | Xu et al. |
| 10,517,306 B1 | 12/2019 | Meirav |
| 10,524,317 B2 | 12/2019 | Kondo et al. |
| 10,524,604 B2 | 1/2020 | Bjork et al. |
| 10,533,752 B2 | 1/2020 | Faraldi et al. |
| 10,561,273 B2 | 2/2020 | Patel et al. |
| 10,561,274 B2 | 2/2020 | Huang |
| 10,561,277 B1 | 2/2020 | Swayne et al. |
| 10,578,310 B2 | 3/2020 | Joo et al. |
| 10,588,445 B2 | 3/2020 | Gustavsson |
| 10,602,869 B2 | 3/2020 | Yu et al. |
| 10,638,868 B1 | 5/2020 | Straight |
| 10,638,869 B2 | 5/2020 | Kataoka et al. |
| 10,638,882 B1 | 5/2020 | He et al. |
| 10,645,765 B2 | 5/2020 | Shibuya et al. |
| 10,667,639 B2 | 6/2020 | Mederer |
| 10,674,855 B2 | 6/2020 | Rosalia et al. |
| 10,674,864 B2 | 6/2020 | Trtic |
| 10,690,352 B2 | 6/2020 | Smith et al. |
| 10,694,753 B2 | 6/2020 | Reese et al. |
| 10,729,282 B2 | 8/2020 | Bonaccorso |
| 10,746,412 B1 | 8/2020 | Artt |
| 10,893,776 B1 | 1/2021 | Norman et al. |
| 11,033,146 B2 * | 6/2021 | Anthony ............ A47J 37/0623 |
| 11,051,654 B2 * | 7/2021 | Anthony ............ A47J 37/0641 |
| 11,147,415 B2 * | 10/2021 | Anthony ............ A47J 37/0641 |
| 11,363,911 B2 * | 6/2022 | Anthony ............ A47J 37/0623 |
| 2001/0023641 A1 | 9/2001 | Borner |
| 2002/0179587 A1 | 12/2002 | Hui |
| 2002/0185012 A1 | 12/2002 | Yokoyama |
| 2003/0034027 A1 | 2/2003 | Yamamoto et al. |
| 2003/0127447 A1 | 7/2003 | Lin |
| 2004/0035845 A1 | 2/2004 | Moon et al. |
| 2004/0045446 A1 | 3/2004 | Park |
| 2004/0055474 A1 | 3/2004 | Lekic et al. |
| 2004/0112362 A1 | 6/2004 | Bruno et al. |
| 2004/0124197 A1 | 7/2004 | Hasegawa |
| 2004/0216731 A1 | 11/2004 | Personnettaz et al. |
| 2004/0222208 A1 | 11/2004 | Ko |
| 2004/0253348 A1 | 12/2004 | Woodward et al. |
| 2005/0011370 A1 | 1/2005 | Xu et al. |
| 2005/0034716 A1 | 2/2005 | Harbin |
| 2005/0089318 A1 | 4/2005 | Lai et al. |
| 2005/0189341 A1 * | 9/2005 | Lin .................... A47J 37/0605 |
| | | 219/468.1 |
| 2005/0223906 A1 | 10/2005 | Xu |
| 2005/0284305 A1 | 12/2005 | Angue |
| 2006/0081235 A1 | 4/2006 | Lundh et al. |
| 2007/0045284 A1 | 3/2007 | Balk et al. |
| 2007/0095215 A1 | 5/2007 | Ho et al. |

(56) References Cited

U.S. PATENT DOCUMENTS

| | | |
|---|---|---|
| 2007/0125768 A1 | 6/2007 | Kim et al. |
| 2007/0158335 A1 | 7/2007 | Mansbery |
| 2007/0199557 A1 | 8/2007 | Von Kaenel, Jr. |
| 2007/0295221 A1 | 12/2007 | Seurat Guiochet et al. |
| 2008/0022861 A1 | 1/2008 | Ferron |
| 2008/0078371 A1 | 4/2008 | Boscaino |
| 2008/0078755 A1 | 4/2008 | Jeon et al. |
| 2008/0083730 A1 | 4/2008 | Dolgov et al. |
| 2008/0095905 A1 | 4/2008 | Sells et al. |
| 2008/0099008 A1 | 5/2008 | Bolton et al. |
| 2008/0105137 A1 | 5/2008 | Genslak et al. |
| 2008/0142498 A1 | 6/2008 | He et al. |
| 2008/0163764 A1 | 7/2008 | Payen et al. |
| 2008/0173631 A1 | 7/2008 | Gagas et al. |
| 2008/0206420 A1 | 8/2008 | McFadden |
| 2008/0213447 A1 | 9/2008 | Payen et al. |
| 2008/0223224 A1 | 9/2008 | Martin |
| 2008/0290090 A1 | 11/2008 | Kindler et al. |
| 2008/0314258 A1 | 12/2008 | Martin |
| 2009/0011101 A1 | 1/2009 | Doherty et al. |
| 2009/0013988 A1 | 1/2009 | Kim et al. |
| 2009/0064868 A1 | 3/2009 | Cartossi |
| 2009/0095166 A1 | 4/2009 | Jian |
| 2009/0134140 A1 | 5/2009 | Van Der Weij |
| 2009/0223380 A1 | 9/2009 | Van Aken |
| 2009/0223386 A1 | 9/2009 | Edwards |
| 2009/0250452 A1 | 10/2009 | Tse |
| 2010/0089248 A1 | 4/2010 | Jones |
| 2010/0136194 A1 | 6/2010 | Schutte |
| 2010/0147159 A1 | 6/2010 | Fossati |
| 2010/0147824 A1 | 6/2010 | Bonuso et al. |
| 2010/0206289 A1 | 8/2010 | Larsen et al. |
| 2010/0282097 A1 | 11/2010 | Schulte |
| 2011/0003048 A1 | 1/2011 | Sugimoto et al. |
| 2011/0095015 A1 | 4/2011 | Kao |
| 2011/0168158 A1 | 4/2011 | Barkhouse |
| 2011/0120319 A1 | 5/2011 | Chang |
| 2011/0126719 A1 | 6/2011 | Valance |
| 2011/0146653 A1 | 6/2011 | Kitatani |
| 2011/0147376 A1 | 6/2011 | Ueda et al. |
| 2011/0248020 A1 | 10/2011 | Yuan |
| 2011/0268153 A1 | 11/2011 | He et al. |
| 2012/0003364 A1 | 1/2012 | Kling et al. |
| 2012/0009317 A1 | 1/2012 | Mclemore |
| 2012/0012584 A1 | 1/2012 | Chameroy et al. |
| 2012/0024164 A1 | 2/2012 | Park et al. |
| 2012/0024169 A1 | 2/2012 | Hsu |
| 2012/0040067 A1 | 2/2012 | Baraille et al. |
| 2012/0048843 A1 | 3/2012 | Feng et al. |
| 2012/0125313 A1 | 5/2012 | Van Der Weij |
| 2012/0174797 A1 | 7/2012 | Froza |
| 2012/0181363 A1 | 7/2012 | Huang |
| 2012/0192722 A1 | 8/2012 | Foster |
| 2012/0192726 A1 | 8/2012 | Clearman et al. |
| 2012/0217236 A1 | 8/2012 | Takagi |
| 2012/0217252 A1 | 8/2012 | Jung |
| 2012/0222665 A1 | 9/2012 | Ahmed |
| 2012/0318149 A1 | 12/2012 | Ahmed |
| 2013/0019759 A1 | 1/2013 | Tumenbatur et al. |
| 2013/0061765 A1 | 3/2013 | Reinhart |
| 2013/0074702 A1 | 3/2013 | Difante |
| 2013/0092145 A1 | 4/2013 | Murphy et al. |
| 2013/0104875 A1 | 5/2013 | Schultz et al. |
| 2013/0156906 A1 | 6/2013 | Raghavan et al. |
| 2013/0180413 A1 | 7/2013 | Tjerkgaast et al. |
| 2013/0180986 A1 | 7/2013 | He et al. |
| 2013/0196038 A1 | 8/2013 | Liu |
| 2013/0247779 A1 | 9/2013 | Hong et al. |
| 2013/0255509 A1 | 10/2013 | He et al. |
| 2013/0276643 A1 | 10/2013 | Krolick et al. |
| 2013/0298781 A1 | 11/2013 | Ganuza et al. |
| 2013/0305933 A1 | 11/2013 | Heidrich et al. |
| 2013/0333685 A1 | 12/2013 | Jeong et al. |
| 2014/0021191 A1 | 1/2014 | Moon et al. |
| 2014/0044851 A1 | 2/2014 | Kennedy |
| 2014/0083306 A1 | 3/2014 | Lee |
| 2014/0083992 A1 | 3/2014 | Linnewiel |
| 2014/0102315 A1 | 4/2014 | Park |
| 2014/0157994 A1 | 6/2014 | Ryan et al. |
| 2014/0175085 A1 | 6/2014 | Yang et al. |
| 2014/0199454 A1 | 7/2014 | Storek et al. |
| 2014/0199459 A1 | 7/2014 | Jackson et al. |
| 2014/0201688 A1 | 7/2014 | Guilleminot et al. |
| 2014/0220196 A1 | 8/2014 | Veloo |
| 2014/0227411 A1 | 8/2014 | Popeil et al. |
| 2014/0245898 A1 | 9/2014 | Froza |
| 2014/0246419 A1 | 9/2014 | Li |
| 2014/0251158 A1 | 9/2014 | Yang et al. |
| 2014/0251162 A1 | 9/2014 | Zhou |
| 2014/0318385 A1 | 10/2014 | Kim |
| 2014/0318386 A1 | 10/2014 | Kim |
| 2014/0318387 A1 | 10/2014 | Kim |
| 2014/0318388 A1 | 10/2014 | Kim |
| 2014/0318389 A1 | 10/2014 | Kim |
| 2014/0322417 A1 | 10/2014 | Kim |
| 2014/0348987 A1 | 11/2014 | Cheng et al. |
| 2014/0353316 A1 | 12/2014 | Lin |
| 2014/0360384 A1 | 12/2014 | Kim |
| 2014/0366746 A1 | 12/2014 | Tsai |
| 2014/0370176 A1 | 12/2014 | Imura et al. |
| 2014/0373729 A1 | 12/2014 | Kim et al. |
| 2014/0377417 A1 | 12/2014 | Martinez |
| 2015/0000535 A1 | 1/2015 | Yoshidome et al. |
| 2015/0059595 A1 | 3/2015 | Rand et al. |
| 2015/0083107 A1 | 3/2015 | Busch et al. |
| 2015/0114238 A1 | 4/2015 | Palermo |
| 2015/0122137 A1 | 5/2015 | Chang |
| 2015/0136769 A1 | 5/2015 | Quinn et al. |
| 2015/0173551 A1 | 6/2015 | Carbone et al. |
| 2015/0192289 A1 | 7/2015 | Gattei et al. |
| 2015/0201788 A1 | 7/2015 | Douma et al. |
| 2015/0201806 A1 | 7/2015 | Yoshidome |
| 2015/0208845 A1 | 7/2015 | Robbins et al. |
| 2015/0208858 A1 | 7/2015 | Robbins et al. |
| 2015/0223627 A1 | 8/2015 | Li et al. |
| 2015/0226438 A1 | 8/2015 | Ozyurt et al. |
| 2015/0250187 A1 | 9/2015 | Sakane et al. |
| 2015/0265097 A1 | 9/2015 | Poon |
| 2015/0292750 A1 | 10/2015 | Delrue et al. |
| 2015/0305093 A1 | 10/2015 | Smith et al. |
| 2015/0312964 A1 | 10/2015 | Sorenson et al. |
| 2015/0313399 A1 | 11/2015 | Park |
| 2015/0351578 A1 | 12/2015 | Song et al. |
| 2015/0354827 A1 | 12/2015 | Faraldi et al. |
| 2015/0366402 A1 | 12/2015 | Wu et al. |
| 2016/0007644 A1 | 1/2016 | Hack et al. |
| 2016/0007789 A1 | 1/2016 | Tiruvallur |
| 2016/0029829 A1 | 2/2016 | Klein |
| 2016/0033141 A1 | 2/2016 | Rizzuto |
| 2016/0037955 A1 | 2/2016 | Kim |
| 2016/0045067 A1 | 2/2016 | Liao |
| 2016/0051077 A1 | 2/2016 | Sloot et al. |
| 2016/0051078 A1 | 2/2016 | Jenkins et al. |
| 2016/0051086 A1 | 2/2016 | De' Longhi |
| 2016/0066738 A1 | 3/2016 | Shibuya et al. |
| 2016/0073814 A1 | 3/2016 | Kiriishi et al. |
| 2016/0081509 A1 | 3/2016 | Delrue et al. |
| 2016/0100707 A1 | 4/2016 | Huang |
| 2016/0100713 A1 | 4/2016 | De Haas et al. |
| 2016/0113432 A1 | 4/2016 | Cornelissen |
| 2016/0113442 A1 | 4/2016 | De Haas et al. |
| 2016/0120363 A1* | 5/2016 | Zwanenburg ......... A47J 37/108 426/523 |
| 2016/0120364 A1 | 5/2016 | De Haas et al. |
| 2016/0123660 A1 | 5/2016 | Peng |
| 2016/0150906 A1 | 6/2016 | Lee et al. |
| 2016/0165676 A1 | 6/2016 | Imm et al. |
| 2016/0174749 A1 | 6/2016 | Eades et al. |
| 2016/0174764 A1 | 6/2016 | Xiao |
| 2016/0174771 A1 | 6/2016 | Benoit et al. |
| 2016/0183722 A1 | 6/2016 | Fisher |
| 2016/0206139 A1 | 6/2016 | Johnson |
| 2016/0206140 A1 | 6/2016 | Johnson et al. |
| 2016/0192808 A1 | 7/2016 | Van Der Burg et al. |

(56) References Cited

U.S. PATENT DOCUMENTS

| | | |
|---|---|---|
| 2016/0198882 A1 | 7/2016 | Linglin |
| 2016/0198883 A1 | 7/2016 | Wang et al. |
| 2016/0206131 A1 | 7/2016 | Chien |
| 2016/0219653 A1 | 7/2016 | Kim et al. |
| 2016/0220057 A1 | 8/2016 | Smith et al. |
| 2016/0235078 A1 | 8/2016 | Farina et al. |
| 2016/0235239 A1 | 8/2016 | Patadia |
| 2016/0253080 A1 | 9/2016 | Ban et al. |
| 2016/0270596 A1 | 9/2016 | Allemand et al. |
| 2016/0278563 A1 | 9/2016 | Choudhary |
| 2016/0278565 A1 | 9/2016 | Chameroy et al. |
| 2016/0281994 A1 | 9/2016 | Nuessler |
| 2016/0309940 A1 | 10/2016 | Valance et al. |
| 2016/0309956 A1 | 10/2016 | Glucksman |
| 2016/0316525 A1 | 10/2016 | Vainionpaa |
| 2016/0316968 A1 | 11/2016 | Linglin |
| 2016/0324359 A1 | 11/2016 | Aboujassoum et al. |
| 2016/0327280 A1 | 11/2016 | Smith et al. |
| 2016/0345766 A1 | 12/2016 | Sapire |
| 2016/0353913 A1 | 12/2016 | Chameroy et al. |
| 2016/0353914 A1 | 12/2016 | Chameroy et al. |
| 2016/0353915 A1 | 12/2016 | Chameroy et al. |
| 2016/0353916 A1 | 12/2016 | Chameroy et al. |
| 2016/0360922 A1 | 12/2016 | Xiao et al. |
| 2016/0367061 A1 | 12/2016 | Chou |
| 2016/0374510 A1 | 12/2016 | Albizuri Landazabal |
| 2017/0000293 A1 | 1/2017 | Sladecek et al. |
| 2017/0016623 A1 | 1/2017 | Rabie et al. |
| 2017/0020334 A1 | 1/2017 | Sorenson et al. |
| 2017/0055770 A1 | 3/2017 | Case |
| 2017/0065127 A1 | 3/2017 | Bonaccorso |
| 2017/0071034 A1 | 3/2017 | Metz |
| 2017/0079475 A1 | 3/2017 | Buckley et al. |
| 2017/0089590 A1 | 3/2017 | Bruin-Slot et al. |
| 2017/0095105 A1 | 4/2017 | Clark et al. |
| 2017/0099977 A1 | 4/2017 | Liu |
| 2017/0099984 A1 | 4/2017 | Koetz |
| 2017/0099990 A1 | 4/2017 | Magnouloux et al. |
| 2017/0099995 A1 | 4/2017 | Magnouloux |
| 2017/0119192 A1 | 5/2017 | Sanserverino |
| 2017/0127871 A1 | 5/2017 | Leung |
| 2017/0135159 A1 | 5/2017 | Sorenson et al. |
| 2017/0172335 A1 | 6/2017 | Colas et al. |
| 2017/0181564 A1 | 6/2017 | He et al. |
| 2017/0199658 A1 | 7/2017 | Stoufer et al. |
| 2017/0224157 A1 | 8/2017 | Rummel et al. |
| 2017/0231257 A1 | 8/2017 | Thul et al. |
| 2017/0231415 A1 | 8/2017 | Cheng et al. |
| 2017/0231430 A1 | 8/2017 | Moon et al. |
| 2017/0245674 A1 | 8/2017 | Imura |
| 2017/0245683 A1 | 8/2017 | Chen et al. |
| 2017/0245686 A1 | 8/2017 | Man |
| 2017/0251872 A1 | 9/2017 | Li et al. |
| 2017/0251874 A1 | 9/2017 | Sladecek |
| 2017/0258268 A1 | 9/2017 | Kazanas et al. |
| 2017/0276378 A1 | 9/2017 | Faraldi et al. |
| 2017/0280914 A1 | 10/2017 | Kumar et al. |
| 2017/0290452 A1 | 10/2017 | Guillaume et al. |
| 2017/0295993 A1 | 10/2017 | Li et al. |
| 2017/0303740 A1 | 10/2017 | Bonaccorso |
| 2017/0319006 A1 | 11/2017 | Niizumi |
| 2017/0332823 A1 | 11/2017 | Sanseverino |
| 2017/0343221 A1 | 11/2017 | Swayne et al. |
| 2017/0360238 A1 | 12/2017 | Bogazzi |
| 2017/0360254 A1 | 12/2017 | Muhr et al. |
| 2017/0360255 A1 | 12/2017 | Karau |
| 2017/0367514 A1 | 12/2017 | In 'T Groen et al. |
| 2017/0370595 A1 | 12/2017 | Yang et al. |
| 2018/0000285 A1 | 1/2018 | Backus et al. |
| 2018/0007744 A1 | 1/2018 | Nonaka et al. |
| 2018/0014683 A1 | 1/2018 | Glucksman |
| 2018/0028017 A1 | 2/2018 | Wu |
| 2018/0035698 A1 | 2/2018 | McNerney et al. |
| 2018/0070596 A1 | 3/2018 | Kim et al. |
| 2018/0073739 A1 | 3/2018 | Dumenil |
| 2018/0078089 A1 | 3/2018 | Sauer et al. |
| 2018/0103796 A1 | 4/2018 | Park |
| 2018/0110355 A1 | 4/2018 | Huang et al. |
| 2018/0110373 A1 | 4/2018 | Zhang et al. |
| 2018/0116264 A1 | 5/2018 | De Winter et al. |
| 2018/0116438 A1 | 5/2018 | He et al. |
| 2018/0125293 A1 | 5/2018 | McNerney et al. |
| 2018/0125294 A1 | 5/2018 | Conte et al. |
| 2018/0140126 A1 | 5/2018 | Van Dillen |
| 2018/0143086 A1 | 5/2018 | Stoufer et al. |
| 2018/0146812 A1 | 5/2018 | Choi |
| 2018/0153329 A1 | 6/2018 | Glucksman et al. |
| 2018/0160840 A1 | 6/2018 | De' Longhi |
| 2018/0160849 A1 | 6/2018 | Hebert, Jr. et al. |
| 2018/0177322 A1 | 6/2018 | Kim |
| 2018/0177343 A1 | 6/2018 | Bonaccorso |
| 2018/0184843 A1 | 7/2018 | Kim et al. |
| 2018/0184848 A1 | 7/2018 | De' Longhi |
| 2018/0192825 A1 | 7/2018 | Popeil et al. |
| 2018/0199615 A1 | 7/2018 | Zhang et al. |
| 2018/0199756 A1 | 7/2018 | Huang |
| 2018/0206672 A1 | 7/2018 | Grace et al. |
| 2018/0206677 A1 | 7/2018 | Ivarsson et al. |
| 2018/0220498 A1 | 8/2018 | Jeon et al. |
| 2018/0220842 A1 | 8/2018 | Delrue et al. |
| 2018/0228318 A1 | 8/2018 | Zwanenburg et al. |
| 2018/0235396 A1 | 8/2018 | Schonenberger |
| 2018/0238560 A1 | 8/2018 | Deng et al. |
| 2018/0255967 A1 | 9/2018 | Haas et al. |
| 2018/0255971 A1 | 9/2018 | Moon et al. |
| 2018/0263084 A1 | 9/2018 | Yoshino et al. |
| 2018/0266697 A1 | 9/2018 | Dash et al. |
| 2018/0270915 A1 | 9/2018 | Koetz |
| 2018/0271321 A1 | 9/2018 | Delrue et al. |
| 2018/0271322 A1 | 9/2018 | Thai et al. |
| 2018/0271323 A1 | 9/2018 | Zhang et al. |
| 2018/0279832 A1 | 10/2018 | Ohta et al. |
| 2018/0289212 A1 | 10/2018 | Sladecek et al. |
| 2018/0296019 A1 | 10/2018 | Kim et al. |
| 2018/0299138 A1 | 10/2018 | Faraldi et al. |
| 2018/0303285 A1 | 10/2018 | Cheng |
| 2018/0317691 A1 | 11/2018 | Huang |
| 2018/0317692 A1 | 11/2018 | Huang |
| 2018/0317693 A1 | 11/2018 | Huang |
| 2018/0325311 A1 | 11/2018 | Feldman et al. |
| 2018/0325313 A1 | 11/2018 | De' Longhi et al. |
| 2018/0325318 A1 | 11/2018 | Longhi et al. |
| 2018/0325322 A1 | 11/2018 | De'Longhi et al. |
| 2018/0332993 A1 | 11/2018 | Cho et al. |
| 2018/0332999 A1 | 11/2018 | Nie |
| 2018/0333004 A1* | 11/2018 | De' Longhi ........ A47J 37/1261 |
| 2018/0333005 A1 | 11/2018 | Fritz et al. |
| 2018/0338636 A1 | 11/2018 | Ceccoli |
| 2018/0340695 A1 | 11/2018 | Park et al. |
| 2018/0344085 A1 | 12/2018 | Dutter |
| 2018/0347829 A1 | 12/2018 | Martini et al. |
| 2018/0353007 A1 | 12/2018 | Eberhart et al. |
| 2018/0353010 A1 | 12/2018 | Delrue et al. |
| 2018/0359823 A1 | 12/2018 | Shin et al. |
| 2018/0363915 A1 | 12/2018 | Bu |
| 2019/0000267 A1 | 1/2019 | Li et al. |
| 2019/0003718 A1 | 1/2019 | Lee et al. |
| 2019/0008316 A1 | 1/2019 | Kim et al. |
| 2019/0014940 A1 | 1/2019 | Cheung et al. |
| 2019/0014943 A1 | 1/2019 | Gill et al. |
| 2019/0021142 A1 | 1/2019 | Mizuta et al. |
| 2019/0024904 A1 | 1/2019 | Ueda et al. |
| 2019/0045964 A1 | 2/2019 | Gill et al. |
| 2019/0045973 A1 | 2/2019 | Gill et al. |
| 2019/0053521 A1 | 2/2019 | Tian et al. |
| 2019/0053655 A1 | 2/2019 | Panasik et al. |
| 2019/0059627 A1 | 2/2019 | Kitatani et al. |
| 2019/0059647 A1 | 2/2019 | Floessholzer |
| 2019/0069719 A1 | 3/2019 | Huang et al. |
| 2019/0075956 A1 | 3/2019 | Bang et al. |
| 2019/0075971 A1 | 3/2019 | Noca et al. |
| 2019/0082876 A1 | 3/2019 | Shi et al. |
| 2019/0086075 A1 | 3/2019 | Albert |
| 2019/0099039 A1 | 4/2019 | Li et al. |

(56) References Cited

U.S. PATENT DOCUMENTS

| | | |
|---|---|---|
| 2019/0110629 A1 | 4/2019 | Truong et al. |
| 2019/0110638 A1 | 4/2019 | Li et al. |
| 2019/0110640 A1 | 4/2019 | Te Velde et al. |
| 2019/0117005 A1 | 4/2019 | Kettavong et al. |
| 2019/0120504 A1 | 4/2019 | Lee et al. |
| 2019/0137112 A1 | 5/2019 | Lego et al. |
| 2019/0142215 A1 | 5/2019 | Popeil et al. |
| 2019/0142220 A1 | 5/2019 | Shirali et al. |
| 2019/0170361 A1 | 6/2019 | Ha et al. |
| 2019/0174945 A1 | 6/2019 | Oti |
| 2019/0203944 A1 | 7/2019 | Cho et al. |
| 2019/0215916 A1 | 7/2019 | Yang et al. |
| 2019/0223658 A1 | 7/2019 | He |
| 2019/0231125 A1 | 8/2019 | Gill et al. |
| 2019/0231126 A1 | 8/2019 | Gill et al. |
| 2019/0231127 A1 | 8/2019 | Gill et al. |
| 2019/0231128 A1 | 8/2019 | Gill et al. |
| 2019/0231129 A1 | 8/2019 | Gill et al. |
| 2019/0231130 A1 | 8/2019 | Gill et al. |
| 2019/0231131 A1 | 8/2019 | Gill et al. |
| 2019/0231132 A1 | 8/2019 | Gill et al. |
| 2019/0231133 A1 | 8/2019 | Gill et al. |
| 2019/0231134 A1 | 8/2019 | Gill et al. |
| 2019/0231135 A1 | 8/2019 | Gill et al. |
| 2019/0231136 A1 | 8/2019 | Gill et al. |
| 2019/0231137 A1 | 8/2019 | Gill et al. |
| 2019/0231138 A1 | 8/2019 | Gill et al. |
| 2019/0231139 A1 | 8/2019 | Gill et al. |
| 2019/0231140 A1 | 8/2019 | Gill et al. |
| 2019/0231141 A1 | 8/2019 | Gill et al. |
| 2019/0231142 A1 | 8/2019 | Gill et al. |
| 2019/0231143 A1 | 8/2019 | Gill et al. |
| 2019/0239518 A1 | 8/2019 | McKee et al. |
| 2019/0246830 A1 | 8/2019 | Ametepe et al. |
| 2019/0246835 A1 | 8/2019 | Tsai |
| 2019/0254476 A1* | 8/2019 | Anthony ............. A47J 37/0664 |
| 2019/0269272 A1 | 9/2019 | Itzkowitz |
| 2019/0269276 A1 | 9/2019 | Gvili |
| 2019/0282021 A1 | 9/2019 | Dion et al. |
| 2019/0282029 A1 | 9/2019 | Goldberg |
| 2019/0290062 A1 | 9/2019 | Prieto et al. |
| 2019/0290072 A1 | 9/2019 | Prieto et al. |
| 2019/0298100 A1 | 10/2019 | Li et al. |
| 2019/0298105 A1 | 10/2019 | Floessholzer |
| 2019/0309955 A1 | 10/2019 | Castillo et al. |
| 2019/0309956 A1 | 10/2019 | Buschman et al. |
| 2019/0313832 A1 | 10/2019 | Lee et al. |
| 2019/0313844 A1 | 10/2019 | Nadendla et al. |
| 2019/0316783 A1 | 10/2019 | Lee et al. |
| 2019/0327979 A1 | 10/2019 | Yang et al. |
| 2019/0328175 A1 | 10/2019 | Bancroft |
| 2019/0335934 A1 | 11/2019 | Delrue et al. |
| 2019/0374058 A1 | 12/2019 | Blond et al. |
| 2019/0380524 A1 | 12/2019 | Guegan et al. |
| 2019/0381654 A1 | 12/2019 | Oleynik |
| 2019/0387913 A1 | 12/2019 | Lee et al. |
| 2019/0387921 A1 | 12/2019 | Lemberger et al. |
| 2019/0387922 A1 | 12/2019 | Jin et al. |
| 2019/0387923 A1* | 12/2019 | Anthony ............. A47J 37/0629 |
| 2020/0000262 A1 | 1/2020 | Delrue et al. |
| 2020/0008601 A1 | 1/2020 | Cao |
| 2020/0008616 A1 | 1/2020 | Moon |
| 2020/0018475 A1 | 1/2020 | Sim et al. |
| 2020/0029721 A1 | 1/2020 | Kang et al. |
| 2020/0029731 A1 | 1/2020 | Hunt |
| 2020/0033009 A1 | 1/2020 | Lee et al. |
| 2020/0046157 A1 | 2/2020 | Leung |
| 2020/0053842 A1 | 2/2020 | Jeon et al. |
| 2020/0054024 A1 | 2/2020 | Sun et al. |
| 2020/0069113 A1* | 3/2020 | Anthony ............. A47J 37/0623 |
| 2020/0080726 A1 | 3/2020 | Polster |
| 2020/0088415 A1 | 3/2020 | Lee et al. |
| 2020/0113380 A1 | 4/2020 | Lu |
| 2020/0121129 A1 | 4/2020 | Wittig |
| 2020/0128995 A1 | 4/2020 | Patel et al. |
| 2020/0138043 A1 | 5/2020 | Hoerter |
| 2020/0138229 A1 | 5/2020 | Kweon et al. |
| 2020/0138239 A1 | 5/2020 | Gromowski et al. |
| 2020/0146496 A1 | 5/2020 | Patadia |
| 2020/0146497 A1 | 5/2020 | Shi et al. |
| 2020/0170437 A1 | 6/2020 | Anthony et al. |
| 2020/0178583 A1 | 6/2020 | Chen et al. |
| 2020/0182485 A1 | 6/2020 | Ball et al. |
| 2020/0187315 A1 | 6/2020 | Carcano et al. |
| 2020/0187697 A1 | 6/2020 | Stewart et al. |
| 2020/0187710 A1 | 6/2020 | Guo et al. |
| 2020/0191404 A1 | 6/2020 | Song |
| 2020/0205245 A1 | 6/2020 | Ma et al. |
| 2020/0205595 A1 | 7/2020 | He |
| 2020/0214500 A1 | 7/2020 | Popeil et al. |
| 2020/0229637 A1 | 7/2020 | Han et al. |
| 2020/0229638 A1 | 7/2020 | Lu |
| 2020/0229640 A1 | 7/2020 | Han et al. |
| 2020/0240647 A1 | 7/2020 | Itzkowitz et al. |
| 2020/0253420 A1 | 8/2020 | He et al. |
| 2020/0260907 A1 | 8/2020 | Lu et al. |
| 2020/0278116 A1 | 9/2020 | Kobayashi et al. |
| 2020/0329909 A1 | 10/2020 | Conrad et al. |
| 2020/0405086 A1 | 12/2020 | Dos Santos et al. |
| 2021/0000292 A1 | 1/2021 | Siu et al. |
| 2021/0000296 A1 | 1/2021 | Kennedy et al. |
| 2021/0274969 A1* | 9/2021 | Anthony ............. A47J 37/067 |
| 2022/0257053 A1 | 8/2022 | Bate |

FOREIGN PATENT DOCUMENTS

| | | |
|---|---|---|
| CN | 1218653 A | 6/1999 |
| CN | 1231153 A | 10/1999 |
| CN | 2389593 Y | 8/2000 |
| CN | 2450993 Y | 10/2001 |
| CN | 2469839 Y | 1/2002 |
| CN | 2479871 Y | 3/2002 |
| CN | 1139352 C | 2/2004 |
| CN | 1148142 C | 5/2004 |
| CN | 1158963 C | 7/2004 |
| CN | 2719176 Y | 8/2005 |
| CN | 1820685 A | 8/2006 |
| CN | 1883351 A | 12/2006 |
| CN | 2855256 Y | 1/2007 |
| CN | 2904903 Y | 5/2007 |
| CN | 1981682 A | 6/2007 |
| CN | 1985727 A | 6/2007 |
| CN | 1989884 A | 7/2007 |
| CN | 100998476 A | 7/2007 |
| CN | 101023842 A | 8/2007 |
| CN | 101053485 A | 10/2007 |
| CN | 200987595 Y | 12/2007 |
| CN | 101099635 A | 1/2008 |
| CN | 101108064 A | 1/2008 |
| CN | 101112291 A | 1/2008 |
| CN | 101112292 A | 1/2008 |
| CN | 101112293 A | 1/2008 |
| CN | 101142448 A | 3/2008 |
| CN | 101185556 A | 5/2008 |
| CN | 100401957 C | 7/2008 |
| CN | 101209179 A | 7/2008 |
| CN | 101209180 A | 7/2008 |
| CN | 201079267 Y | 7/2008 |
| CN | 100425186 C | 10/2008 |
| CN | 100428906 C | 10/2008 |
| CN | 101273834 A | 10/2008 |
| CN | 201139427 Y | 10/2008 |
| CN | 101317741 A | 12/2008 |
| CN | 101322614 A | 12/2008 |
| CN | 201197609 Y | 2/2009 |
| CN | 100464682 C | 3/2009 |
| CN | 100469289 C | 3/2009 |
| CN | 201207144 Y | 3/2009 |
| CN | 201223313 Y | 4/2009 |
| CN | 101432608 A | 5/2009 |
| CN | 101438929 A | 5/2009 |
| CN | 100496350 C | 6/2009 |
| CN | 101493236 A | 7/2009 |
| CN | 100522018 C | 8/2009 |

(56) References Cited

FOREIGN PATENT DOCUMENTS

| | | | |
|---|---|---|---|
| CN | 100531628 C | 8/2009 |
| CN | 100534363 C | 9/2009 |
| CN | 101518409 A | 9/2009 |
| CN | 100559999 C | 11/2009 |
| CN | 201365839 Y | 12/2009 |
| CN | 100588351 C | 2/2010 |
| CN | 101669761 A | 3/2010 |
| CN | 201445402 U | 5/2010 |
| CN | 101766439 A | 7/2010 |
| CN | 101766443 A | 7/2010 |
| CN | 101791190 A | 8/2010 |
| CN | 101828856 A | 9/2010 |
| CN | 101856086 A | 10/2010 |
| CN | 201602600 U | 10/2010 |
| CN | 201624512 U | 11/2010 |
| CN | 101936550 A | 1/2011 |
| CN | 101940273 A | 1/2011 |
| CN | 101420893 B | 2/2011 |
| CN | 101977536 A | 2/2011 |
| CN | 201888709 U | 7/2011 |
| CN | 201929758 U | 8/2011 |
| CN | 201948771 U | 8/2011 |
| CN | 102178443 A | 9/2011 |
| CN | 102178445 A | 9/2011 |
| CN | 102178464 A | 9/2011 |
| CN | 201958652 U | 9/2011 |
| CN | 201996364 U | 10/2011 |
| CN | 101305890 B | 11/2011 |
| CN | 102240164 A | 11/2011 |
| CN | 102307500 A | 1/2012 |
| CN | 102313306 A | 2/2012 |
| CN | 102349791 A | 2/2012 |
| CN | 202151310 U | 2/2012 |
| CN | 102368936 A | 3/2012 |
| CN | 202184614 U | 4/2012 |
| CN | 101692958 B | 5/2012 |
| CN | 202207075 U | 5/2012 |
| CN | 202234720 U | 5/2012 |
| CN | 202234761 U | 5/2012 |
| CN | 102578928 A | 7/2012 |
| CN | 202312886 U | 7/2012 |
| CN | 102670079 A | 9/2012 |
| CN | 202408428 U | 9/2012 |
| CN | 202408455 U | 9/2012 |
| CN | 102755120 A | 10/2012 |
| CN | 102824120 A | 12/2012 |
| CN | 202619362 U | 12/2012 |
| CN | 102100481 B | 1/2013 |
| CN | 102883641 A | 1/2013 |
| CN | 202636678 U | 1/2013 |
| CN | 202698888 U | 1/2013 |
| CN | 102920355 A | 2/2013 |
| CN | 103006045 A | 4/2013 |
| CN | 103006092 A | 4/2013 |
| CN | 202858889 U | 4/2013 |
| CN | 103142128 A | 6/2013 |
| CN | 103142151 A | 6/2013 |
| CN | 103169371 A | 6/2013 |
| CN | 103179884 A | 6/2013 |
| CN | 202960194 U | 6/2013 |
| CN | 202981682 U | 6/2013 |
| CN | 203000535 U | 6/2013 |
| CN | 103188947 A | 7/2013 |
| CN | 103188970 A | 7/2013 |
| CN | 103220947 A | 7/2013 |
| CN | 103222807 A | 7/2013 |
| CN | 203041954 U | 7/2013 |
| CN | 203041955 U | 7/2013 |
| CN | 102342739 B | 8/2013 |
| CN | 203122175 U | 8/2013 |
| CN | 103299132 A | 9/2013 |
| CN | 203195497 U | 9/2013 |
| CN | 203195499 U | 9/2013 |
| CN | 103375826 A | 10/2013 |
| CN | 203234602 U | 10/2013 |
| CN | 203234613 U | 10/2013 |
| CN | 102319018 B | 11/2013 |
| CN | 203302862 U | 11/2013 |
| CN | 203302892 U | 11/2013 |
| CN | 103445669 A | 12/2013 |
| CN | 102397005 B | 1/2014 |
| CN | 103491830 A | 1/2014 |
| CN | 203407931 U | 1/2014 |
| CN | 103649643 A | 3/2014 |
| CN | 203483269 U | 3/2014 |
| CN | 103750730 A | 4/2014 |
| CN | 203539138 U | 4/2014 |
| CN | 203539141 U | 4/2014 |
| CN | 203597772 U | 5/2014 |
| CN | 203615383 U | 5/2014 |
| CN | 203634023 U | 6/2014 |
| CN | 203647141 U | 6/2014 |
| CN | 203662545 U | 6/2014 |
| CN | 103892696 A | 7/2014 |
| CN | 103948308 A | 7/2014 |
| CN | 203693372 U | 7/2014 |
| CN | 203723888 U | 7/2014 |
| CN | 104000478 A | 8/2014 |
| CN | 203762926 U | 8/2014 |
| CN | 203776718 U | 8/2014 |
| CN | 203776719 U | 8/2014 |
| CN | 203776729 U | 8/2014 |
| CN | 203789747 U | 8/2014 |
| CN | 203828675 U | 9/2014 |
| CN | 104068757 B | 10/2014 |
| CN | 203873601 U | 10/2014 |
| CN | 203873602 U | 10/2014 |
| CN | 203885286 U | 10/2014 |
| CN | 203885342 U | 10/2014 |
| CN | 203914511 U | 11/2014 |
| CN | 203953373 U | 11/2014 |
| CN | 203970073 U | 12/2014 |
| CN | 203970160 U | 12/2014 |
| CN | 203987492 U | 12/2014 |
| CN | 203987520 U | 12/2014 |
| CN | 203987550 U | 12/2014 |
| CN | 203987551 U | 12/2014 |
| CN | 204015964 U | 12/2014 |
| CN | 204016055 U | 12/2014 |
| CN | 204016056 U | 12/2014 |
| CN | 204049362 U | 12/2014 |
| CN | 204091768 U | 1/2015 |
| CN | 104323708 A | 2/2015 |
| CN | 104337407 A | 2/2015 |
| CN | 104367182 A | 2/2015 |
| CN | 104367252 A | 2/2015 |
| CN | 204133165 U | 2/2015 |
| CN | 204133291 U | 2/2015 |
| CN | 204158183 U | 2/2015 |
| CN | 104433841 A | 3/2015 |
| CN | 204192406 U | 3/2015 |
| CN | 104490294 A | 4/2015 |
| CN | 102917623 B | 5/2015 |
| CN | 104586233 A | 5/2015 |
| CN | 104613515 A | 5/2015 |
| CN | 104622274 A | 5/2015 |
| CN | 104676681 A | 6/2015 |
| CN | 104688019 A | 6/2015 |
| CN | 104706212 A | 6/2015 |
| CN | 103284618 B | 7/2015 |
| CN | 104754992 A | 7/2015 |
| CN | 104757872 A | 7/2015 |
| CN | 204427799 | 7/2015 |
| CN | 204427801 U | 7/2015 |
| CN | 204467861 U | 7/2015 |
| CN | 204500391 U | 7/2015 |
| CN | 104814665 A | 8/2015 |
| CN | 104856561 A | 8/2015 |
| CN | 104856563 A | 8/2015 |
| CN | 204520386 U | 8/2015 |
| CN | 204580991 U | 8/2015 |
| CN | 104873098 A | 9/2015 |
| CN | 104887063 A | 9/2015 |
| CN | 204636063 U | 9/2015 |

(56) References Cited

FOREIGN PATENT DOCUMENTS

| | | | |
|---|---|---|---|
| CN | 104983318 A | 10/2015 |
| CN | 104997394 A | 10/2015 |
| CN | 204697804 U | 10/2015 |
| CN | 105011741 A | 11/2015 |
| CN | 105030035 A | 11/2015 |
| CN | 105054772 A | 11/2015 |
| CN | 105054773 A | 11/2015 |
| CN | 204734374 U | 11/2015 |
| CN | 204743846 U | 11/2015 |
| CN | 204765165 U | 11/2015 |
| CN | 204765167 U | 11/2015 |
| CN | 204765168 U | 11/2015 |
| CN | 204765197 U | 11/2015 |
| CN | 204797615 U | 11/2015 |
| CN | 204797616 U | 11/2015 |
| CN | 103813738 B | 12/2015 |
| CN | 105105624 A | 12/2015 |
| CN | 105105626 A | 12/2015 |
| CN | 105167591 A | 12/2015 |
| CN | 105167592 A | 12/2015 |
| CN | 105193301 A | 12/2015 |
| CN | 204813499 U | 12/2015 |
| CN | 204839219 U | 12/2015 |
| CN | 204889693 U | 12/2015 |
| CN | 105212693 A | 1/2016 |
| CN | 105212730 A | 1/2016 |
| CN | 105231811 A | 1/2016 |
| CN | 105231812 A | 1/2016 |
| CN | 105231813 A | 1/2016 |
| CN | 105266565 A | 1/2016 |
| CN | 105266577 A | 1/2016 |
| CN | 204995259 U | 1/2016 |
| CN | 105286491 A | 2/2016 |
| CN | 105286496 A | 2/2016 |
| CN | 105286498 A | 2/2016 |
| CN | 105286627 A | 2/2016 |
| CN | 105326332 A | 2/2016 |
| CN | 105342454 A | 2/2016 |
| CN | 205018878 U | 2/2016 |
| CN | 105380512 A | 3/2016 |
| CN | 105380513 A | 3/2016 |
| CN | 105411378 A | 3/2016 |
| CN | 105411379 A | 3/2016 |
| CN | 105433778 A | 3/2016 |
| CN | 105433779 A | 3/2016 |
| CN | 105451610 A | 3/2016 |
| CN | 106380514 A | 3/2016 |
| CN | 205053851 U | 3/2016 |
| CN | 105455628 A | 4/2016 |
| CN | 105455664 A | 4/2016 |
| CN | 105455671 A | 4/2016 |
| CN | 105476461 A | 4/2016 |
| CN | 105476464 A | 4/2016 |
| CN | 105476472 A | 4/2016 |
| CN | 105476491 A | 4/2016 |
| CN | 105496184 A | 4/2016 |
| CN | 105496185 A | 4/2016 |
| CN | 105496224 A | 4/2016 |
| CN | 205126014 U | 4/2016 |
| CN | 105534269 A | 5/2016 |
| CN | 105559571 A | 5/2016 |
| CN | 105595792 A | 5/2016 |
| CN | 105595803 A | 5/2016 |
| CN | 205197727 U | 5/2016 |
| CN | 205197819 U | 5/2016 |
| CN | 205214967 U | 5/2016 |
| CN | 205215045 U | 5/2016 |
| CN | 102440681 B | 6/2016 |
| CN | 102783908 B | 6/2016 |
| CN | 103648337 B | 6/2016 |
| CN | 105615638 A | 6/2016 |
| CN | 105615639 A | 6/2016 |
| CN | 105640299 A | 6/2016 |
| CN | 105640302 A | 6/2016 |
| CN | 105640309 A | 6/2016 |
| CN | 105640351 A | 6/2016 |
| CN | 105662112 A | 6/2016 |
| CN | 105662125 A | 6/2016 |
| CN | 105662126 A | 6/2016 |
| CN | 105662127 A | 6/2016 |
| CN | 105708312 A | 6/2016 |
| CN | 106615686 A | 6/2016 |
| CN | 205286098 U | 6/2016 |
| CN | 205322075 U | 6/2016 |
| CN | 205338709 U | 6/2016 |
| CN | 104605727 B | 7/2016 |
| CN | 105725730 A | 7/2016 |
| CN | 105725829 A | 7/2016 |
| CN | 105768859 A | 7/2016 |
| CN | 105768860 A | 7/2016 |
| CN | 103908166 B | 8/2016 |
| CN | 105816023 A | 8/2016 |
| CN | 105832176 A | 8/2016 |
| CN | 105852667 A | 8/2016 |
| CN | 105852668 A | 8/2016 |
| CN | 105902144 A | 8/2016 |
| CN | 105902150 A | 8/2016 |
| CN | 205410811 U | 8/2016 |
| CN | 205425108 U | 8/2016 |
| CN | 205433281 U | 8/2016 |
| CN | 205433317 U | 8/2016 |
| CN | 205433320 U | 8/2016 |
| CN | 205493513 U | 8/2016 |
| CN | 205493586 U | 8/2016 |
| CN | 205493593 U | 8/2016 |
| CN | 105919411 A | 9/2016 |
| CN | 105919417 A | 9/2016 |
| CN | 105935244 A | 9/2016 |
| CN | 105935258 A | 9/2016 |
| CN | 105972653 A | 9/2016 |
| CN | 205568641 U | 9/2016 |
| CN | 205568772 U | 9/2016 |
| CN | 205597052 U | 9/2016 |
| CN | 105982529 A | 10/2016 |
| CN | 105996737 A | 10/2016 |
| CN | 105996752 A | 10/2016 |
| CN | 105996753 A | 10/2016 |
| CN | 106037448 A | 10/2016 |
| CN | 106037457 A | 10/2016 |
| CN | 106037458 A | 10/2016 |
| CN | 106073481 A | 11/2016 |
| CN | 106073517 A | 11/2016 |
| CN | 106108627 A | 11/2016 |
| CN | 106108631 A | 11/2016 |
| CN | 106166030 A | 11/2016 |
| CN | 205671926 U | 11/2016 |
| CN | 205671927 U | 11/2016 |
| CN | 106175412 A | 12/2016 |
| CN | 106175476 A | 12/2016 |
| CN | 106175477 A | 12/2016 |
| CN | 106213979 A | 12/2016 |
| CN | 106235878 A | 12/2016 |
| CN | 205831665 U | 12/2016 |
| CN | 106264085 A | 1/2017 |
| CN | 106264095 A | 1/2017 |
| CN | 106292340 | 1/2017 |
| CN | 106343895 A | 1/2017 |
| CN | 205849309 U | 1/2017 |
| CN | 205860134 U | 1/2017 |
| CN | 106377158 A | 2/2017 |
| CN | 106377159 A | 2/2017 |
| CN | 106388565 A | 2/2017 |
| CN | 106388572 A | 2/2017 |
| CN | 106419486 A | 2/2017 |
| CN | 106419521 A | 2/2017 |
| CN | 106419524 A | 2/2017 |
| CN | 106419618 B | 2/2017 |
| CN | 106419620 A | 2/2017 |
| CN | 205923803 U | 2/2017 |
| CN | 102805554 B | 3/2017 |
| CN | 106473623 A | 3/2017 |
| CN | 106490967 A | 3/2017 |
| CN | 106510449 A | 3/2017 |
| CN | 206007050 U | 3/2017 |

(56) References Cited

FOREIGN PATENT DOCUMENTS

| | | |
|---|---|---|
| CN | 206026097 U | 3/2017 |
| CN | 206026100 U | 3/2017 |
| CN | 206044349 U | 3/2017 |
| CN | 206044409 U | 3/2017 |
| CN | 106551617 A | 4/2017 |
| CN | 106580074 A | 4/2017 |
| CN | 206062888 U | 4/2017 |
| CN | 206062947 U | 4/2017 |
| CN | 206102391 U | 4/2017 |
| CN | 206119969 U | 4/2017 |
| CN | 206119971 U | 4/2017 |
| CN | 106618154 A | 5/2017 |
| CN | 106667244 A | 5/2017 |
| CN | 106691171 A | 5/2017 |
| CN | 206166699 U | 5/2017 |
| CN | 206166710 U | 5/2017 |
| CN | 206166711 U | 5/2017 |
| CN | 206166726 U | 5/2017 |
| CN | 206183062 U | 5/2017 |
| CN | 106802584 A | 6/2017 |
| CN | 106805744 A | 6/2017 |
| CN | 106805746 A | 6/2017 |
| CN | 106805747 A | 6/2017 |
| CN | 106805749 A | 6/2017 |
| CN | 106805750 A | 6/2017 |
| CN | 106805752 A | 6/2017 |
| CN | 106820951 A | 6/2017 |
| CN | 106820954 A | 6/2017 |
| CN | 106821017 A | 6/2017 |
| CN | 106852641 A | 6/2017 |
| CN | 106859298 A | 6/2017 |
| CN | 206239100 | 6/2017 |
| CN | 206252365 U | 6/2017 |
| CN | 206261486 U | 6/2017 |
| CN | 206261487 U | 6/2017 |
| CN | 206284788 U | 6/2017 |
| CN | 206284794 U | 6/2017 |
| CN | 106913201 A | 7/2017 |
| CN | 106923655 A | 7/2017 |
| CN | 106943000 A | 7/2017 |
| CN | 106943002 A | 7/2017 |
| CN | 106955017 A | 7/2017 |
| CN | 106974548 A | 7/2017 |
| CN | 106983360 A | 7/2017 |
| CN | 206303774 U | 7/2017 |
| CN | 206324671 U | 7/2017 |
| CN | 106998961 A | 8/2017 |
| CN | 107019418 A | 8/2017 |
| CN | 107019419 A | 8/2017 |
| CN | 107019420 A | 8/2017 |
| CN | 107019423 A | 8/2017 |
| CN | 107048976 A | 8/2017 |
| CN | 107048991 A | 8/2017 |
| CN | 107048993 A | 8/2017 |
| CN | 107049054 A | 8/2017 |
| CN | 107049058 A | 8/2017 |
| CN | 107065634 B | 8/2017 |
| CN | 107105914 A | 8/2017 |
| CN | 206371913 U | 8/2017 |
| CN | 206371926 U | 8/2017 |
| CN | 206371930 U | 8/2017 |
| CN | 206371931 U | 8/2017 |
| CN | 206381064 U | 8/2017 |
| CN | 206414178 U | 8/2017 |
| CN | 104334066 B | 9/2017 |
| CN | 107136910 A | 9/2017 |
| CN | 107136911 A | 9/2017 |
| CN | 107149395 A | 9/2017 |
| CN | 107149398 A | 9/2017 |
| CN | 206453694 U | 9/2017 |
| CN | 206469994 U | 9/2017 |
| CN | 206504577 U | 9/2017 |
| CN | 206518479 U | 9/2017 |
| CN | 105142473 B | 10/2017 |
| CN | 107224188 A | 10/2017 |
| CN | 107224197 A | 10/2017 |
| CN | 107232962 A | 10/2017 |
| CN | 107259978 A | 10/2017 |
| CN | 107290094 A | 10/2017 |
| CN | 107296485 A | 10/2017 |
| CN | 107296486 A | 10/2017 |
| CN | 107296487 A | 10/2017 |
| CN | 107296488 A | 10/2017 |
| CN | 107296489 A | 10/2017 |
| CN | 107296490 A | 10/2017 |
| CN | 107296493 A | 10/2017 |
| CN | 107296494 A | 10/2017 |
| CN | 206560353 U | 10/2017 |
| CN | 206560354 U | 10/2017 |
| CN | 206560359 U | 10/2017 |
| CN | 206560361 U | 10/2017 |
| CN | 104643954 B | 11/2017 |
| CN | 107307729 A | 11/2017 |
| CN | 107307730 A | 11/2017 |
| CN | 107334388 A | 11/2017 |
| CN | 107361637 A | 11/2017 |
| CN | 107397431 A | 11/2017 |
| CN | 206603656 U | 11/2017 |
| CN | 107411540 A | 12/2017 |
| CN | 107440490 A | 12/2017 |
| CN | 107468052 A | 12/2017 |
| CN | 107495849 A | 12/2017 |
| CN | 107495856 A | 12/2017 |
| CN | 107510356 A | 12/2017 |
| CN | 107510379 A | 12/2017 |
| CN | 206687606 U | 12/2017 |
| CN | 206687631 U | 12/2017 |
| CN | 206700038 U | 12/2017 |
| CN | 206777230 U | 12/2017 |
| CN | 206807803 U | 12/2017 |
| CN | 206807804 U | 12/2017 |
| CN | 106213986 B | 1/2018 |
| CN | 107550250 A | 1/2018 |
| CN | 107550258 A | 1/2018 |
| CN | 107595153 A | 1/2018 |
| CN | 107616686 A | 1/2018 |
| CN | 107647763 A | 2/2018 |
| CN | 107647769 A | 2/2018 |
| CN | 107647771 A | 2/2018 |
| CN | 107647772 A | 2/2018 |
| CN | 107647777 A | 2/2018 |
| CN | 107660996 A | 2/2018 |
| CN | 107660997 A | 2/2018 |
| CN | 107684336 A | 2/2018 |
| CN | 107684337 A | 2/2018 |
| CN | 107684338 A | 2/2018 |
| CN | 107684339 A | 2/2018 |
| CN | 107684340 A | 2/2018 |
| CN | 107684341 A | 2/2018 |
| CN | 107684342 A | 2/2018 |
| CN | 107692806 A | 2/2018 |
| CN | 107702838 A | 2/2018 |
| CN | 107713732 A | 2/2018 |
| CN | 107713733 A | 2/2018 |
| CN | 107713734 A | 2/2018 |
| CN | 107726388 A | 2/2018 |
| CN | 106419522 B | 3/2018 |
| CN | 107752726 A | 3/2018 |
| CN | 107752748 A | 3/2018 |
| CN | 107752751 A | 3/2018 |
| CN | 107752788 A | 3/2018 |
| CN | 107773021 A | 3/2018 |
| CN | 107773026 A | 3/2018 |
| CN | 107773029 A | 3/2018 |
| CN | 107773090 A | 3/2018 |
| CN | 107788820 A | 3/2018 |
| CN | 107788827 A | 3/2018 |
| CN | 107811499 A | 3/2018 |
| CN | 107811517 A | 3/2018 |
| CN | 107811518 A | 3/2018 |
| CN | 107822492 A | 3/2018 |
| CN | 107822494 A | 3/2018 |
| CN | 107822496 A | 3/2018 |
| CN | 107822524 A | 3/2018 |

(56) References Cited

FOREIGN PATENT DOCUMENTS

| | | | |
|---|---|---|---|
| CN | 107836981 | A | 3/2018 |
| CN | 107836986 | A | 3/2018 |
| CN | 107836988 | A | 3/2018 |
| CN | 207084680 | U | 3/2018 |
| CN | 207101150 | U | 3/2018 |
| CN | 107874584 | A | 4/2018 |
| CN | 107874599 | A | 4/2018 |
| CN | 107874601 | A | 4/2018 |
| CN | 107874602 | A | 4/2018 |
| CN | 107898351 | A | 4/2018 |
| CN | 107928388 | A | 4/2018 |
| CN | 107928395 | A | 4/2018 |
| CN | 107951369 | A | 4/2018 |
| CN | 107951376 | A | 4/2018 |
| CN | 107951407 | A | 4/2018 |
| CN | 207202762 | U | 4/2018 |
| CN | 207253261 | U | 4/2018 |
| CN | 107969907 | A | 5/2018 |
| CN | 107969908 | A | 5/2018 |
| CN | 107981713 | A | 5/2018 |
| CN | 107997571 | A | 5/2018 |
| CN | 108013742 | A | 5/2018 |
| CN | 108013743 | A | 5/2018 |
| CN | 108030404 | A | 5/2018 |
| CN | 108041976 | A | 5/2018 |
| CN | 108056670 | A | 5/2018 |
| CN | 207355971 | U | 5/2018 |
| CN | 108095570 | A | 6/2018 |
| CN | 108113501 | A | 6/2018 |
| CN | 108143256 | A | 6/2018 |
| CN | 108143259 | A | 6/2018 |
| CN | 108143260 | A | 6/2018 |
| CN | 108143261 | A | 6/2018 |
| CN | 108143262 | A | 6/2018 |
| CN | 108143263 | A | 6/2018 |
| CN | 108143264 | A | 6/2018 |
| CN | 108158418 | A | 6/2018 |
| CN | 108158429 | A | 6/2018 |
| CN | 108209547 | A | 6/2018 |
| CN | 207429001 | U | 6/2018 |
| CN | 207492655 | U | 6/2018 |
| CN | 207506440 | U | 6/2018 |
| CN | 104207651 | B | 7/2018 |
| CN | 106175423 | A | 7/2018 |
| CN | 108244994 | A | 7/2018 |
| CN | 108244995 | A | 7/2018 |
| CN | 108244997 | A | 7/2018 |
| CN | 108244998 | A | 7/2018 |
| CN | 108244999 | A | 7/2018 |
| CN | 108245000 | A | 7/2018 |
| CN | 108245032 | A | 7/2018 |
| CN | 108261055 | A | 7/2018 |
| CN | 108261056 | A | 7/2018 |
| CN | 108261061 | A | 7/2018 |
| CN | 108272336 | A | 7/2018 |
| CN | 108272338 | A | 7/2018 |
| CN | 108294616 | A | 7/2018 |
| CN | 108294640 | A | 7/2018 |
| CN | 108309035 | A | 7/2018 |
| CN | 108324096 | A | 7/2018 |
| CN | 207575048 | U | 7/2018 |
| CN | 207604862 | U | 7/2018 |
| CN | 207627123 | U | 7/2018 |
| CN | 207627136 | U | 7/2018 |
| CN | 207640235 | U | 7/2018 |
| CN | 106388570 | B | 8/2018 |
| CN | 106419517 | B | 8/2018 |
| CN | 108354444 | A | 8/2018 |
| CN | 108354466 | A | 8/2018 |
| CN | 108378678 | A | 8/2018 |
| CN | 108378690 | A | 8/2018 |
| CN | 108402888 | A | 8/2018 |
| CN | 108402889 | A | 8/2018 |
| CN | 108402891 | A | 8/2018 |
| CN | 108402920 | A | 8/2018 |
| CN | 108420304 | A | 8/2018 |
| CN | 108433517 | A | 8/2018 |
| CN | 108433529 | A | 8/2018 |
| CN | 108451351 | A | 8/2018 |
| CN | 108451388 | A | 8/2018 |
| CN | 108464732 | A | 8/2018 |
| CN | 207745052 | U | 8/2018 |
| CN | 207754989 | U | 8/2018 |
| CN | 207755036 | U | 8/2018 |
| CN | 106539491 | B | 9/2018 |
| CN | 107019415 | B | 9/2018 |
| CN | 107019416 | B | 9/2018 |
| CN | 108477987 | A | 9/2018 |
| CN | 108497908 | A | 9/2018 |
| CN | 108497914 | A | 9/2018 |
| CN | 108497918 | A | 9/2018 |
| CN | 108497942 | A | 9/2018 |
| CN | 108523647 | A | 9/2018 |
| CN | 108523649 | A | 9/2018 |
| CN | 108542272 | A | 9/2018 |
| CN | 108552969 | A | 9/2018 |
| CN | 108552989 | A | 9/2018 |
| CN | 108567309 | A | 9/2018 |
| CN | 108567321 | A | 9/2018 |
| CN | 108567322 | A | 9/2018 |
| CN | 108577514 | A | 9/2018 |
| CN | 108577580 | A | 9/2018 |
| CN | 207804077 | U | 9/2018 |
| CN | 207804095 | U | 9/2018 |
| CN | 207855533 | U | 9/2018 |
| CN | 207855579 | U | 9/2018 |
| CN | 106264094 | B | 10/2018 |
| CN | 108606627 | A | 10/2018 |
| CN | 108618592 | A | 10/2018 |
| CN | 108618593 | A | 10/2018 |
| CN | 108618594 | A | 10/2018 |
| CN | 108618595 | A | 10/2018 |
| CN | 108618597 | A | 10/2018 |
| CN | 108618651 | A | 10/2018 |
| CN | 108634771 | A | 10/2018 |
| CN | 108634777 | A | 10/2018 |
| CN | 108634807 | A | 10/2018 |
| CN | 108652431 | A | 10/2018 |
| CN | 108652432 | A | 10/2018 |
| CN | 108670021 | A | 10/2018 |
| CN | 108670023 | A | 10/2018 |
| CN | 108670048 | A | 10/2018 |
| CN | 108703644 | A | 10/2018 |
| CN | 108703645 | A | 10/2018 |
| CN | 108703675 | A | 10/2018 |
| CN | 207940738 | U | 10/2018 |
| CN | 207940739 | U | 10/2018 |
| CN | 207940743 | U | 10/2018 |
| CN | 207940754 | U | 10/2018 |
| CN | 106580073 | B | 11/2018 |
| CN | 108720548 | A | 11/2018 |
| CN | 108720577 | A | 11/2018 |
| CN | 108720581 | A | 11/2018 |
| CN | 108720584 | A | 11/2018 |
| CN | 108720585 | A | 11/2018 |
| CN | 108720586 | A | 11/2018 |
| CN | 108720633 | A | 11/2018 |
| CN | 108720650 | A | 11/2018 |
| CN | 108732958 | A | 11/2018 |
| CN | 108771466 | A | 11/2018 |
| CN | 108771488 | A | 11/2018 |
| CN | 108771489 | A | 11/2018 |
| CN | 108784323 | A | 11/2018 |
| CN | 108784324 | A | 11/2018 |
| CN | 108784330 | A | 11/2018 |
| CN | 108784401 | A | 11/2018 |
| CN | 108814274 | A | 11/2018 |
| CN | 108836104 | A | 11/2018 |
| CN | 108836105 | A | 11/2018 |
| CN | 108836107 | A | 11/2018 |
| CN | 108836108 | A | 11/2018 |
| CN | 108836131 | A | 11/2018 |
| CN | 108851966 | A | 11/2018 |
| CN | 108851969 | A | 11/2018 |

(56) References Cited

FOREIGN PATENT DOCUMENTS

| | | | |
|---|---|---|---|
| CN | 108888087 A | 11/2018 |
| CN | 108888099 A | 11/2018 |
| CN | 108903620 A | 11/2018 |
| CN | 108903621 A | 11/2018 |
| CN | 208031026 U | 11/2018 |
| CN | 208031027 U | 11/2018 |
| CN | 208031028 U | 11/2018 |
| CN | 208081098 U | 11/2018 |
| CN | 208081104 U | 11/2018 |
| CN | 208081108 U | 11/2018 |
| CN | 106419520 B | 12/2018 |
| CN | 106419526 B | 12/2018 |
| CN | 108926239 A | 12/2018 |
| CN | 108926249 A | 12/2018 |
| CN | 108937520 A | 12/2018 |
| CN | 108937525 A | 12/2018 |
| CN | 108937556 A | 12/2018 |
| CN | 108937558 A | 12/2018 |
| CN | 108937559 A | 12/2018 |
| CN | 108937560 A | 12/2018 |
| CN | 108937629 A | 12/2018 |
| CN | 108955959 A | 12/2018 |
| CN | 108968659 A | 12/2018 |
| CN | 108968660 A | 12/2018 |
| CN | 108968662 A | 12/2018 |
| CN | 108968663 A | 12/2018 |
| CN | 108968667 A | 12/2018 |
| CN | 108968668 A | 12/2018 |
| CN | 108968669 A | 12/2018 |
| CN | 108991918 A | 12/2018 |
| CN | 108991919 A | 12/2018 |
| CN | 109008595 A | 12/2018 |
| CN | 109008598 A | 12/2018 |
| CN | 109008663 A | 12/2018 |
| CN | 109008669 A | 12/2018 |
| CN | 109077624 A | 12/2018 |
| CN | 208192913 U | 12/2018 |
| CN | 208192914 U | 12/2018 |
| CN | 208192915 U | 12/2018 |
| CN | 208192916 U | 12/2018 |
| CN | 208192917 U | 12/2018 |
| CN | 208192920 U | 12/2018 |
| CN | 208192921 U | 12/2018 |
| CN | 208211922 U | 12/2018 |
| CN | 208228802 U | 12/2018 |
| CN | 208259529 U | 12/2018 |
| CN | 106562666 B | 1/2019 |
| CN | 106606293 B | 1/2019 |
| CN | 106724784 B | 1/2019 |
| CN | 106820956 B | 1/2019 |
| CN | 106820957 B | 1/2019 |
| CN | 107019417 B | 1/2019 |
| CN | 109106231 A | 1/2019 |
| CN | 109247837 A | 1/2019 |
| CN | 109276159 A | 1/2019 |
| CN | 208300842 U | 1/2019 |
| CN | 208319025 U | 1/2019 |
| CN | 208319027 U | 1/2019 |
| CN | 208371607 U | 1/2019 |
| CN | 208435215 U | 1/2019 |
| CN | 109363520 A | 2/2019 |
| CN | 208463763 U | 2/2019 |
| CN | 208510802 U | 2/2019 |
| CN | 106388566 B | 3/2019 |
| CN | 107174116 B | 3/2019 |
| CN | 107174117 B | 3/2019 |
| CN | 109393957 A | 3/2019 |
| CN | 109394005 A | 3/2019 |
| CN | 208551168 U | 3/2019 |
| CN | 208551408 U | 3/2019 |
| CN | 208610644 U | 3/2019 |
| CN | 208610659 U | 3/2019 |
| CN | 208625445 U | 3/2019 |
| CN | 109567612 A | 4/2019 |
| CN | 109567619 A | 4/2019 |
| CN | 109589011 A | 4/2019 |
| CN | 109602265 A | 4/2019 |
| CN | 109605463 A | 4/2019 |
| CN | 109662607 A | 4/2019 |
| CN | 109674357 A | 4/2019 |
| CN | 109681927 A | 4/2019 |
| CN | 208709591 U | 4/2019 |
| CN | 208740748 U | 4/2019 |
| CN | 208755746 U | 4/2019 |
| CN | 208755752 U | 4/2019 |
| CN | 208755753 U | 4/2019 |
| CN | 208755759 U | 4/2019 |
| CN | 208784365 U | 4/2019 |
| CN | 109744849 A | 5/2019 |
| CN | 109793430 A | 5/2019 |
| CN | 208837695 U | 5/2019 |
| CN | 208851291 U | 5/2019 |
| CN | 208864113 U | 5/2019 |
| CN | 208909747 U | 5/2019 |
| CN | 208909883 U | 5/2019 |
| CN | 105640308 A | 6/2019 |
| CN | 105996805 B | 6/2019 |
| CN | 109870938 A | 6/2019 |
| CN | 208941868 U | 6/2019 |
| CN | 208973499 U | 6/2019 |
| CN | 208973501 U | 6/2019 |
| CN | 208973502 U | 6/2019 |
| CN | 208973503 U | 6/2019 |
| CN | 208973504 U | 6/2019 |
| CN | 208973507 U | 6/2019 |
| CN | 208988575 U | 6/2019 |
| CN | 209003634 U | 6/2019 |
| CN | 106108697 B | 7/2019 |
| CN | 209058897 U | 7/2019 |
| CN | 209090836 U | 7/2019 |
| CN | 209090929 U | 7/2019 |
| CN | 209090938 U | 7/2019 |
| CN | 209090939 U | 7/2019 |
| CN | 209090943 U | 7/2019 |
| CN | 209090950 U | 7/2019 |
| CN | 209090955 U | 7/2019 |
| CN | 209090956 U | 7/2019 |
| CN | 209090957 U | 7/2019 |
| CN | 209202775 U | 8/2019 |
| CN | 209220022 U | 8/2019 |
| CN | 209269447 U | 8/2019 |
| CN | 209285276 U | 8/2019 |
| CN | 209300780 U | 8/2019 |
| CN | 209315656 U | 8/2019 |
| CN | 209315657 U | 8/2019 |
| CN | 209360444 U | 9/2019 |
| CN | 209360464 U | 9/2019 |
| CN | 209436923 U | 9/2019 |
| CN | 209436924 U | 9/2019 |
| CN | 209436925 U | 9/2019 |
| CN | 209436942 U | 9/2019 |
| CN | 209437002 U | 9/2019 |
| CN | 209450331 U | 10/2019 |
| CN | 209518767 U | 10/2019 |
| CN | 209528876 U | 10/2019 |
| CN | 209547775 U | 10/2019 |
| CN | 209564018 U | 11/2019 |
| CN | 209610822 U | 11/2019 |
| CN | 209610824 U | 11/2019 |
| CN | 209610827 U | 11/2019 |
| CN | 209629508 U | 11/2019 |
| CN | 209644658 U | 11/2019 |
| CN | 209733609 U | 12/2019 |
| CN | 209750794 U | 12/2019 |
| CN | 209826266 U | 12/2019 |
| CN | 209826275 U | 12/2019 |
| CN | 209863297 U | 12/2019 |
| CN | 110680203 A | 1/2020 |
| CN | 110876559 A | 3/2020 |
| CN | 210185391 U | 3/2020 |
| CN | 111374527 A | 7/2020 |
| CN | 111381503 A | 7/2020 |
| CN | 210961472 U | 7/2020 |
| DE | 2705168 A1 | 8/1978 |

(56) References Cited

FOREIGN PATENT DOCUMENTS

| | | | |
|---|---|---|---|
| DE | 2753827 A1 | 6/1979 |
| DE | 102011002821 A1 | 7/2012 |
| DE | 202017102536 U1 | 8/2018 |
| EP | 0269629 A1 | 6/1988 |
| EP | 0926293 A1 | 6/1999 |
| EP | 1767860 A1 | 3/2007 |
| EP | 2003400 A2 | 12/2008 |
| EP | 2020574 A2 | 2/2009 |
| EP | 2910856 A1 | 8/2015 |
| EP | 2976977 A1 | 1/2016 |
| EP | 3165134 A1 | 5/2017 |
| EP | 2904953 B1 | 12/2018 |
| EP | 3491980 A1 | 6/2019 |
| FR | 2409736 A1 | 6/1979 |
| GB | 0320607 | 10/2003 |
| GB | 2398628 A | 8/2004 |
| GB | 2479384 A | 10/2011 |
| IN | 206867128 U | 1/2018 |
| IN | 208909882 U | 5/2019 |
| JP | S5827524 A | 2/1983 |
| JP | H09164074 A | 6/1997 |
| JP | 10028643 A | 2/1998 |
| JP | 2001190405 A | 7/2001 |
| JP | 2005147604 A | 6/2005 |
| JP | 2007007027 A | 1/2007 |
| JP | 2008018122 A | 1/2008 |
| JP | 2009291417 A | 12/2009 |
| JP | 2011010786 A | 1/2011 |
| JP | 2013106850 A | 6/2013 |
| JP | 3186023 U | 9/2013 |
| JP | 2014200627 A | 10/2014 |
| JP | 2014204770 A | 10/2014 |
| JP | 2015145778 A | 8/2015 |
| WO | 8911773 A1 | 11/1989 |
| WO | 9837796 A1 | 9/1998 |
| WO | 9930086 | 6/1999 |
| WO | 0044096 | 7/2000 |
| WO | 0049839 A1 | 8/2000 |
| WO | 2006122643 A1 | 11/2006 |
| WO | 2006132612 A1 | 12/2006 |
| WO | 2009043812 A1 | 4/2009 |
| WO | 9952328 A1 | 10/2009 |
| WO | 2012051508 A2 | 4/2012 |
| WO | 2015006891 A1 | 1/2015 |
| WO | 2015028940 A1 | 3/2015 |
| WO | 2018058384 A1 | 4/2015 |
| WO | 2015081549 A1 | 6/2015 |
| WO | 2016007002 A1 | 1/2016 |
| WO | 2016012908 A1 | 1/2016 |
| WO | 2016028549 A1 | 2/2016 |
| WO | 2016091063 A1 | 6/2016 |
| WO | 2016141009 A1 | 9/2016 |
| WO | 2016148492 A1 | 9/2016 |
| WO | 2016154114 A1 | 9/2016 |
| WO | 2016165198 A1 | 10/2016 |
| WO | 2016171385 A1 | 10/2016 |
| WO | 2016182975 A1 | 11/2016 |
| WO | 2016189440 | 12/2016 |
| WO | 2016193008 A1 | 12/2016 |
| WO | 2016193643 A1 | 12/2016 |
| WO | 2017005533 A1 | 1/2017 |
| WO | 2017039091 A1 | 3/2017 |
| WO | 2017045387 A1 | 3/2017 |
| WO | 2017049635 A1 | 3/2017 |
| WO | 2017049717 A1 | 3/2017 |
| WO | 2017050693 A2 | 3/2017 |
| WO | 2017063872 A1 | 4/2017 |
| WO | 2017072068 A1 | 5/2017 |
| WO | 2017074119 A1 | 5/2017 |
| WO | 2017076797 A1 | 5/2017 |
| WO | 2017081420 A1 | 5/2017 |
| WO | 2017085026 A1 | 5/2017 |
| WO | 2017085671 A1 | 5/2017 |
| WO | 2017085673 A1 | 5/2017 |
| WO | 2017086543 A1 | 5/2017 |
| WO | 2017092062 A1 | 6/2017 |
| WO | 2017092063 A1 | 6/2017 |
| WO | 2017094968 A1 | 6/2017 |
| WO | 2017097790 A1 | 6/2017 |
| WO | 2017104892 A1 | 6/2017 |
| WO | 2017104894 A1 | 6/2017 |
| WO | 2017104895 A1 | 6/2017 |
| WO | 2017104896 A1 | 6/2017 |
| WO | 2017104898 A1 | 6/2017 |
| WO | 2017104900 A1 | 6/2017 |
| WO | 2017105076 A2 | 6/2017 |
| WO | 2017111425 A1 | 6/2017 |
| WO | 2017121691 A1 | 7/2017 |
| WO | 2017127655 A1 | 7/2017 |
| WO | 2017144795 A1 | 8/2017 |
| WO | 2017149519 A1 | 9/2017 |
| WO | 2017152518 A1 | 9/2017 |
| WO | 2017153360 A1 | 9/2017 |
| WO | 2017158068 A1 | 9/2017 |
| WO | 2017166317 A1 | 10/2017 |
| WO | 2017177007 A1 | 10/2017 |
| WO | 2017177423 A1 | 10/2017 |
| WO | 2017178229 A1 | 10/2017 |
| WO | 2017178650 A1 | 10/2017 |
| WO | 2017178739 A1 | 10/2017 |
| WO | 2017179804 A1 | 10/2017 |
| WO | 201795777 A1 | 11/2017 |
| WO | 2017191377 A1 | 11/2017 |
| WO | 2017191395 A1 | 11/2017 |
| WO | 2017197482 A1 | 11/2017 |
| WO | 2017198815 A1 | 11/2017 |
| WO | 2017198848 A1 | 11/2017 |
| WO | 2017201530 A1 | 11/2017 |
| WO | 2017202641 A1 | 11/2017 |
| WO | 2017209465 A1 | 12/2017 |
| WO | 2017211045 A1 | 12/2017 |
| WO | 2017213330 A2 | 12/2017 |
| WO | 2017213423 A1 | 12/2017 |
| WO | 2017215926 A1 | 12/2017 |
| WO | 2017215988 A1 | 12/2017 |
| WO | 2018004226 A1 | 1/2018 |
| WO | 2018007218 A1 | 1/2018 |
| WO | 2018014806 A1 | 1/2018 |
| WO | 2018015695 A1 | 1/2018 |
| WO | 2017077571 A1 | 2/2018 |
| WO | 2018018670 A1 | 2/2018 |
| WO | 2018023863 A1 | 2/2018 |
| WO | 2018024781 A1 | 2/2018 |
| WO | 2018024782 A1 | 2/2018 |
| WO | 2018024783 A1 | 2/2018 |
| WO | 2018026041 A1 | 2/2018 |
| WO | 2018026906 A1 | 2/2018 |
| WO | 2018026928 A1 | 2/2018 |
| WO | 2018032540 A1 | 2/2018 |
| WO | 2018032541 A1 | 2/2018 |
| WO | 2018032542 A1 | 2/2018 |
| WO | 2018032589 A1 | 2/2018 |
| WO | 2018032648 A1 | 2/2018 |
| WO | 2018037177 A1 | 3/2018 |
| WO | 2018040250 A1 | 3/2018 |
| WO | 2018041536 A1 | 3/2018 |
| WO | 2018045643 A1 | 3/2018 |
| WO | 2018050520 A1 | 3/2018 |
| WO | 2018050838 A1 | 3/2018 |
| WO | 2018058569 A1 | 4/2018 |
| WO | 2018058740 A1 | 4/2018 |
| WO | 2018059994 A1 | 4/2018 |
| WO | 2018060260 A1 | 4/2018 |
| WO | 2018060273 A1 | 4/2018 |
| WO | 2018060331 A1 | 4/2018 |
| WO | 2018065424 A1 | 4/2018 |
| WO | 2018068376 A1 | 4/2018 |
| WO | 2018068425 A1 | 4/2018 |
| WO | 2018068976 A1 | 4/2018 |
| WO | 2018076164 A1 | 5/2018 |
| WO | 2018076166 A1 | 5/2018 |
| WO | 2018076415 A1 | 5/2018 |
| WO | 2018082131 A1 | 5/2018 |
| WO | 2018090287 A1 | 5/2018 |

(56) References Cited

FOREIGN PATENT DOCUMENTS

| | | |
|---|---|---|
| WO | 2018093004 A1 | 5/2018 |
| WO | 2018095247 A1 | 5/2018 |
| WO | 2018095420 A1 | 5/2018 |
| WO | 2018095949 A1 | 5/2018 |
| WO | 2018120561 A1 | 5/2018 |
| WO | 2017104893 A1 | 6/2018 |
| WO | 2018099233 A1 | 6/2018 |
| WO | 2018102128 A1 | 6/2018 |
| WO | 2018104351 A1 | 6/2018 |
| WO | 2018107522 A1 | 6/2018 |
| WO | 2018107973 A1 | 6/2018 |
| WO | 2018116056 A1 | 6/2018 |
| WO | 2018116057 A1 | 6/2018 |
| WO | 2018121166 A1 | 7/2018 |
| WO | 2018121199 A1 | 7/2018 |
| WO | 2018133993 A1 | 7/2018 |
| WO | 2018137832 A1 | 8/2018 |
| WO | 2018140954 A1 | 8/2018 |
| WO | 2018147640 A1 | 8/2018 |
| WO | 2018165698 A1 | 9/2018 |
| WO | 2018191960 A1 | 10/2018 |
| WO | 2018197720 A1 | 11/2018 |
| WO | 2018207221 A1 | 11/2018 |
| WO | 2018212473 A1 | 11/2018 |
| WO | 2018220659 A1 | 12/2018 |
| WO | 2018223713 A1 | 12/2018 |
| WO | 2019032876 A1 | 2/2019 |
| WO | 2019032878 A1 | 2/2019 |
| WO | 2019064319 A1 | 4/2019 |
| WO | 2019066747 A1 | 4/2019 |
| WO | 2019082210 A1 | 5/2019 |
| WO | 2019097545 A1 | 5/2019 |
| WO | 2019104818 A1 | 6/2019 |
| WO | 2019110340 A1 | 6/2019 |
| WO | 2019129598 A1 | 7/2019 |
| WO | 2019130011 A1 | 7/2019 |
| WO | 2019132150 A1 | 7/2019 |
| WO | 2019136785 A1 | 7/2019 |
| WO | 2019141207 A1 | 7/2019 |
| WO | 2019153512 A1 | 8/2019 |
| WO | 2019153807 A1 | 8/2019 |
| WO | 2019183755 A1 | 10/2019 |
| WO | 2019185321 A1 | 10/2019 |
| WO | 2019207325 A1 | 10/2019 |
| WO | 2019219018 A1 | 11/2019 |
| WO | 2019227766 A1 | 12/2019 |
| WO | 2019238605 A1 | 12/2019 |
| WO | 2019238794 A1 | 12/2019 |
| WO | 2019243093 A1 | 12/2019 |
| WO | 2019243922 A1 | 12/2019 |
| WO | 2020000046 A1 | 1/2020 |
| WO | 2020002064 A1 | 1/2020 |
| WO | 2020010513 A1 | 1/2020 |
| WO | 2020016084 A1 | 1/2020 |
| WO | 2020016085 A1 | 1/2020 |
| WO | 2020029519 A1 | 2/2020 |
| WO | 2020029520 A1 | 2/2020 |
| WO | 2020030462 A1 | 2/2020 |
| WO | 2020052010 A1 | 3/2020 |
| WO | 2020062651 A1 | 4/2020 |
| WO | 2020070198 A1 | 4/2020 |
| WO | 2020071590 A1 | 4/2020 |
| WO | 2020074178 A1 | 4/2020 |
| WO | 2020074476 A1 | 4/2020 |
| WO | 2020078010 A1 | 4/2020 |
| WO | 2020078403 A1 | 4/2020 |
| WO | 2020078836 A1 | 4/2020 |
| WO | 2020080738 A1 | 4/2020 |
| WO | 2020082329 A1 | 4/2020 |
| WO | 2020082854 A1 | 4/2020 |
| WO | 2020091531 A1 | 5/2020 |
| WO | 2020093417 A1 | 5/2020 |
| WO | 2020094293 A1 | 5/2020 |
| WO | 2020098748 A1 | 5/2020 |
| WO | 2020098749 A1 | 5/2020 |
| WO | 2020099339 A1 | 5/2020 |
| WO | 2020099355 A1 | 5/2020 |
| WO | 2020108375 A1 | 6/2020 |
| WO | 2020108917 A1 | 6/2020 |
| WO | 2020127334 A1 | 6/2020 |
| WO | 2020134318 A1 | 7/2020 |
| WO | 2020148164 A1 | 7/2020 |
| WO | 2020148187 A1 | 7/2020 |
| WO | 2020163711 A1 | 8/2020 |

OTHER PUBLICATIONS

International Search Report for International Application No. PCT/US2020/017203; International Filing Date: Feb. 7, 2020; dated Jun. 4, 2020; 6 pages.
International Search Report for International Application No. PCT/US2020/017205; International Filing Date: Feb. 7, 2020; dated Jul. 16, 2020; 8 pages.
International Search Report for International Application No. PCT/US2020/19664; International Filing Date: Feb. 25, 2020; dated Jun. 4, 2020; 6 pages.
Invitation to Pay Additional Fees for International Application No. PCT/US2020/017205; International Filing Date: Feb. 7, 2020; dated May 19, 2020; 61 pages.
Written Opinion for International Application No. PCT/US2020/017203; International Filing Date: Feb. 7, 2020; dated Jun. 4, 2020; 10 pages.
U.S. Appl. No. 16/402,023, filed May 2, 2019; Non-Final Office Action dated Feb. 27, 2020; 25 pages.
Written Opinion for International Application No. PCT/US2020/017205; International Filing Date: Feb. 7, 2020; dated Jul. 16, 2020; 11 pages.
Written Opinion for International Application No. PCT/US2020/19664; International Filing Date: Feb. 25, 2020; dated Jun. 4, 2020; 10 pages.
U.S. Appl. No. 16/559,174, filed Sep. 3, 2019; Final Office Action dated Mar. 12, 2020; 1-35 pages.
Written Opinion for International Application No. PCT/US2019/065662 filed Dec. 11, 2019; dated Mar. 25, 2020; 7 pages.
Civil Action No. 19-cv-24114, U.S. District Court, Southern District of Florida; Complaint; Plaintiff SharkNInja Operating LLC for Compaint for Patent Infringement and Demand for Jury Trial against Defendants Tristar Products, Inc. and Emeril Lagasse (Entered: Oct. 4, 2019) pp. 1-194.
Civil Action No. 19-cv-24114, U.S. District Court, Southern District of Florida; Defendant Emeril Lagasse's Motion To Dismiss for Improper Venue; *SharkNinja OPerating LLC* (Plaintiff) v. *Tristar Products, Inc. and Emeril Lagasse* (Defendants); Document 24 (Entered: Nov. 29, 2019) pp. 1-6.
Civil Action No. 19-cv-24114, U.S. District Court, Southern District of Florida; Defendant Tristar Products Inc.'s Answer To Plaintiff's Complaint and Counterclaims; *SharkNinja Operating LLC* (Plaintiff) v *Emeril Lagasse* (Defandant) and *Tristar Products, Inc.* (Defandant/Counterclaim Plaintiff) v *SharkNinja OPerating LLC, Daniel R. Gibson, Cantor Colburn LLP, Pedro Lopez-Baldrich* (Counterclaim Defendants); Document 25 (Entered: Nov. 29, 2019) pp. 1-36.
U.S. Appl. No. 16/402,023, filed May 2, 2019; Final Office Action dated Oct. 28, 2019; 1-27 pages.
U.S. Appl. No. 16/548,562, filed Aug. 22, 2019; Non-Final Office Action dated Oct. 25, 2019; 1-20 pages.
U.S. Appl. No. 16/357,243, filed Mar. 18, 2019; Notice of Allowance dated Oct. 15, 2019; pp. 1-9.
U.S. Appl. No. 16/559,174, filed Sep. 3, 2019; Non-Final Office Action dated Oct. 11, 2019; 1-10 pages.
U.S. Appl. No. 16/357,238, filed Mar. 18, 2019; Final Office Action dated Oct. 8, 2019; 1-13 pages.
U.S. Appl. No. 16/357,175, filed Mar. 18, 2019; Final Office Action dated Sep. 30, 2019; 1-17 pages.
U.S. Appl. No. 16/357,194, filed Mar. 18, 2019; Final Office Action dated Sep. 30, 2019; 1-17 pages.
U.S. Appl. No. 16/357,223, filed Mar. 18, 2019; Final Office Action dated Oct. 3, 2019; 1-7 pages.

(56) References Cited

OTHER PUBLICATIONS

U.S. Appl. No. 16/402,035, filed May 2, 2019; Non-Final Office Action dated Aug. 8, 2019; 191 pages.
U.S. Appl. No. 16/357,141, filed Mar. 18, 2019; Final Office Action dated Aug. 30, 2019; 20 pages.
U.S. Appl. No. 16/357,251, filed Mar. 18, 2019; Non-Final Office Action dated Aug. 1, 2019; 186 pages.
U.S. Appl. No. 16/357,250, filed Mar. 18, 2019; Final Office Action dated Sep. 13, 2019; 1-14 pages.
U.S. Appl. No. 16/357,280, filed Mar. 18, 2019; Final Office Action dated Sep. 13, 2019; 1-11 pages.
U.S. Appl. No. 16/357,141, filed Mar. 18, 2019; Interview Summary dated Jun. 17, 2019; 1-3 pages.
U.S. Appl. No. 16/357,238, filed Mar. 18, 2019; Interview Summary dated Jun. 26, 2019; 1-4 pages.
U.S. Appl. No. 16/357,250, filed Mar. 18, 2019; Interview Summary dated Jun. 17, 2019; 1-4 pages.
U.S. Appl. No. 16/357,274, filed Mar. 18, 2019; Interview Summary dated Jun. 5, 2019; 1-3 pages.
U.S. Appl. No. 16/357,276, filed Mar. 18, 2019; Interview Summary dated Jun. 5, 2019; 1-4 pages.
U.S. Appl. No. 16/357,277, filed Mar. 18, 2019; Interview Summary dated Jun. 3, 2019; 1-4 pages.
U.S. Appl. No. 16/357,279, filed Mar. 18, 2019; Interview Summary dated Jun. 19, 2019; 1-4 pages.
U.S. Appl. No. 16/357,280, filed Mar. 18, 2019; Interview Summary dated Jun. 17, 2019; 1-3 pages.
U.S. Appl. No. 16/357,282, filed Mar. 18, 2019; Non-Final Office Action dated Jun. 27, 2019; 19 pages.
Gill et al.; U.S. Appl. No. 16/059,874, filed Aug. 9, 2018; Cooking Device and Components Thereof.
Gill et al.; U.S. Appl. No. 16/059,876, filed Aug. 9, 2018; Cooking Device and Components Thereof.
U.S. Appl. No. 16/357,175, filed Mar. 18, 2019; Non-Final Office Action dated May 16, 2019; 49 pages.
U.S. Appl. No. 16/357,194, filed Mar. 18, 2019; Non-Final Office Action dated May 17, 2019; 51 pages.
U.S. Appl. No. 16/357,223, filed Mar. 1, 2019; Non-Final Office Action dated May 23, 2019; 11 pages.
U.S. Appl. No. 16/357,227, filed Mar. 18, 2019; Non-Final Office Action dated May 23, 2019; 10 pages.
U.S. Appl. No. 16/357,234, filed Mar. 18, 2019; Non-Final Office Action dated May 24, 2019; 12 pages.
U.S. Appl. No. 16/357,238, filed Mar. 18, 2019; Non-Final Office Action dated May 28, 2019; 32 pages.
U.S. Appl. No. 16/357,250, filed Mar. 18, 2019; Non-Final Office Action dated May 24, 2019; 18 pages.
U.S. Appl. No. 16/357,270, filed Mar. 18, 2019; Non-Final Office Action dated Jun. 14, 2019; 16 pages.
U.S. Appl. No. 16/357,271, filed Mar. 18, 2019; Non-Final OA dated May 15, 2019; 7 pages.
U.S. Appl. No. 16/357,273, filed Mar. 8, 2019; Non-Final Office Action dated May 17, 2019; 8 pages.
U.S. Appl. No. 16/357,274, filed Mar. 18, 2019; Non-Final Office Action dated May 10, 2019; 7 pages.
U.S. Appl. No. 16/357,276, filed Mar. 18, 2019; Non-Final Office Action dated May 10, 2019; 7 pages.
U.S. Appl. No. 16/357,277, filed Mar. 18, 2019; Non-Final Office Action dated May 9, 2019; 9 pages.
U.S. Appl. No. 16/357,279, filed Mar. 18, 2019; Non-Final Office Action dated May 30, 2019; 9 pages.
U.S. Appl. No. 16/357,280, filed Mar. 18, 2019; Non-Final Office Action dated May 14, 2019; 8 pages.
U.S. Appl. No. 16/402,023, filed May 2, 2019; Non-Final Office Action dated May 30, 2019; 25 pages.
U.S. Appl. No. 16/357,141, filed Mar. 18, 2019; Non-Final Office Action dated May 16, 2019; 17 pages.
U.S. Appl. No. 16/357,243, filed Mar. 18, 2019; Non-Final Office Action dated Jun. 3, 2019; 24 pages.
U.S. Appl. No. 16/402,029, filed May 2, 2019; Non-Final Office Action dated Jun. 13, 2019; 9 pages.
Notification of Transmittal of the International Search Report of the International Searching Authority, or the Declaration. PCT/US2018/046077, dated Dec. 19, 2018, 7 pages.
Notification of Transmittal of the International Search Report of the International Searching Authority, or the Declaration; PCT/US2018/046079; dated Jan. 2, 2019, 7 pages.
Notification of Transmittal of the Written Opinion of the International Searching Authority, or the Declaration. PCT/US2018/046077, dated Dec. 19, 2018, 10 pages.
Notification of Transmittal of the Written Opinion of the International Searching Authority, or the Declaration; PCT/US2018/046079; dated Jan. 2, 2019, 10 pages.
WO2018122652A1: Jul. 5, 2018; English Abstract Only (3 Pages).
DeLonghl, [online]; [retrieved on Mar. 18, 2019]; retrieved from the Internethttps://www.delonghl.com/en-us/products/kitchen/kitchen-appliances/low-oil-fryer-and-multicooker/multifry-fh11631bk-0125392006?TabSegment=support#supportDeLonghi, "FH1163 FH1363 MultiFry", DeLonghi Instruction Manual, www.delonghi.com, 5712511041/05.15, pp. 1-11.
DeLonghi, [online]; [retrieved on Mar. 18, 2019]; retrieved from the Internethttps://www.delonghi.com/en-us/products/kitchen/kitchen-appliances/low-oil-fryer-and-multicooker/multifry-fh11631bk-0125392006?TabSegment=support#/supportDeLonghi, "FH1163 FH1363 MultiFry", DeLonghi Instruction Manual, www.delonghi.com, 5712511041/05.15, pp. 1-11.
Hip Cooking, [online]; [retrieved on Nov. 25, 2019]; retrieved from the Internethttps://www.hippressurecooking.com/pressure-cooker-psi-faq-the-stuff-you-didnt-think-to-ask/Laura Pazzaglia, "Pressure Cooker PSI FAQ: The Stuff You Didn't Think to Ask about Pressure," Hip Cooking, Apr. 7, 2013, pp. 1-26.
U.S. Appl. No. 16/402,029, filed May 2, 2019; Final Office Action dated Dec. 31, 2019; pp. 1-6.
U.S. Appl. No. 16/402,029, filed May 2, 2019; Final Office Action dated Mar. 5, 2020; 10 pages.
U.S. Appl. No. 16/402,029, filed May 2, 2019; Non-Final Office Action dated Aug. 24, 2020; 27 pages.
U.S. Appl. No. 16/559,174, filed Sep. 3, 2019; Non-Final Office Action dated Aug. 28, 2020; 58 pages.
U.S. Appl. No. 16/678,628, filed Nov. 8, 2019; Notice of Allowance dated Sep. 21, 2020; 9 pages.
U.S. Appl. No. 16/357,238, filed Mar. 18, 2019; Non-Final Office Action dated Jan. 14, 2021; 74 pages.
U.S. Appl. No. 16/671,972, filed Nov. 1, 2019; Final Office Action dated Feb. 24, 2021; 59 pages.
U.S. Appl. No. 17/139,236, filed Dec. 31, 2020; Non-Final Office Action dated Mar. 8, 2021; 307 pages.
U.S. Appl. No. 17/139,283, filed Dec. 31, 2020; Non-Final Office Action dated Mar. 10, 2021; 309 pages.
U.S. Appl. No. 17/139,314, filed Dec. 31, 2020; Non-Final Office Action dated Mar. 23, 2021; 310 pages.
U.S. Appl. No. 17/139,572, filed Dec. 31, 2020; Non-Final Office Action dated Mar. 11, 2021; 292 pages.
U.S. Appl. No. 17/139,599, filed Dec. 31, 2020; Non-Final Office Action dated Feb. 23, 2021; 9 pages.
U.S. Appl. No. 17/139,602, filed Dec. 31, 2020; Non-Final Office Action dated Feb. 22, 2021; 33 pages.
Chinese Application No. 201910557433.X filed Jun. 25, 2019; First Office Action with English Translation; 12 pages.
Invitation to Pay Additional Fees for International Application No. PCT/US2020/019685; International Filing Date: Feb. 25, 2020; dated Oct. 13, 2020; 11 pages.
Chinese Patent Application No. 2019105638416 filed Jun. 26, 2019; Office Action with English Translation dated Nov. 3, 2020; 16 pages.
Japanese Patent Application No. 2020-030583 filed Feb. 26, 2020; Office Action with English Translation dated Nov. 10, 2020; 13 pages.
Japanese Patent Application No. 2020-030584 filed Feb. 26, 2020; Office Action with English Translation; 6 pages.
U.S. Appl. No. 16/402,023, filed May 2, 2019; Final Office Action dated Nov. 17, 2020; 26 pages.

(56) References Cited

OTHER PUBLICATIONS

U.S. Appl. No. 16/678,628, filed Nov. 8, 2019; Non-Final Office Action dated Nov. 2, 2020; 53 pages.
Japanese Application No. 2020-030587 filed Feb. 26, 2020; Japanese Office Action with English Translation dated Dec. 8, 2020; 4 pages.
Japanese Application No. 2020-030585 filed Feb. 26, 2020; Japanese Office Action with English Translation dated Dec. 8, 2020; 4 pages.
U.S. Appl. No. 17/084,891, filed Oct. 30, 2020; Third Party Submission Under 37 CFR 1.290 dated Dec. 8, 2020; 72 pages.
Chinese Application No. 2019105566386 filed Jun. 25, 2019; Office Action with English Translation dated Sep. 9, 2020; 11 pages.
International Search Report for International Application No. PCT/US2020/019685; International Filing Date: Feb. 25, 2020; dated Dec. 8, 2020; 8 pages.
Written Opinion for International Application No. PCT/US2020/019685; International Filing Date: Feb. 25, 2020; dated Dec. 8, 2020; 12 pages.
Japanese Application No. 2020-030586 filed Feb. 26, 2020; Japanese Office Action with English Translation dated Dec. 8, 2020; 6 pages.
Japanese Application No. 2020-030582 filed Feb. 26, 2020; Japanese Office Action with English Translation dated Dec. 8, 2020; 8 pages.
U.S. Appl. No. 16/357,270, filed Mar. 18, 2019; Non-Final Office Action dated Dec. 21, 2020; 32 pages.
U.S. Appl. No. 16/671,709, filed Nov. 1, 2019; Final Office Action dated Jan. 1, 2021; 29 pages.
U.S. Appl. No. 16/402,023, filed May 2, 2019, Cooking Device and Components Thereof.
U.S. Appl. No. 16/559,174, filed Sep. 3, 2019, Cooking Device and Components Thereof.
U.S. Appl. No. 16/402,029, filed May 2, 2019, Cooking Device and Components Thereof.
U.S. Appl. No. 16/402,035, filed May 2, 2019, Cooking Device and Components Thereof.
U.S. Appl. No. 16/678,628, filed Nov. 8, 2019, Cooking Device and Components Thereof.
U.S. Appl. No. 17/331,175, filed May 26, 2021, Cooking Device and Components Thereof.
U.S. Appl. No. 17/324,716, filed May 19, 2021, Cooking Device and Components Thereof.

* cited by examiner

COOKING DEVICE AND COMPONENTS THEREOF

CROSS-REFERENCE TO RELATED APPLICATIONS

This application is a continuation of U.S. application Ser. No. 16/402,029, filed May 2, 2019, which is a continuation of U.S. application Ser. No. 16/402,023, filed May 2, 2019, both of which claim the benefit of U.S. Provisional Application Ser. No. 62/810,249, filed Feb. 25, 2019, all of which are incorporated herein by reference in their entirety.

BACKGROUND

Embodiments of the present disclosure relate generally to a cooking system, and more specifically, to a countertop air grilling system operable in a plurality of distinct cooking modes.

SUMMARY

According to an embodiment, a cooking system includes a housing having a hollow interior and food is receivable within said hollow interior. A heating element is associated with the housing and a support body supports food within the hollow interior. The support body includes a body having a plurality of diffuser ribs. A plurality of channels is formed between the plurality of diffuser rib and at least one of the plurality of diffuser ribs and the plurality of channels is operable to deflect a relatively downward flowing fluid relatively horizontally across said support body.

In addition to one or more of the features described above, or as an alternative, in further embodiments said downward flowing fluid has a rotation, and said rotation of said downward flowing fluid is decreased as said downward flowing fluid contacts said support body.

In addition to one or more of the features described above, or as an alternative, in further embodiments said fluid enters said plurality of channels adjacent a periphery of said support body and is directed towards a relative center of said support body by at least one of said plurality of ribs and said plurality of channels, said fluid being exhausted from said relative center of said body having said rotational motion.

In addition to one or more of the features described above, or as an alternative, in further embodiments said plurality of diffuser ribs extend upwardly from said body into said hollow interior.

In addition to one or more of the features described above, or as an alternative, in further embodiments said support body further comprises a plurality of ribs.

In addition to one or more of the features described above, or as an alternative, in further embodiments said diffuser ribs are a part of said plurality of ribs.

In addition to one or more of the features described above, or as an alternative, in further embodiments said plurality of ribs include short ribs, intermediate ribs, and long ribs.

In addition to one or more of the features described above, or as an alternative, in further embodiments said diffuser ribs include said long ribs.

In addition to one or more of the features described above, or as an alternative, in further embodiments said diffuser ribs include said long ribs and said intermediate ribs.

In addition to one or more of the features described above, or as an alternative, in further embodiments said support body further comprises a plurality of openings extending through the body.

In addition to one or more of the features described above, or as an alternative, in further embodiments said support body has a thermal mass between about 200 g and about 3 kg.

In addition to one or more of the features described above, or as an alternative, in further embodiments said support body is formed from a metal material.

In addition to one or more of the features described above, or as an alternative, in further embodiments said support body is formed from a ferromagnetic material.

In addition to one or more of the features described above, or as an alternative, in further embodiments said support body is coated with a non-stick material.

In addition to one or more of the features described above, or as an alternative, in further embodiments comprising at least one handle extending from said support body. In addition to one or more of the features described above, or as an alternative, in further embodiments comprising a food container receivable in said hollow interior, said support body being removably mounted within an interior of said food container.

In addition to one or more of the features described above, or as an alternative, in further embodiments comprising a temperature sensor for monitoring at least one of a temperature within said hollow interior and a temperature of said support body, said temperature sensor being located remotely from said heating element.

In addition to one or more of the features described above, or as an alternative, in further embodiments said temperature sensor extends into said interior of said food container.

In addition to one or more of the features described above, or as an alternative, in further embodiments said temperature sensor extends through a sidewall of said food container.

In addition to one or more of the features described above, or as an alternative, in further embodiments said temperature sensor is operable to monitor if a temperature of said support body is above a minimum threshold for achieving a Maillard reaction with the food.

In addition to one or more of the features described above, or as an alternative, in further embodiments comprising a second temperature sensor for monitoring a temperature of a fluid circulating within said hollow interior.

In addition to one or more of the features described above, or as an alternative, in further embodiments said second temperature sensor is located downstream from said heating element relative to a flow of said fluid circulating with said hollow interior.

According to another embodiment, a cooking system includes a housing having a hollow interior and a container disposable within the hollow interior and including a bottom surface. The container defines a container cavity for receiving food to be cooked. A support body is positionable within the hollow interior to support food. The support body is disposable within the container cavity. The container cavity includes a clearance area between a bottom of the support body and the bottom surface of the container. A heating element operably coupled to the support body.

In addition to one or more of the features described above, or as an alternative, in further embodiments said heating element is embedded within said support body.

In addition to one or more of the features described above, or as an alternative, in further embodiments said container further comprises: a sidewall extending from said bottom surface and a step formed at a central portion of said sidewall, said support body being supportable on said step.

In addition to one or more of the features described above, or as an alternative, in further embodiments a diameter of said container adjacent a first side of said step is different than a diameter of said container adjacent a second side of said step.

In addition to one or more of the features described above, or as an alternative, in further embodiments said diameter of said container at said first side of said step is greater than said diameter of said container at said second side of said step.

In addition to one or more of the features described above, or as an alternative, in further embodiments said housing further comprises a ledge formed about at least a portion of said hollow interior, said container being supportable by said ledge.

In addition to one or more of the features described above, or as an alternative, in further embodiments when said container is disposed within said hollow interior, said step is positioned in overlapping arrangement with said ledge.

In addition to one or more of the features described above, or as an alternative, in further embodiments a liner defining said hollow interior defines said ledge.

In addition to one or more of the features described above, or as an alternative, in further embodiments said housing further comprises a spacer mounted within said hollow interior, said ledge being defined by said spacer.

In addition to one or more of the features described above, or as an alternative, in further embodiments comprising a temperature sensor for monitoring a temperature of said support body.

In addition to one or more of the features described above, or as an alternative, in further embodiments said temperature sensor is operable to monitor if a temperature of said support body is above a minimum threshold for achieving a Maillard reaction with said food.

In addition to one or more of the features described above, or as an alternative, in further embodiments said temperature sensor is operable to monitor if a temperature of said support body is approaching a smoke point.

In addition to one or more of the features described above, or as an alternative, in further embodiments said heating element is operably coupled to said temperature sensor, and operation of said heating element is adjusted in response to said temperature sensor determining that said temperature of said support body is approaching said smoke point.

In addition to one or more of the features described above, or as an alternative, in further embodiments said support body further comprises a base having a plurality of openings and plurality of diffuser ribs extending from said base.

In addition to one or more of the features described above, or as an alternative, in further embodiments said support body further comprises a plurality of channels formed between said plurality of diffuser ribs, at least one of said plurality of diffuser ribs and said plurality of channels being operable to impart rotational motion to a fluid flowing through said plurality of channels.

In addition to one or more of the features described above, or as an alternative, in further embodiments comprising another heating element associated with said housing.

In addition to one or more of the features described above, or as an alternative, in further embodiments comprising an air movement device operable to circulate an air flow through said hollow interior to impart non-contact cooking to said food.

In addition to one or more of the features described above, or as an alternative, in further embodiments comprising a lid movable relative to said housing, wherein said lid and said housing cooperate to define a cooking volume of the cooking system, said food being receivable within said cooking volume.

In addition to one or more of the features described above, or as an alternative, in further embodiments said another heating element is positioned within said lid adjacent an upper extent of said housing.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 2:
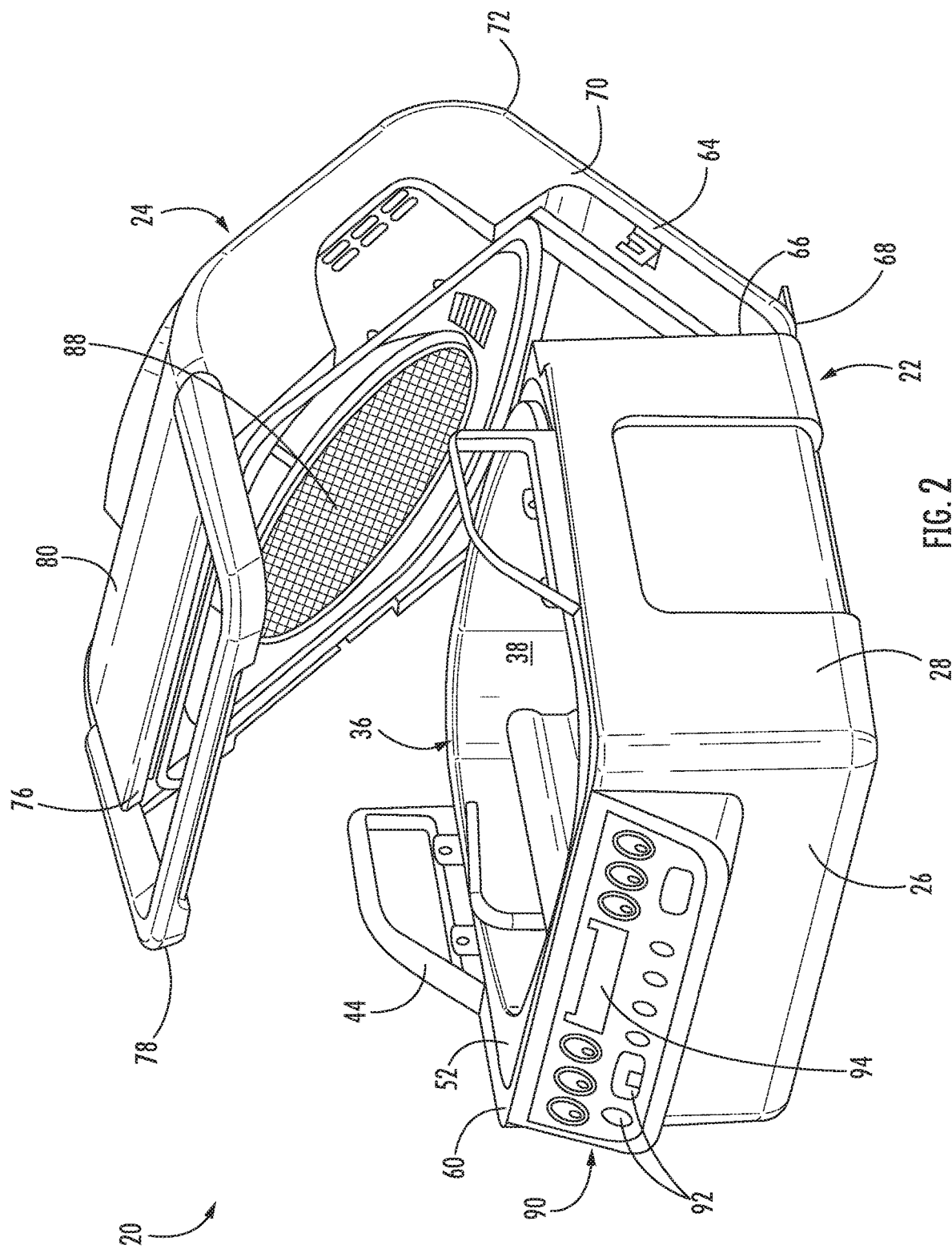
FIG. 2 is a front perspective view of the cooking system with the lid in an open position according to an embodiment.

With reference now to the FIGS., a cooking system is illustrated at numeral 20. As shown, the cooking system 20 includes a base 22 and a lid 24. The base 22 includes a housing 26 having an exterior, heat resistant or non-conductive surface 28 and an interior surface 30 that defines a hollow interior 32. The housing 26 may be made of any suitable material, such as glass, aluminum, plastic, or stainless steel for example. A liner 34 may be disposed within the hollow interior 32 of the housing 26. The liner 34 may be formed from any suitable conductive material, such as aluminum for example. In an embodiment, best shown in FIG. 2, the liner 34 forms the interior surface 30 of the housing 26 (see FIG. 4) and thereby defines the hollow interior 32 of the housing 26. Alternatively, the liner 34 may be offset form the interior surface 30 of the housing 26. However, it should be understood that other components of the cooking system 20, or surfaces thereof, may also define the hollow interior 32.

In an embodiment, a cooking container 36 is receivable inside the hollow interior defined by the liner 34. Although the cooking container 36 is described herein as being removable from the housing 26 of the base 22, embodiments where the cooking container 36 is integrally formed with the housing 26 are also contemplated herein. The cooking container 36, best shown in FIGS. 2 and 4-6, has an interior 38 designed to receive and retain food support structures for supporting one or more consumable products, such as food products for example, therein. Examples of food products suitable for use with the cooking system 20, include but are not limited to, meats, fish, poultry, bread, rice, grains, pasta, vegetables, fruits, and dairy products, among others. The cooking container 36 may be a pot formed from a ceramic, metal, or die cast aluminum material. In an embodiment, an interior surface 40 of the cooking container 36 includes a nano-ceramic coating and an exterior surface 42 of the cooking container 36 includes a silicone epoxy material. However, any suitable material capable of withstanding the high temperatures required for cooking food products is contemplated herein.

One or more handles 44 may be associated with the cooking container 36 to allow a user to easily grasp and manipulate the cooking container 36. In the illustrated, non-limiting embodiment, the cooking container 36 includes two handles 44 extending from opposing sidewalls 46 of the cooking container 36. The handles 44 may be movable or removably connected thereto, such as via one or more fasteners for example, or alternatively, may be integrally formed with a sidewall 46 of the cooking container 36. Although the cooking container 36 illustrated and described herein has two handles 44, embodiments having a single handle, more than two handles, or no handles are also contemplated herein. Further, any suitable configuration of the cooking container 36 and/or handles 44 is within the scope of the disclosure.

The cooking container 36 and/or the liner 34 may be configured to properly position the cooking container 36 within the liner 34. In an embodiment, best shown in FIG. 4 and FIG. 6, one or more bumpers 48 extend inwardly from the liner 34 to engage the exterior surface 42 of the cooking container 36. The bumpers 48 may be spaced equidistantly about the inner periphery of the liner 34 to center the cooking container 36. However, embodiments where the bumpers 48 are not equidistantly spaced, or embodiments having only a single bumper 48 are also contemplated herein.

Alternatively, or in addition, the cooking container 36 may be contoured to facilitate positioning of the cooking container 36 within the liner 34. In an embodiment, a cross-sectional area of the cooking container 36 varies over the height of the cooking container 36. For example, a step 50 may be formed in a central portion of the sidewall 46 of the cooking container 36. Accordingly, a first portion of the cooking container 36 extends between an upper surface 52 of the cooking container 36 and the step 50, and a second portion of the cooking container 36 extends between the step 50 and a bottom 54 of the cooking container 36. As a result of the horizontal offset created by the step 50, the diameter of the first portion of the cooking container 36 is larger than the diameter of the second portion of the cooking container 36. In an embodiment, the step 50 is located near, but offset from, the bottom 54 of the cooking container 36. Further, the step 50 may extend over the entire inner periphery of the cooking container 36, or alternatively, over only select portions thereof.

In an embodiment, the step 50 is sized and shaped to cooperate, for example overlap or mate with, another component of the cooking system 20 to position the cooking container 36 relative to the base 22. For example, a spacer 56 (best shown in FIG. 6) may be mounted within the hollow interior 32 defined by the liner 34, and the step 50 may directly engage the spacer 56 when the cooking container 36 is installed within the liner 34. Alternatively, a ledge 58 as shown in FIG. 7, complementary to the step 50, may be affixed to or integrally formed with the liner 34 such that when the cooking container 36 is inserted into the liner 34, the step 50 and ledge 58 align to seat the cooking container 36 in a desired manner.

One or more accessories or support bodies (to be described in more detail below), may be compatible for use with the cooking system 20. In such embodiments, the accessories or support bodies may be receivable within the hollow interior 32 of the liner 34, or alternatively, within the interior of the cooking container 36. In an embodiment, an accessory or support body compatible for use with the cooking container 36 is supported by the step 50 of the cooking container 36 rather than the bottom 54 thereof. However, other accessories or support bodies that may be supported by the bottom 54 of the cooking container 36 are also within the scope of the disclosure. Any accessory or support body as discussed herein may include a support surface for supporting food thereon. The support surface will generally be the upper surface of the support body, and will be exposed to the cooking zone (more on this below).

Referring with more detail to the lid 24, it should be noted that the lid 24 is connectable to a surface of the cooking container 36 and/or housing 26 to close off entry to the interior 38 of the cooking container 36. Accordingly, a cooking volume may be defined between the interior 38 of the cooking container 36 and heating element 82 or an end of the closed lid 24 operable to engage the base 22, or alternatively, between the hollow interior 32 defined by the liner 34 and the heating element 82 or the end of the closed lid 24 operable to engage the base 22. In an embodiment, a diameter of the lid 24 is generally complementary to a diameter of the housing 26 such that the lid 24 covers not only the cooking container 36, but also an upper surface 60 of the housing 26.

The lid 24 is movable relative to the base 22 between an open position and a closed position to selectively cover the hollow interior 32. For example, the lid 24 may be distinct and separable from the base 22, or the lid 24 may be movably connected to the base 22. One or more fastening mechanisms (not shown) may, but need not be used to secure the lid 24 to the base 22 when the lid 24 is in the closed position. Any suitable type of fastening mechanism capable of withstanding the heat associated with the cooking system 20 is considered within the scope of the disclosure.

In the illustrated, non-limiting embodiment, the lid 24 is pivotable or rotatable relative to the base 22 about a pivot axis P. As shown, the lid 24 may be rotatable about a pivot axis P positioned adjacent a lower surface 62 of the housing 26. In some embodiments, the base 22 includes a rigid pivot arm 64 positioned adjacent a back surface 66 of the housing 26 and having a first end 68 connected to the housing 26 about a pivot axis P. A second, opposite end 70 of the pivot arm 64 is connected to a back surface 72 of the lid 24. Accordingly, as the pivot arm 64 is rotated about the pivot axis P in a first direction, indicated by arrow O, the lid 24 is rotated away from or out of engagement with an upper surface 60 of the housing 26 to expose the hollow interior 32. Similarly, as the pivot arm 64 is rotated about the pivot axis P in a second direction, indicated by arrow C, the lid 24 is rotated toward or into engagement with the upper surface 60 of the housing 26 or the upper surface 52 of the cooking container to seal or cover the cooking container 36. By positioning the pivot axis P near a lower surface 62 of the housing 26, the sizing envelope of the cooking system 20 when the lid 24 is in the open position may be limited. However, in other embodiments, the pivot axis P and connection of the lid 24 to the base 22 may be arranged at or near the upper surface 60 of the base 22.

Figure 4:
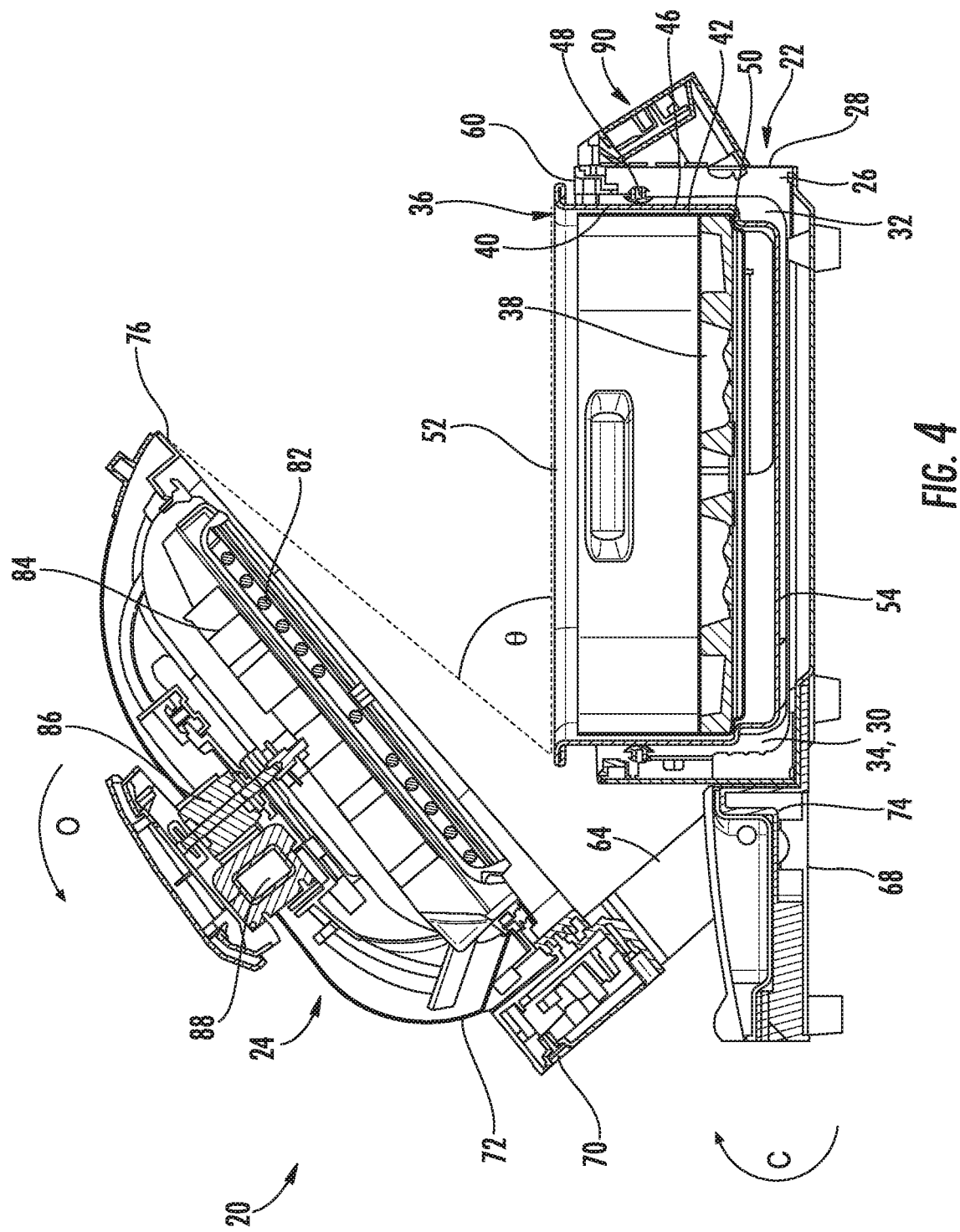
FIG. 4 is a cross-sectional view of the cooking system with the lid in an open position according to an embodiment.

In an embodiment, the base 22 of the cooking system 20 may additionally include a support 74 extending from the housing 26. The support 74 may be mounted to the side of the housing 26 about which the lid 24 is positioned when in the open configuration, to further stabilize the cooking system 20 when the lid 24 is open. In embodiments including both a support 74 and a pivot arm 64, the first end 68 of the pivot arm 64 may be coupled to the support 74, as shown in FIG. 4, rather than to the housing 26. Accordingly, in such embodiments, the pivot axis P is laterally offset from the housing 26. In an embodiment, the lid 24 is rotatable about the pivot axis P between about 40 degrees and about 80 degrees, between about 50 degrees and about 70 degrees, and more specifically about 62 degrees for example, to achieve a desirable angle θ (see FIG. 4) between an end 76 of the lid 24 opposite the pivot arm 64 and the upper surface 60 of the housing 26. In an embodiment, the angle θ is between about 65 degrees and about 95 degrees, between about 70 degrees and about 90 degrees, and more specifically, about 80 degrees.

In the illustrated, non-limiting embodiment, one or more handles 78 extend outwardly from a housing 80 of the lid 24 to provide a user with a location to easily grasp the lid 24 for movement between the open and closed position. Although a single handle 78 mounted generally near a front of the lid 24 is shown, embodiments having multiple handles, or alternatively, no handles are also within the scope of the disclosure. The housing 80 and/or the one or more handles 78 may be integrally or separately formed, such as from a molded plastic material for example.

To enhance a user's access to the hollow interior 32 of the housing 26 or the interior 38 of the cooking container 36, in an embodiment, the housing 26 is configured to move, for example translate and/or rotate, relative to a supporting surface, such as a countertop for example. In an embodiment, the base 22 includes a track defining a path of movement of the housing 26. The housing 26 may include a component complementary to and engaged with the track. Movement of the housing 26 relative to the supporting surface may be driven by the lid 24. For example, as the lid 24 is transformed from a closed position to an open configuration, such as via rotation about the pivot axis P, the housing 26 may similarly move relative to the supporting surface from a retracted position to an extended position. Movement of the lid 24 from an open position to a closed position will similarly cause the housing 26 to move from an extended position to a retracted position. In an embodiment, this movement of the housing 26 may occur as a result of engagement between a portion of the pivot arm 64 and a corresponding portion of the housing 26.

Figure 3:
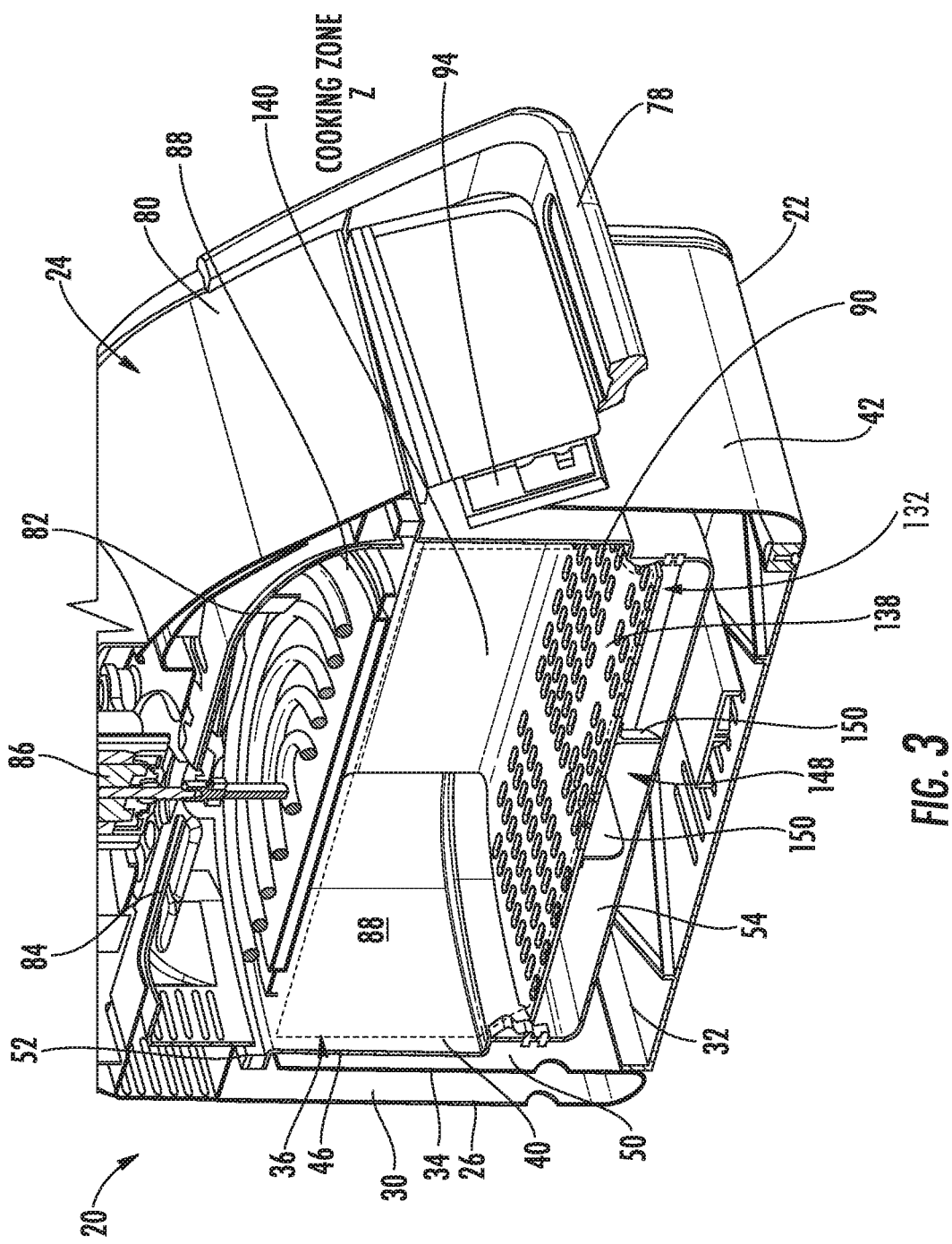
FIG. 3 is a cross-sectional view of the cooking system according to an embodiment.
Figure 10:
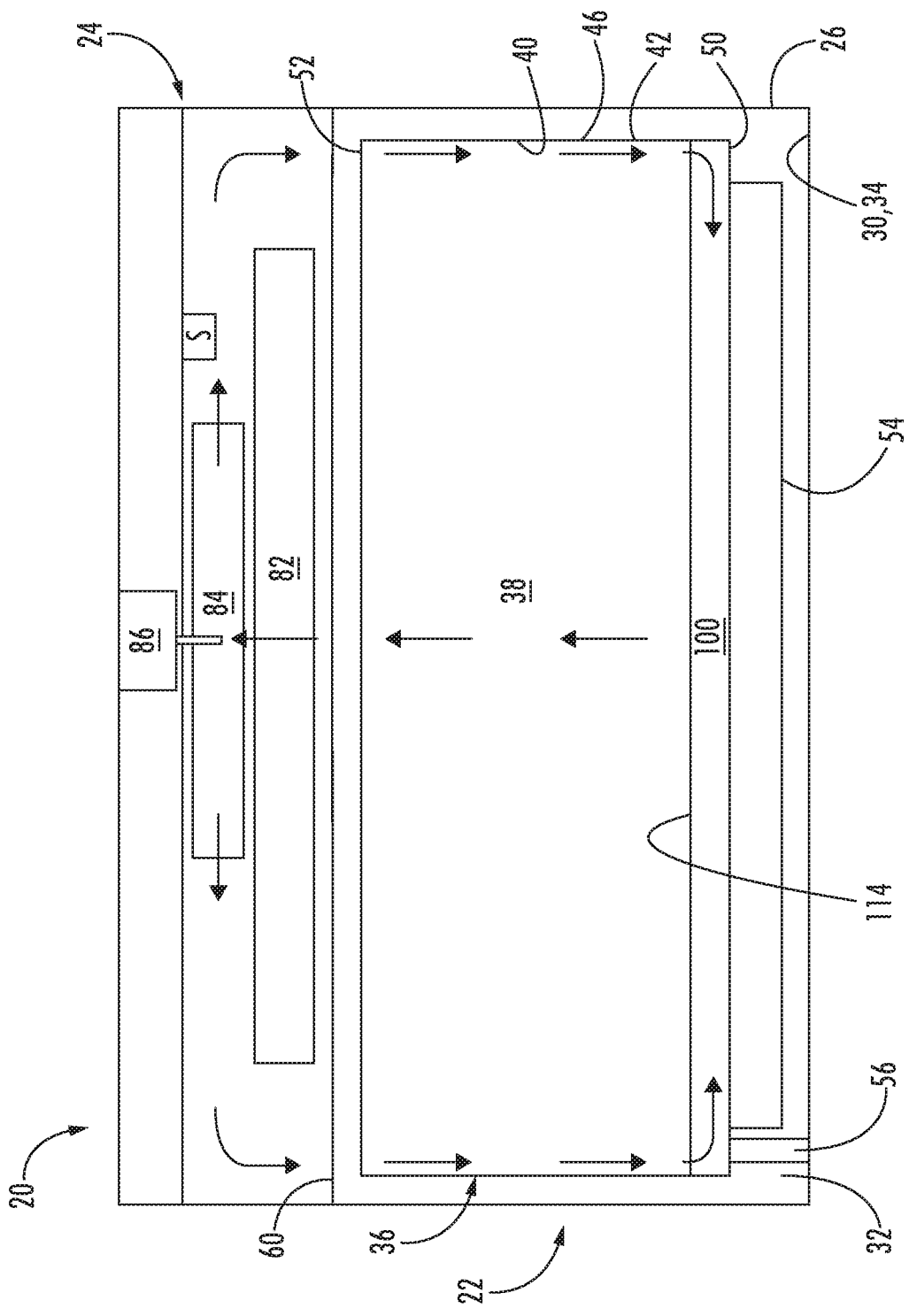
FIG. 10 is a schematic diagram of the cooking system according to an embodiment.

Referring now to FIG. 3 and FIG. 10, the cooking system 20 includes at least one heating element 82 operable to impart heat to the cooking volume during one or more modes of operation of the cooking system 20. In the illustrated, non-limiting embodiment, the at least one heating element 82 is positioned generally at or above an upper extent or surface 52 of the cooking container 36, such as proximate a center of the interior 38 of the cooking container 36 for example. In the embodiment as shown the at least one heating element 82 is mounted within the lid 24, and therefore completely outside of the cooking container 36, and vertically offset from the upper extent or surface 52 thereof. However, it should be understood that a heating element located at any suitable location is within the scope of the disclosure.

The at least one heating element 82 may be capable of performing any suitable type of heat generation. For example, a heating element 82 configured to heat the cooking container 36 or one or more food items located within the interior 38 of the cooking container 36 via conduction, convection, radiation, and induction are all within the scope of the disclosure. In the illustrated, non-limiting embodiment, the heating element 82 is a convective heating element, and the cooking system 20 additionally includes an air movement device 84, such as a fan for example, operable to circulate air within the cooking volume. The air is heated as it flows along its path of circulation, such as by flowing over a portion of the at least one heating element 82. In the illustrated, non-limiting embodiment, the air movement device 84 is driven by a motor 86 having a separate cooling mechanism coupled thereto. Further, the cooking system 20 may include a vent for exhausting hot air generated by operation of at least one of the air movement device 84, the motor 86, and the separate cooling mechanism to the exterior of the cooking system 20. Although the vent is illustrated as being formed in the lid 24, embodiments where the vent is formed in the base 22 of the cooking system 20 are also contemplated herein. In an embodiment, a guard 88 (see FIG. 2) for restricting projectile matter, such as oil for example, from contacting the heating element 82 is positioned directly adjacent the heating element, between the heating element and the interior 38 of the cooking container 36.

As previously mentioned, a support body 100 having a support surface for supporting food thereon is removably mounted within the interior 38 of the cooking container 36. In an embodiment, the support body 100 is a grill plate, which will be described in more detail below.

Figure 6:
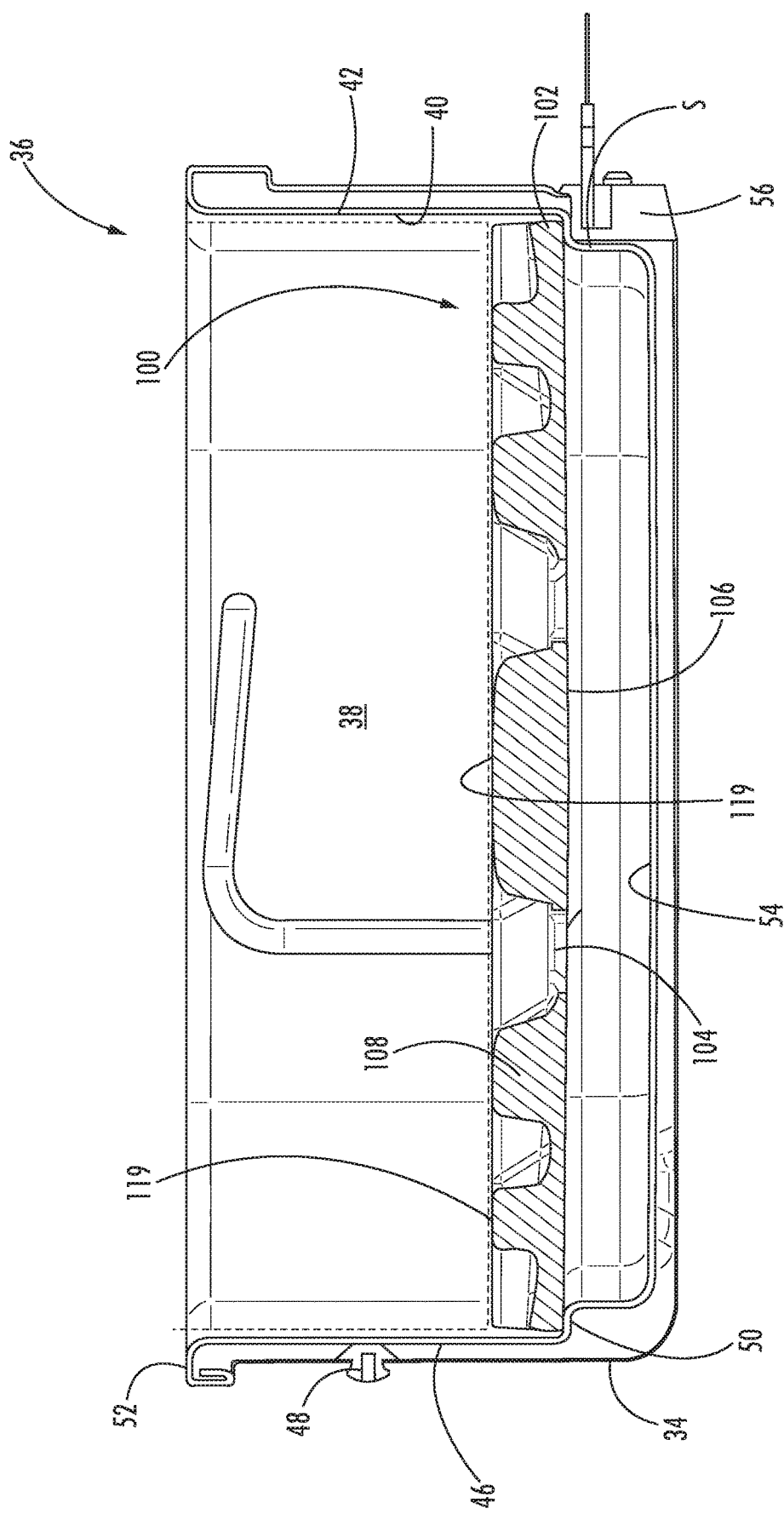
FIG. 6 is a cross-sectional view of a cooking container having an accessory located therein according to another embodiment.
Figure 7:
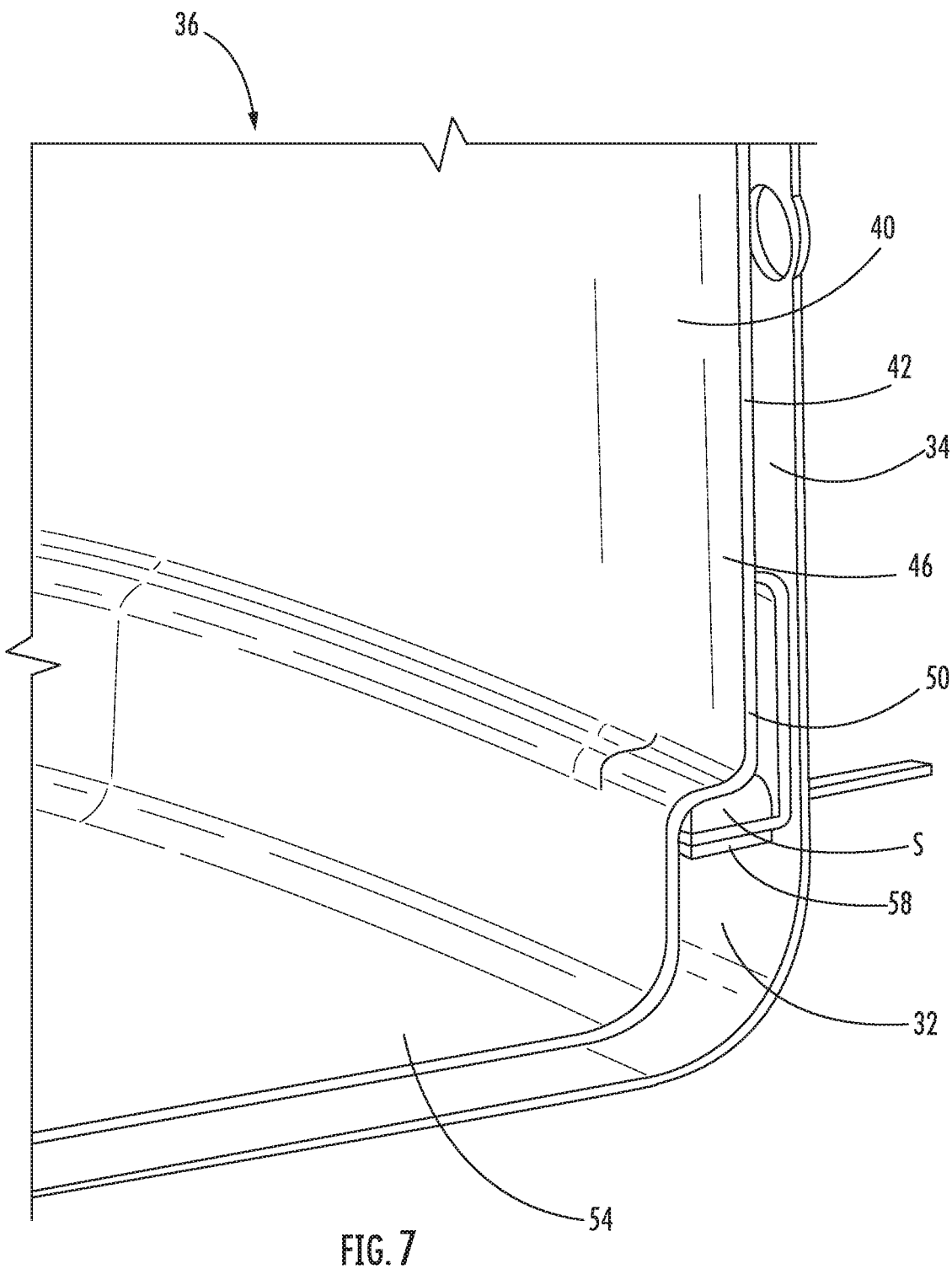
FIG. 7 is a detailed cross-sectional view of an interface between a cooking container and a liner including a sensor according to an embodiment.
Figure 16:
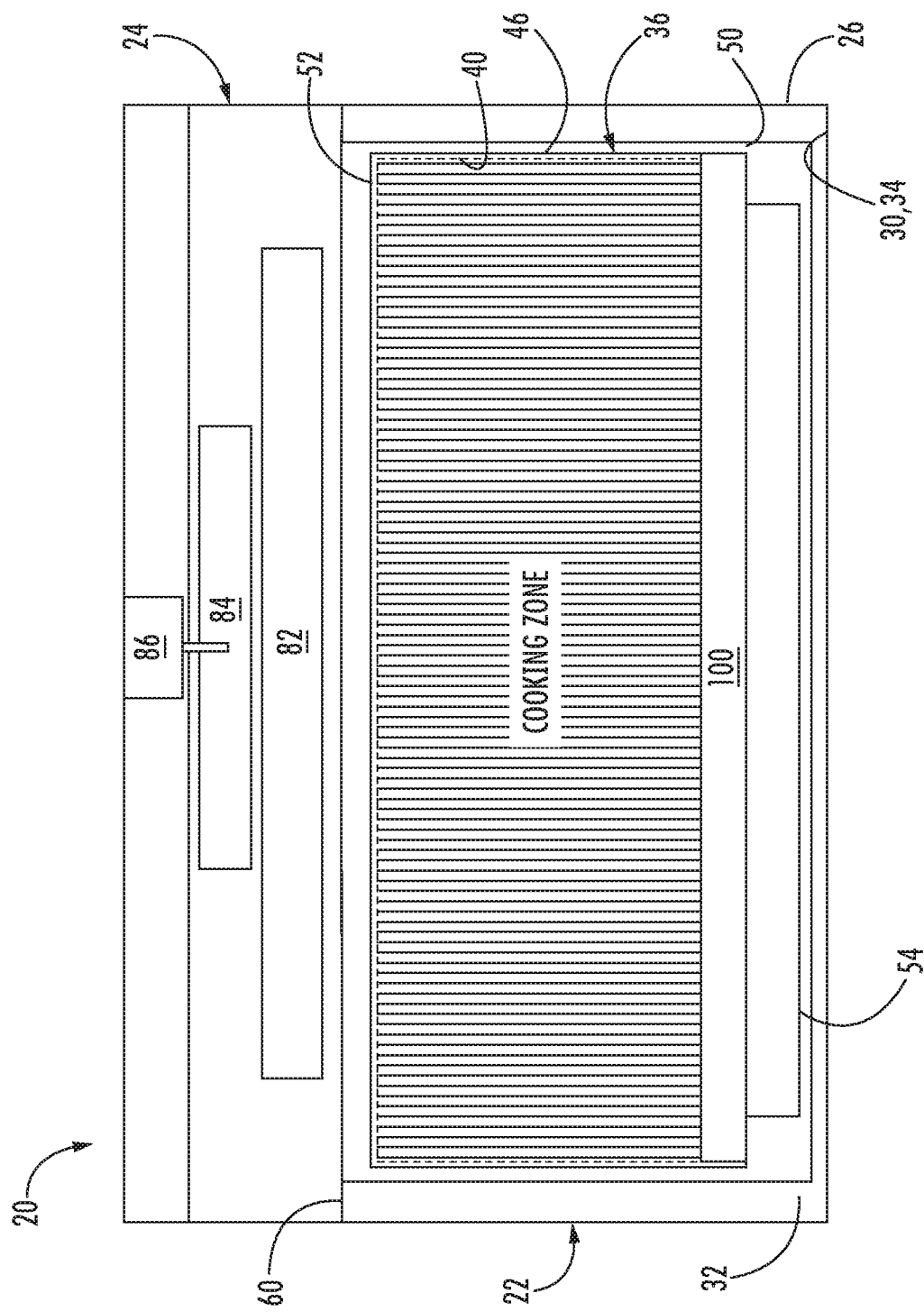
FIG. 16 is a schematic diagram of a cooking zone of the cooking system according to an embodiment.

With continued reference to FIGS. 3 and 6, and further reference to FIG. 16, in an embodiment, the support body 100 positioned within the interior 38 of the cooking container 36 at least partially defines a cooking zone Z within the cooking volume. An upper surface of the support body 100 defines a bottom or lower end of the cooking zone Z. One or more accessories, to be described in more detail below, may be installed in place of the grill plate 100 (as a support body themselves) or in overlapping arrangement with the upper surface of the grill plate 100. In embodiments where a non-grill plate accessory is installed within the cooking container 36, a support surface of the uppermost accessory on which food is receivable, defines the bottom of the cooking zone Z. The cooking zone Z is further defined by one or more sidewalls of the accessory and/or the interior 38 of the cooking container 36. In addition, the cooking zone Z extends from the cooking surface of the grill plate 100 or accessory mounted thereon to either the heating element 82, or alternatively, to the guard 88.

Figure 1:
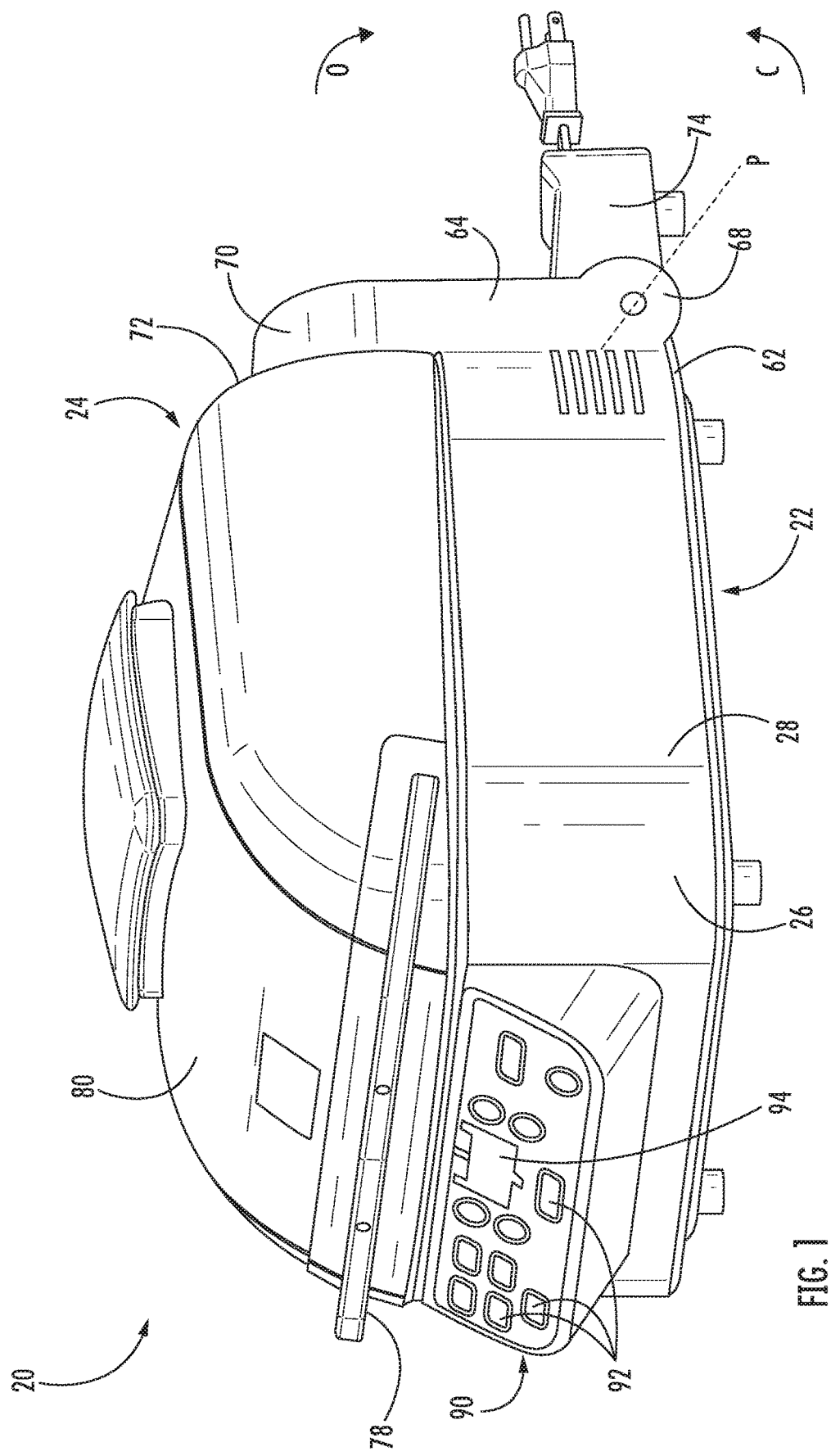
FIG. 1 is a front perspective view of the cooking system according to an embodiment.

With reference again to FIG. 1, a control panel or user interface 90 of the cooking system 20 is positioned adjacent one or more sides of the housing 26 of the base 22 or one or more sides of the housing 80 of the lid 24. The control panel 90 includes one or more inputs 92 associated with energizing the heating element 82 of the cooking system 20 and for selecting various modes of operation of the cooking system 20. One or more of the inputs 92 may include a light or other indicator to show that the respective input has been selected. The control panel 90 may additionally include a display 94 separate from and associated with the at least one input 92. However, embodiments where the display 94 is integrated into the at least one input 92 are also contemplated herein.

Figure 11:
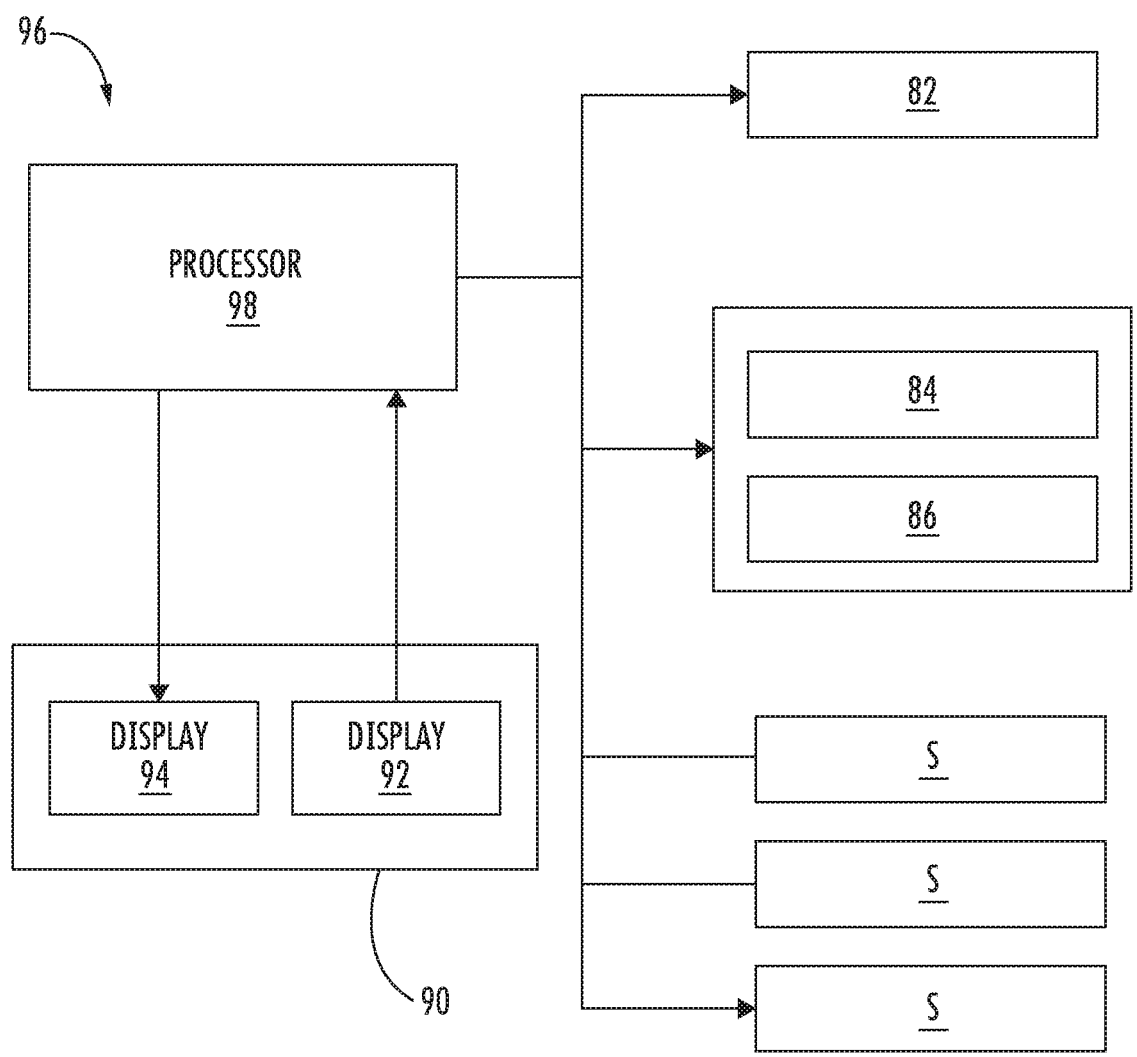
FIG. 11 is a schematic diagram of a control system of the cooking system according to an embodiment.

Operation of the one or more inputs 92 will be described in more detail below. As shown in FIG. 11, a control system 96 of the cooking system 20 includes a controller or processor 98 for controlling operation of the heating element 82 (and air movement device 84 including the motor 86 and/or fan associated therewith), and in some embodiments for executing stored sequences of heating operation. The processor 98 is operably coupled to the control panel 90 and to the heating element 82 and the air movement device 84. In an embodiment, the processor 98 and/or another portion of the control system 96 is mounted adjacent the back surface 66 of the housing 26, and in some embodiments within the support 74.

In addition, the cooking system 20 may include one or more sensors S for monitoring one or more parameters associated with airflow temperature the heating element 82, the lid 24, the cooking volume, the grill plate 100, and/or and accessory mounted within the cooking volume during a cooking operation. Accordingly, operation of the cooking system 20, and in particular of the one or more heating elements 82, may be regulated in response to the parameters sensed by the one or more sensors S. In an embodiment, the one or more sensors S includes a temperature sensor arranged in communication with the processor 98. In an embodiment, the temperature sensor(s) S, such as a thermistor of thermistors for example, are positioned in one or both of the liner 34 and the cooking container 36 (or there between), such as adjacent the step 50 formed in the cooking container 36 for example. In embodiments where a temperature sensor S is hardwired to the control system 96, one or more wires connecting the temperature sensor S to the processor 98 may be embedded within the housing 26, such as between the housing 26 and the liner 34 for example.

The temperature sensor(s) S may directly contact the exterior surface 42 of the cooking container 36 to determine the temperature of the cooking container 36, or alternatively, may extend through body of the cooking container 36 for engagement with the support body 100, i.e. the grill plate in the embodiment shown in FIG. 6, or with an accessory arranged within the interior 38 of the cooking container 36 in other embodiments. As is best shown in FIG. 6, the temperature sensor S may be coupled to or at least partially supported by the spacer 56. Alternatively, in embodiments where the cooking system 20 includes a ledge 58, the temperature sensor S may be supported at least partially by the ledge 58, as shown in FIG. 7.

Figure 8:
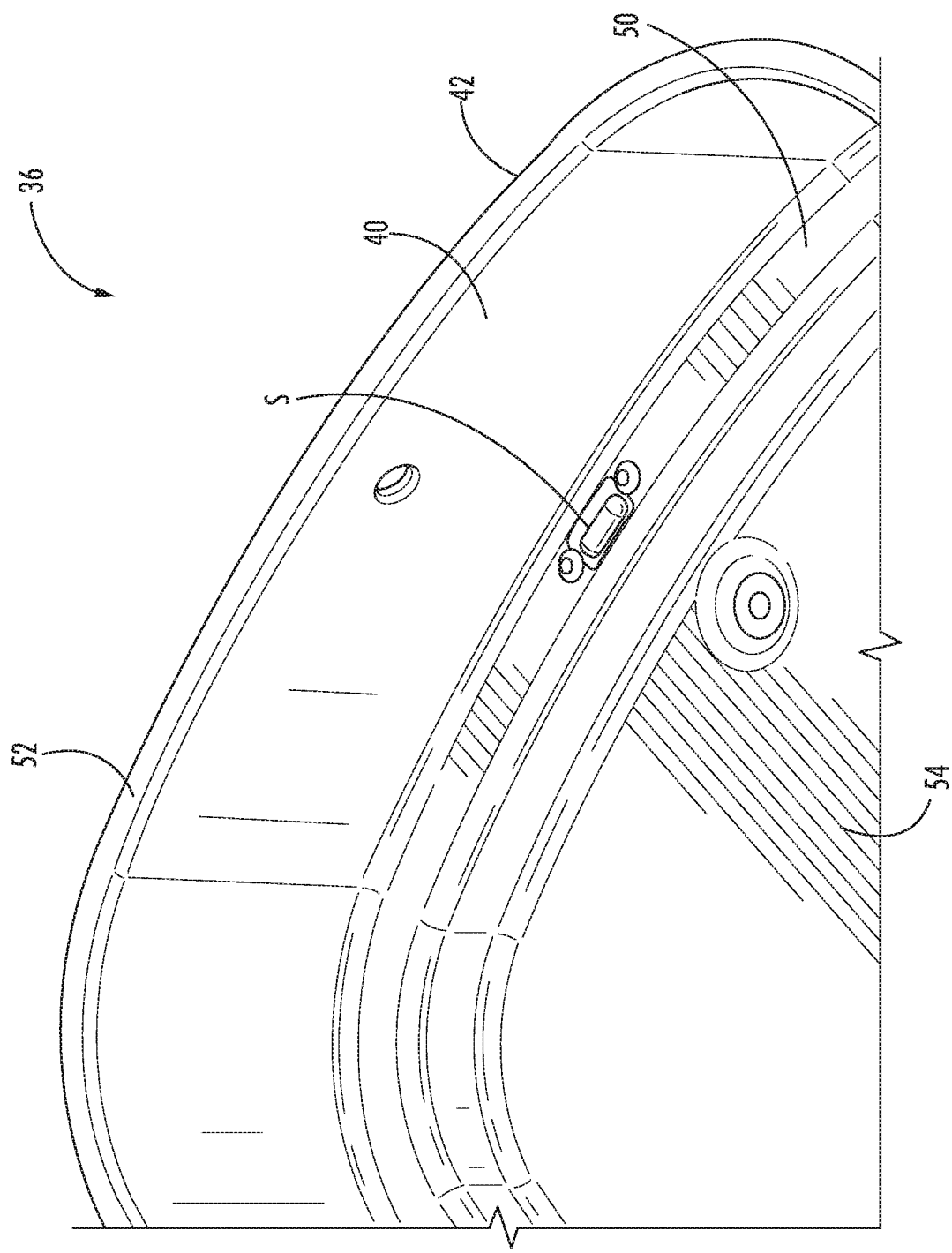
FIG. 8 is a perspective view of a cooking container having a temperature sensor according to an embodiment.
Figure 9:
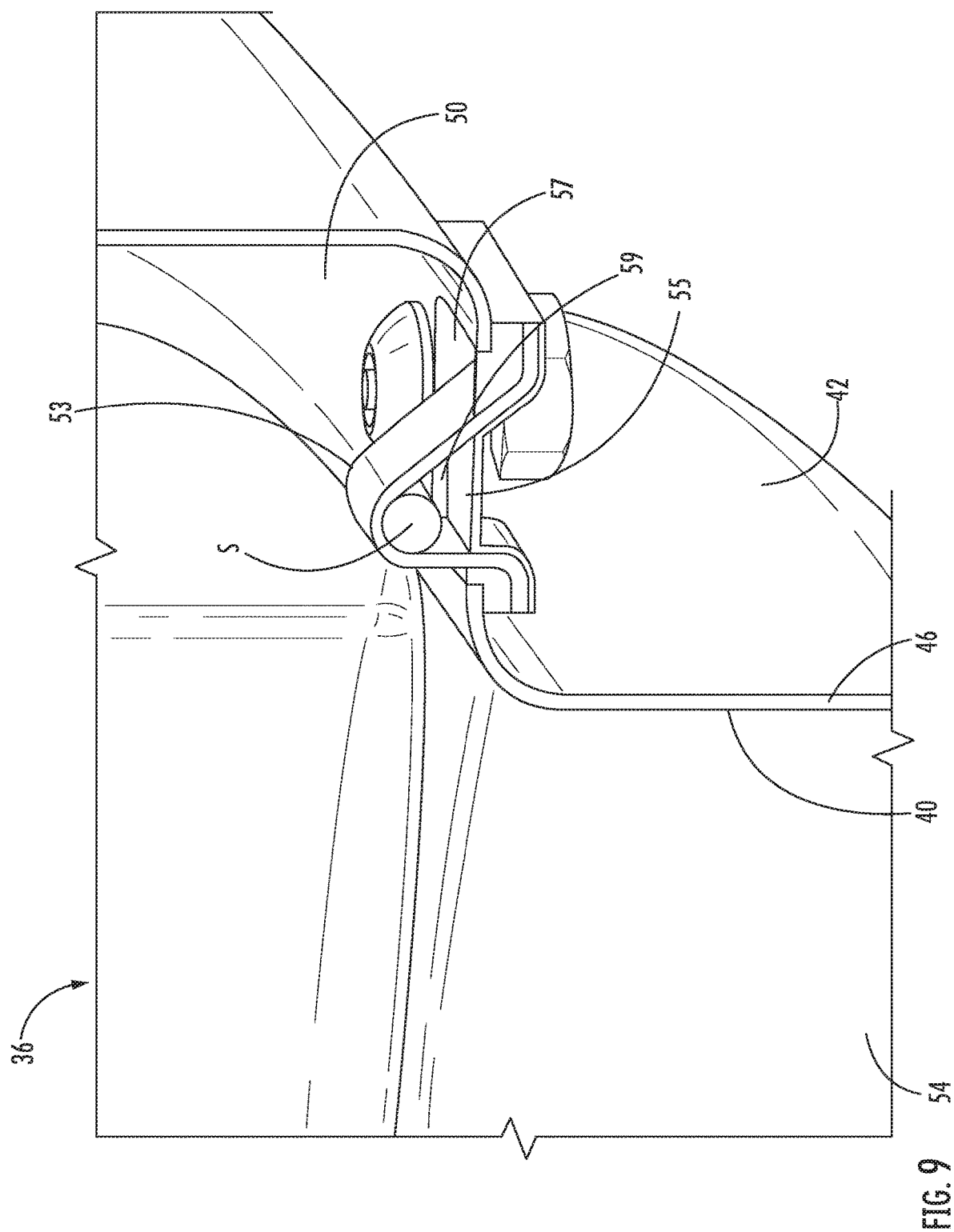
FIG. 9 is a cross-sectional view of the cooking container of FIG. 8 according to an embodiment.

In yet another other embodiment, best shown in FIGS. 8 and 9, the temperature sensor S is integrated into the cooking container 36 and is operable to contact and sense the temperature of the support body 100 (such as the grill plate). As shown, the temperature sensor S may be mounted upwardly adjacent the step 50, within the interior 38 of the cooking container 36 via an aluminum plate 53 and a metal bracket 55 for example. A seal 57, such as formed from silicone for example, may seal the plate 53 to the cooking container 36. The temperature sensor S may be located at a position offset from the metal bracket 55 to prevent overheating of the temperature sensor S. In such embodiments, the gap 59 between the temperature sensor S and the metal bracket 55 may be filled with a thermal paste. It should be understood that the various configurations of the temperature sensor S illustrated and described herein are intended as an example only and that other configurations suitable for monitoring and communicating (to the control system 96) a temperature of at least one of the cooking container 36, the support body 100, i.e. the grill plate in the embodiment shown in FIG. 6, or an accessory positioned within the interior 38 of the cooking container 36 are also contemplated herein.

In addition to the temperature sensor(s) S used to monitor the temperature of the support body 100, the cooking system 20 may also employ a further temperature sensor or sensors (also indicated as S) to sense the temperature of the air provided to the interior 38 of the cooking container 36. In such embodiments, a first temperature sensor or sensors may be mounted as previously described, for example to contact a bottom or lower surface of the grill plate 100, and a second temperature sensor or sensors may be located within the lid 24, generally adjacent the air movement device 84, such that the temperature sensor is located directly within the heated airflow expelled from air movement device 84. One or more operating parameters of the cooking system 20 may be adjusted via, for example, a control algorithm accessible by the processor 98 in response to the temperature detected by the one or more temperature sensors S. In an exemplary embodiment, the speed of the air movement device 84 may be adjusted, or alternatively, the power provided to the heating element 82 may be increased or decreased to achieve a desired temperature.

In embodiments of the cooking system 20 including temperature sensors S positioned in different locations, adjustment of an operating parameter, such as operation of the heating element 82 for example, may be performed using the control algorithm in response to the temperature of the heated airflow, measured by the temperature sensor S disposed in the heated airflow. For example, power provided to the heating element 82 may be increased if the sensed airflow temperature is below a set point, and the power provided to the heating element 82 may be reduced or ceased completely if the sensed airflow temperature is above a set point, thereby allowing the interior 38 of the cooking container 36 to cool. In an embodiment, the temperature sensor S positioned proximate the support body 100 is operable to provide smoke control and indicate when the temperature of the grill plate 100 is approaching a temperature associated with the generation of smoke (also known as the smoke point). The smoke point will vary based on the type of food and/or fat positioned within the interior 38. An example of the smoke point of common foods is shown below:

| Fat | Smoke Point ° F. | Smoke Point ° C. |
| --- | --- | --- |
| Unrefined canola oil | 225° F. | 107° C. |
| Unrefined flaxseed oil | 225° F. | 107° C. |
| Unrefined safflower oil | 225° F. | 107° C. |
| Unrefined sunflower oil | 225° F. | 107° C. |
| Unrefined corn oil | 320° F. | 160° C. |
| Unrefined high-oleic sunflower oil | 320° F. | 160° C. |
| Extra virgin olive oil | 320° F. | 160° C. |
| Unrefined peanut oil | 320° F. | 160° C. |
| Semirefined safflower oil | 320° F. | 160° C. |
| Unrefined soy oil | 320° F. | 160° C. |
| Unrefined walnut oil | 320° F. | 160° C. |
| Hemp seed oil | 330° F. | 165° C. |
| Butter | 350° F. | 177° C. |
| Semirefined canola oil | 350° F. | 177° C. |
| Coconut oil | 350° F. | 177° C. |
| Unrefined sesame oil | 350° F. | 177° C. |
| Semirefined soy oil | 350° F. | 177° C. |
| Vegetable shortening | 360° F. | 182° C. |
| Lard | 370° F. | 182° C. |
| Macadamia nut oil | 390° F. | 199° C. |
| Refined canola oil | 400° F. | 204° C. |
| Semirefined walnut oil | 400° F. | 204° C. |
| High quality (low acidity) extra virgin olive oil | 405° F. | 207° C. |
| Sesame oil | 410° F. | 210° C. |
| Cottonseed oil | 420° F. | 216° C. |
| Grapeseed oil | 420° F. | 216° C. |
| Virgin olive oil | 420° F. | 216° C. |
| Almond oil | 420° F. | 216° C. |
| Hazelnut oil | 430° F. | 221° C. |
| Peanut oil | 440° F. | 227° C. |
| Sunflower oil | 440° F. | 227° C. |
| Refined corn oil | 450° F. | 232° C. |
| Refined high-oleic sunflower oil | 450° F. | 232° C. |
| Refined peanut oil | 450° F. | 232° C. |
| Refined Safflower oil | 450° F. | 232° C. |
| Semirefined sesame oil | 450° F. | 232° C. |
| Refined soy oil | 450° F. | 232° C. |
| Semirefined sunflower oil | 450° F. | 232° C. |
| Olive pomace oil | 460° F. | 238° C. |
| Extra light olive oil | 468° F. | 242° C. |
| Soybean oil | 495° F. | 257° C. |
| Safflower oil | 510° F. | 266° C. |
| Avocado oil | 520° F. | 271° C. |

Operation of the cooking system 20 is impacted by the temperature sensor S proximate the grill plate 100 if the sensed temperature of the grill plate 100 is above a threshold stored within a memory embedded within or accessible by the processor 98, for example associated with a smoke point. All of the above smoke points may be stored in the processor memory and used as a set threshold. In addition, modes of operation are contemplated. For example, in a low mode of operation, the temperature threshold of a surface of the grill plate 100 is about 345° F., in a medium mode of operation, the temperature threshold of a surface of the grill plate 100 is about 375° F., and in a high mode of operation, the temperature threshold of a surface of the grill plate 100 is about 410° F. The thresholds indicated herein are intended as an example only, and it should be understood that other temperatures may be selected for any of the various modes of operation.

In at least one mode of operation, such as a maximum temperature mode of operation, the cooking system 20 is configured to ignore or disregard the temperature of the grill plate 100 detected by the temperature sensor S proximate thereto. As a result, in the maximum temperature mode, the temperature of the grill plate 100 may exceed the smoke point. Although operation is described herein with respect to use of the temperature sensor proximate the grill plate 100 to monitor the temperature of the grill plate 100, similar control of the cooking system 20 may be performed in embodiments where this temperature sensor S is operable to monitor the temperature of either the cooking container 36 or the temperature of an accessory mounted within the interior 38 of the cooking container 36.

In an embodiment, at least one input 92 on the control panel 90 is an on/off button which allows the user to activate or deactivate the control panel 90. When the control panel 90 is deactivated, none of the one or more heating elements 82 are energized. In an exemplary embodiment, the at least one input 92 is operable to select one or more manual modes of operation of the heating element 82. Alternatively, or in addition, at least one input 92 is operable to select a stored sequence of operation of the heating element 82. In some cases, the stored sequences may be particularly well suited for a given method of food preparation and/or for particular ingredients or types of ingredients. The plurality of stored sequences associated with the at least one input 92 may be stored within a memory accessible by the processor 98. Alternatively, the plurality of stored sequences may be stored remotely from the cooking system 20, and may be accessed by the processor 98, such as via wireless communication for example.

In addition, a user may be able to enter a time associated with operation of the cooking system 20 in a desired manual mode. The time may be entered via the same input 92 or a separate input 92 as used to select a mode of operation. Further in embodiments where the cooking system 20 is in a mode configured to perform a stored sequence in response to selection of one of the inputs 92, the display 94 may indicate a time remaining on the display 94. Temperature or other parameters may also be entered via inputs 92.

The at least one input 92 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input 92 has been selected and any necessary information has been provided to the control panel 90. Alternatively, one or more of the other inputs 92, such as the knob for example, may be operable, such as by pushing the knob towards the control panel 90, to start and stop operation of the cooking system 20, regardless of whether the cooking system 20 is following a stored sequence or is in a manual mode.

The one or more inputs 92 are operable to initiate operation of the cooking system 20 in a plurality of cooking modes. In an embodiment, a first cooking mode of the cooking system 20 is operable to cook a food item located within the cooking volume via both a non-contact cooking operation and a contact cooking operation. As used herein, the term "non-contact cooking operation" includes any cooking operation where a heating element or heat source is not arranged in direct or indirect contact with a food item, such as, but not limited to, convective and radiant heating. Similarly, the term "contact cooking operation" includes a cooking operation where heat is transmitted via direct or indirect contact between a heating element or heat source and a food item, such as, but not limited to, conductive and inductive cooking. For example, the first cooking mode may cook a food item via a combination of both convection and conduction cooking; however, it should be understood that any combination of non-contact and contact cooking operations are contemplated herein.

Figure 12:
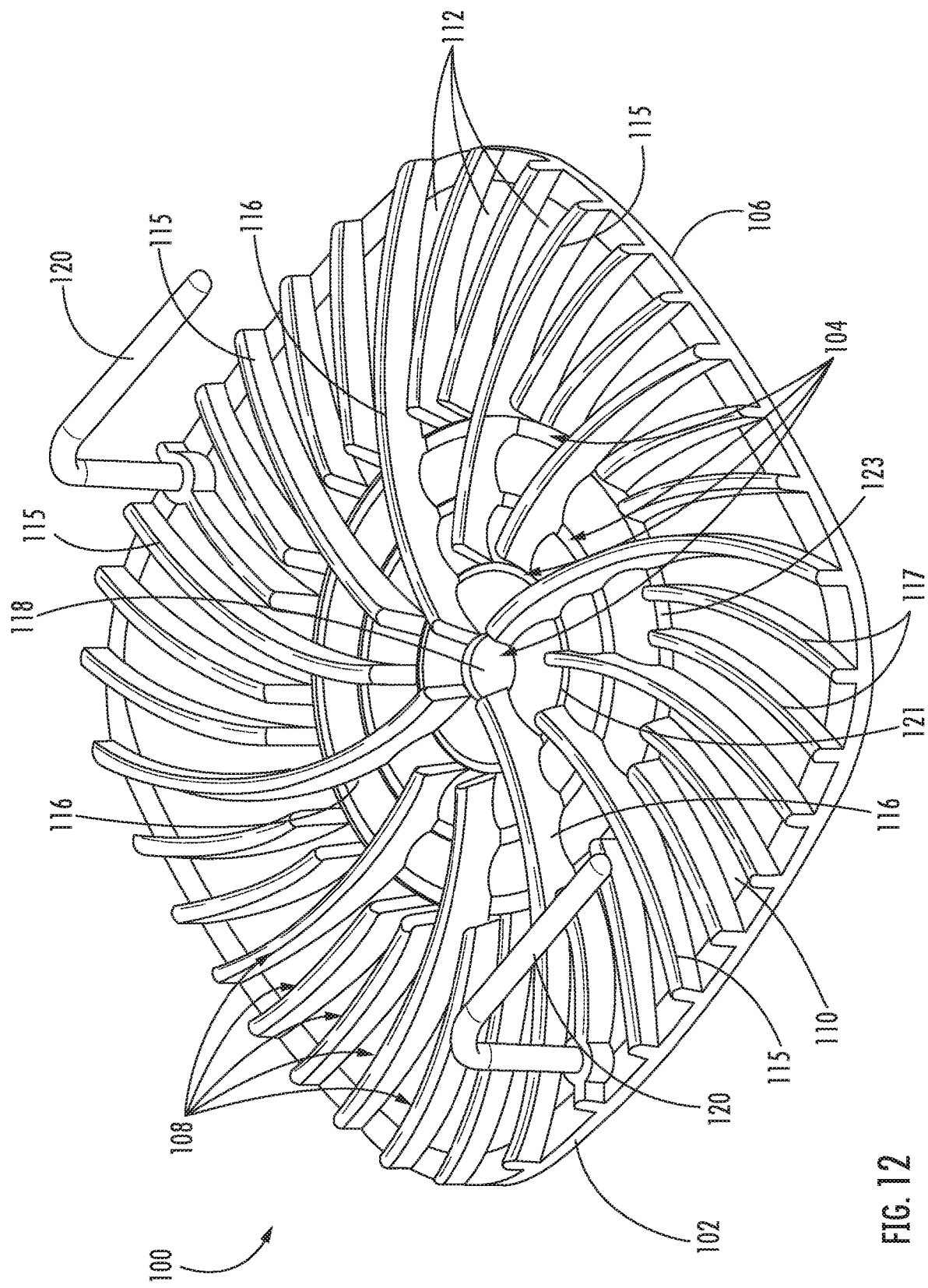
FIG. 12 is a perspective view of support body receivable within a cooking container of the cooking system according to an embodiment.

Operation in the first cooking mode involves the use of various components, such as the heating element 82 and support body 100, such as the grill plate for example, receivable within the interior of the liner 34, or alternatively, within the interior 38 of the cooking container 36. With reference now to FIG. 12, an example of the grill plate 100 is shown in more detail. The grill plate 100 includes a body 102 having a plurality of through holes or openings 104 formed therein. The body 102 of the grill plate 100 is sized such that the grill plate 100, when installed within the interior 38 of the cooking container 36, is in contact with and supported by the step 50 (See FIG. 10). Accordingly, a clearance is defined between the bottom 106 of the grill plate 100 and the bottom 54 of the cooking container 36. Grease, oil, and other runoff liquids generated during a cooking operation may flow through the openings 104 formed in the body 102, to collect beneath the grill plate 100, at the bottom 54 of the cooking container 36. In an embodiment, the diameter of the grill plate 100 is substantially equal to the inner diameter of the first portion of the cooking container 36. As a result, when installed within the cooking container 36, an outer perimeter of the grill plate 100 generally abuts or is minimally offset from (about 1 mm of less) the interior surface 40 of the cooking container 36.

As shown best in FIG. 12, a plurality of ribs 108 may extend from an upper surface 110 of the body 102. The ribs 108 are spaced apart from one another to define a plurality of channels 112 formed between adjacent ribs 108. The ribs 108 may be integrally formed with the upper surface 110, or alternatively, may be affixed thereto. Accordingly, when one or more food items are positioned on the food supporting surface 114 defined by the ribs 108, the food is offset from the upper surface 110 of the body 102. Each of the plurality of ribs 108 may be identical, or alternatively, may vary in size or shape based on the position of the rib 108 relative to the body 102. In the illustrated, non-limiting embodiment, the plurality of ribs includes longer ribs 116, intermediate ribs 115, and shorter ribs 117. The longer ribs 116 extend radially outwardly from a center opening 118 formed in the body 102. The intermediate ribs 115 and shorter ribs 117 also extend radially outwardly from areas disposed closer to the edges of the body 102 (the intermediate ribs 115 extending from concentric opening 121 and the shorter ribs 117 extending from concentric opening 123), with all of the ribs 108 generally extending to the outermost edges of the body 102.

In an exemplary embodiment, some or all of the ribs 108 create a diffusing structure operable to diffuse an air flow provided thereto. The diffusing structure described herein functions not only to slow the speed of an air flow, but also to reduce the rotation of the airflow as is passes through the diffusing structure. As shown in FIG. 12, each of the ribs 108 of the grill plate 100 forms a portion of the diffusing structure. However, in other embodiments only a portion of the ribs 108, for example only the longer ribs 116, or alternatively, the longer ribs 116 and the intermediate ribs 117, cooperate to diffuse an air flow provided to the grill plate.

One or more handles 120 may be associated with the grill plate 100 to allow a user to easily grasp and manipulate the grill plate 100. In the illustrated, non-limiting embodiment, the grill plate 100 has two handles 120 extending from the upper surface 110 of the base 102, adjacent opposing sides of the grill plate 100. The handles 120 may be connected to a rib 108 or directly to the body 102 of the grill plate 100. Although the handles 120 are illustrated as being integrally formed with the grill plate 100, embodiments where the one or more handles 120 are affixed to the grill plate 100 are also within the scope of the disclosure.

The grill plate 100 may be made of any suitable metal material, such as iron, steel, aluminum or any suitable ferromagnetic material. Further, in some embodiments, at least a portion of the grill plate 100 may be coated with a non-stick material, such as Teflon for example, to prevent food items from sticking to the grill plate 100.

Figure 10A:
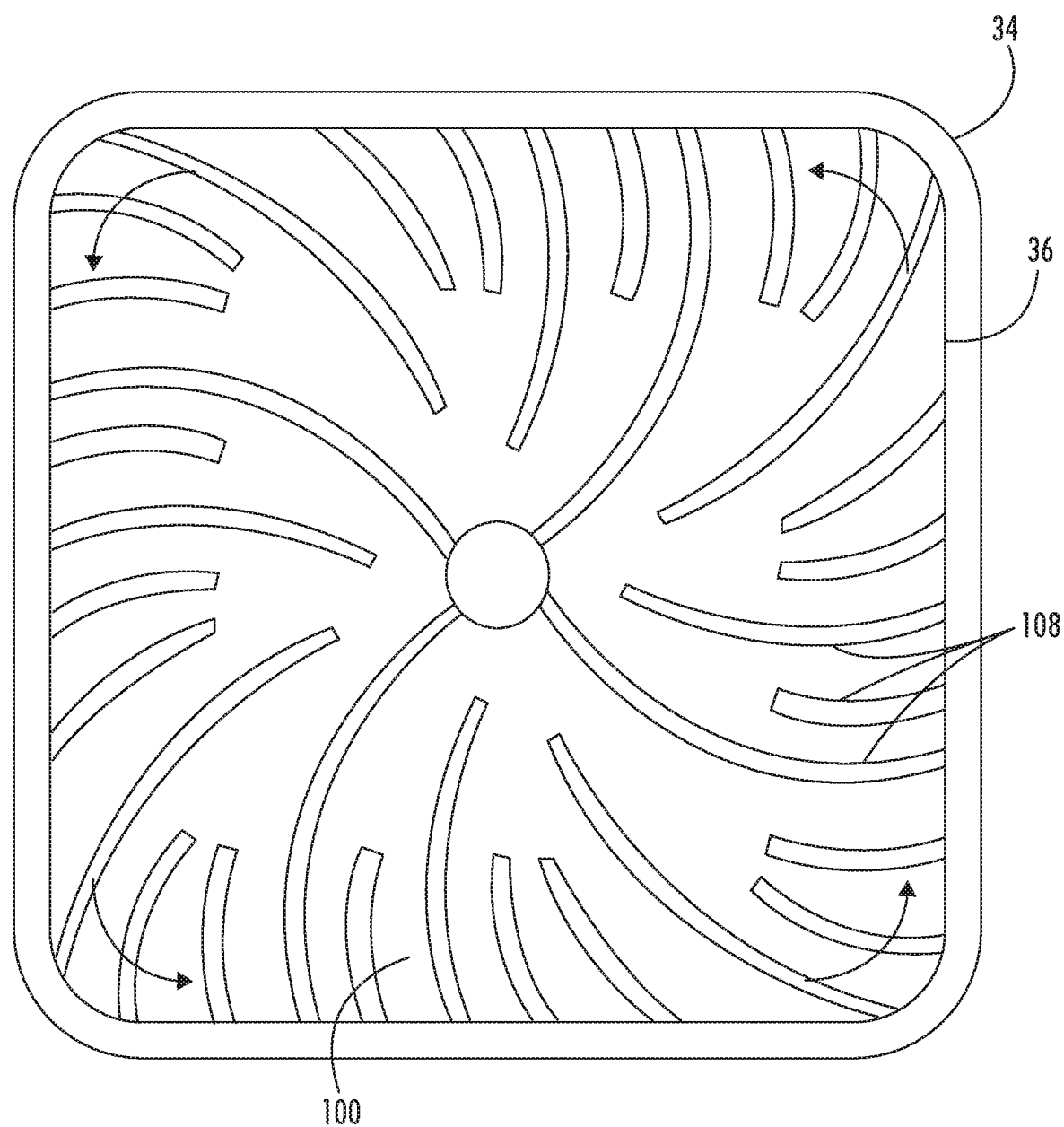
FIG. 10A is a top view of the base of the cooking illustrated a flow of the air provided to the cooking volume according to an embodiment.

With continued reference to FIG. 12 and to the first cooking mode, at the start of the first cooking mode, the grill plate 100 is mounted within the cooking container 36 and the lid 24 covers the upper extent or surface 52, 60 and hollow interior 32, 38 of the housing 26 and the cooking container 36, respectively. When utilizing the cooking system 20 in the first cooking mode, the processor 98 initiates operation of the heating element 82 located remotely from the grill plate 100 to heat the grill plate 100. In an embodiment, the air movement device 84 is also operated to circulate the hot air within the cooking volume as represented by arrows in FIG. 10. As shown, the air output from the air movement device 84 is drawn through the heating element 82 and into the air movement device 84 from a center of the cooking volume. The heated air is exhausted radially and has a circular flow or spin, best shown in FIG. 10A, similar to the rotation of the air movement device 84. Due in part to the spin of the heated air and deflection thereof by interior surfaces of the lid 24, the air flows downwardly into the cooking volume along the interior surface 40 of the cooking container 36.

As the air flow approaches the step 50 formed in the cooking container 36, the air flow is received generally adjacent the outer periphery of the grill plate 100. The diffusing structure of the grill plate 100 halts the downward movement of the air flow and directs the air flow radially inwardly through the plurality of channels 112 defined between the ribs 108. The curved configuration of the ribs 108 and channels 112 of the diffusing structure slows the rotation to the air flow while simultaneously directing the air flow generally horizontally towards the center of the grill plate 100 where one or more food items are typically positioned. As a result, rotation of the flow of air output from the plurality of channels at a relative center of the grill plate 100 is stopped altogether or at least less than the rotation of the flow of air that enters the plurality of channels 112 at the outer periphery of the grill plate 100. The flow of air exiting the channels 112 flows upwardly from beneath a food item and, around an exterior surface of the food item before being drawn back up and through the heating element 82 by the air movement device 84. This movement of the air through the cooking volume to convectively cook the food items (i.e. non-contact cooking) may be facilitated in part by the configuration of the diffusing As the heated air flows through the channels 112 and over the surface of the grill plate 100, heat from the air is transferred to the grill plate 100, thereby increasing the temperature of the grill plate 100. As previously described, the grill plate 100 is formed from a conductive, metal material.

In an embodiment, the mass of the grill plate 100 is selected such that during operation in the first cooking mode, the grill plate 100 achieves and maintains a temperature, after an initial "preheating" period, sufficient to cause a Maillard reaction in the food located within the cooking volume. The temperature of the grill plate 100 necessary to achieve the Maillard reaction is at least 285° F. In an embodiment, the preheating period is a period of time required to heat the grill plate 100 to a temperature where the Maillard reaction will occur, i.e. 285° F. or warmer. In embodiments where the preheating period increases the temperature of a grill plate 100 initially at room temperature to a temperature where the Maillard reaction will occur is less than about 20 minutes, less than about 15 minutes, or less than about 10 minutes. In an embodiment, a temperature sensor S of the cooking system 20 is operable to monitor the temperature of the cooking container 36 and/or the temperature of the grill plate 100. Accordingly, the display 94 may indicate to a user that the "preheat" operation is complete and that food is ready to be received within the cooking volume in response to the determining that the temperature of the grill plate 100 as detected by the temperature sensor S has reached a minimum temperature necessary to achieve the Maillard reaction.

Because weight and cost are typically directly proportional, it is desirable to minimize the weight of the grill plate 100. As a result, the thermal mass of grill-like elements, such as burners used in a stove for example, are insufficient to achieve and maintain a temperature required to initiate the Maillard reaction, specifically when heated via convection or radiation. In an embodiment, the mass of the grill plate 100 is between about 200 grams and about 3 kg, and more specifically, between about 300 g and about 3 kg, about 400 grams and about 3 kg, about 500 g and about 3 kg, about 600 g and about 3 kg, about 700 g and about 3 kg, about 800 g and about 3 kg, about 900 g and about 3 kg, about 1000 g and about 3 kg, about 1.1 kg and about 3 kg, about 1.2 kg and about 3 kg, about 1.3 kg and about 3 kg, about 1.4 kg and about 3 kg, 1.5 kg and about 3 kg, 1.6 kg and about 3 kg, 1.7 kg and about 3 kg, 1.8 kg and about 3 kg, 1.9 kg and about 3 kg, 2.0 kg and about 3 kg, 2.1 kg and about 3 kg, about 2.2 kg and about 3 kg, about 2.3 kg and about 3 kg, about 2.4 kg and about 3 kg, about 2.5 and about 3 kg, about 2.6 and about 3 kg, about 2.7 and about 3 kg, about 2.8 and about 3 kg, or about 2.9 kg and about 3 kg.

During the first cooking mode, after the preheating period is completed, one or more food items are positioned within the cooking volume, in direct contact with the support surface 114 of the grill plate 100 to perform a grilling operation. Heat from the grill plate 100, and more specifically from the ribs 108, is transferred to the food items, such as via conduction (i.e. contact cooking). Because the temperature of the grill plate 100 is above 285° F., and therefore the Maillard reaction occurs, browning in the form of grill or sear marks is formed at the surfaces of the food arranged in direct contact with the ribs 108 of the grill plate 100. It should be understood that in embodiments where only a portion of the ribs 108 form part of the diffusing structure, the ribs 108 that are not part of the diffusing structure are operable to transfer heat to the food. Further, the ribs 108 that define the diffusing structure transfer heat to the food.

During operation in the first cooking mode, including after the grill plate 100 has preheated to a desired temperature, the temperature sensor S may continuously or selectively sample the temperature of the cooking volume or of the grill plate 100 and adjust operation of the cooking system 20 accordingly. For example, upon determining that the temperature of the grill plate 100 is approaching a maximum threshold, the processor 98 may de-energize the heating element 82 until the temperature has fallen to an acceptable level. In such embodiments, the maximum threshold may be smoking point of the food positioned within the cooking volume. Similarly, upon determining that the temperature of the grill plate 100 is approaching a minimum threshold, such as a lowest possible temperature to achieve a Maillard reaction, the processor 98 will adjust one or more operating parameters of the cooking system 20, such as the speed of the air circulation, and/or the power provided to the heating element 82.

Figure 13:
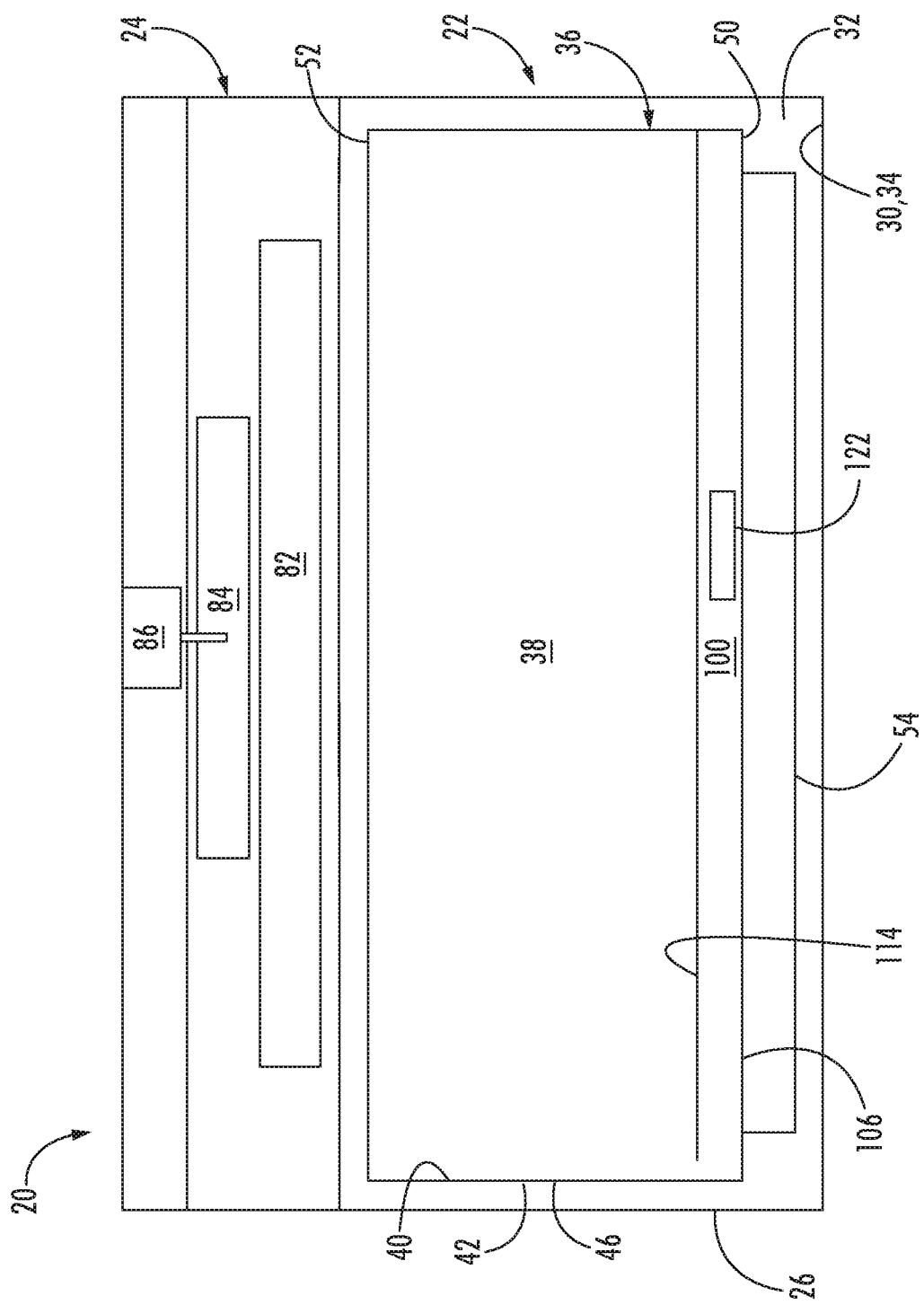
FIG. 13 is a schematic diagram of a control system of the cooking system according to another embodiment.

Although the grill plate 100 is illustrated and described as being heated in the first cooking mode by a heating element 82 located remotely therefrom (i.e. within the lid) such that the food items being cooked are disposed between the at least a portion of the heating element 82 and at least a portion of the grill plate 100, in other embodiments, the cooking system 20 may include another heating element 122 (see FIG. 13), distinct from the heating element 82, and operably coupled to the grill plate 100. The first and second heating elements 82, 122 are operable independently or in combination to apply one or more predetermined power settings to cook the food products within the cooking container 36. In an embodiment, the heating element 122 is embedded within the grill plate 100. Alternatively, the heating element 122 may be embedded within the housing 26 and operably coupled to the grill plate 100 when the grill plate 100 is installed within the hollow interior 32 of the liner 34 or the interior 38 of the cooking container 36. Accordingly, in an embodiment, during operation in the first cooking mode, both the heating element 82 and the heating element 122 are operational and impart heat to the cooking volume.

Figure 17:
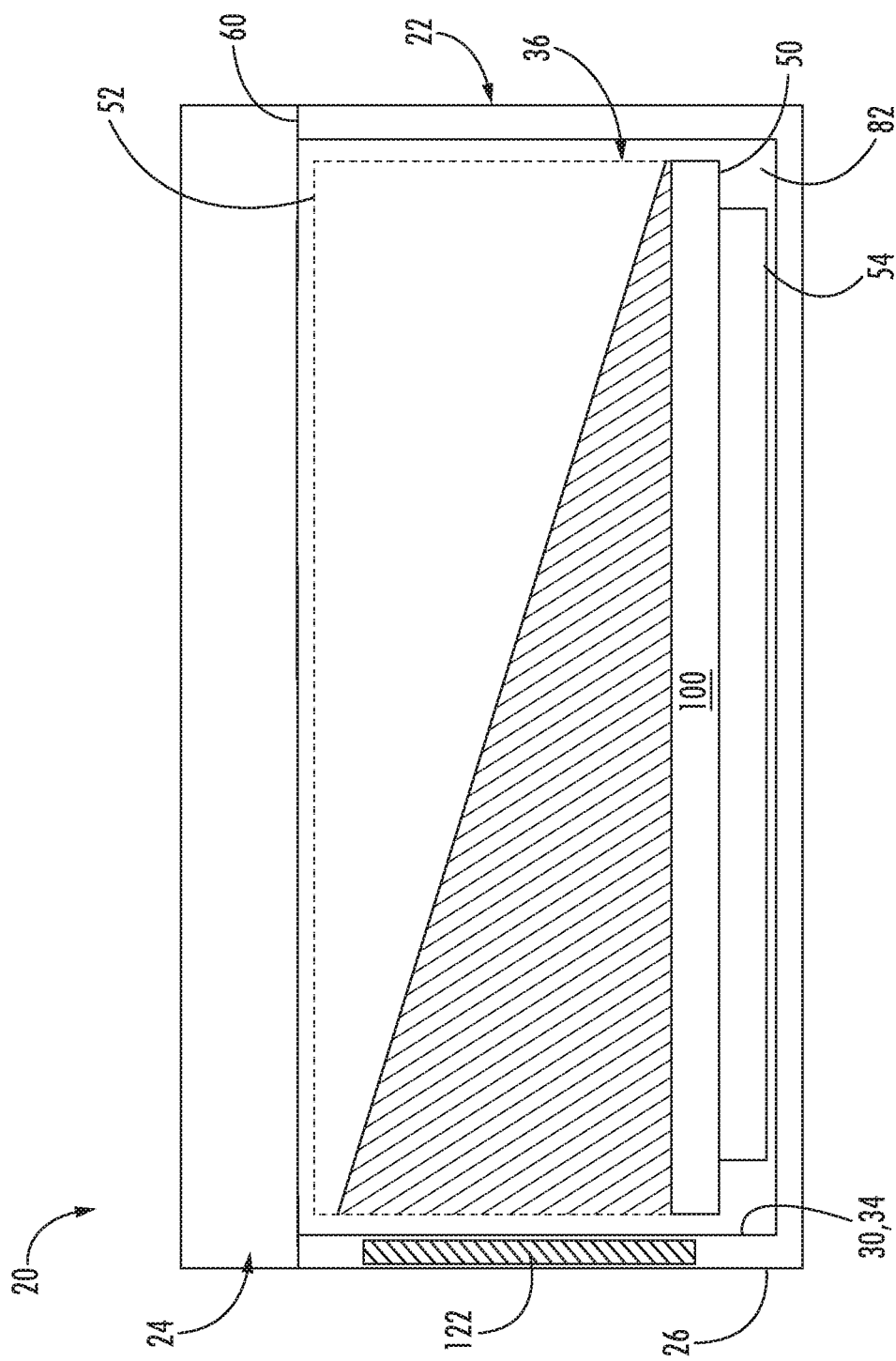
FIG. 17 is a schematic diagram of a cooking zone of the cooking system according to an embodiment.

In embodiments where a heating element 122 is embedded within the housing 26 adjacent a sidewall 46 of the cooking container 36, the heating element 122 may define a portion of the cooking zone Z. Accordingly, because the bottom of the cooking zone Z is defined by the cooking surface 114 of the grill plate 100 or an uppermost surface of an accessory, at least a portion of the cooking zone Z, illustrated in the shaded region of FIG. 17, and any food in contact with the surface 114 is disposed between a portion of the food support surface 114 and a portion of the heating element 122.

Figure 5:
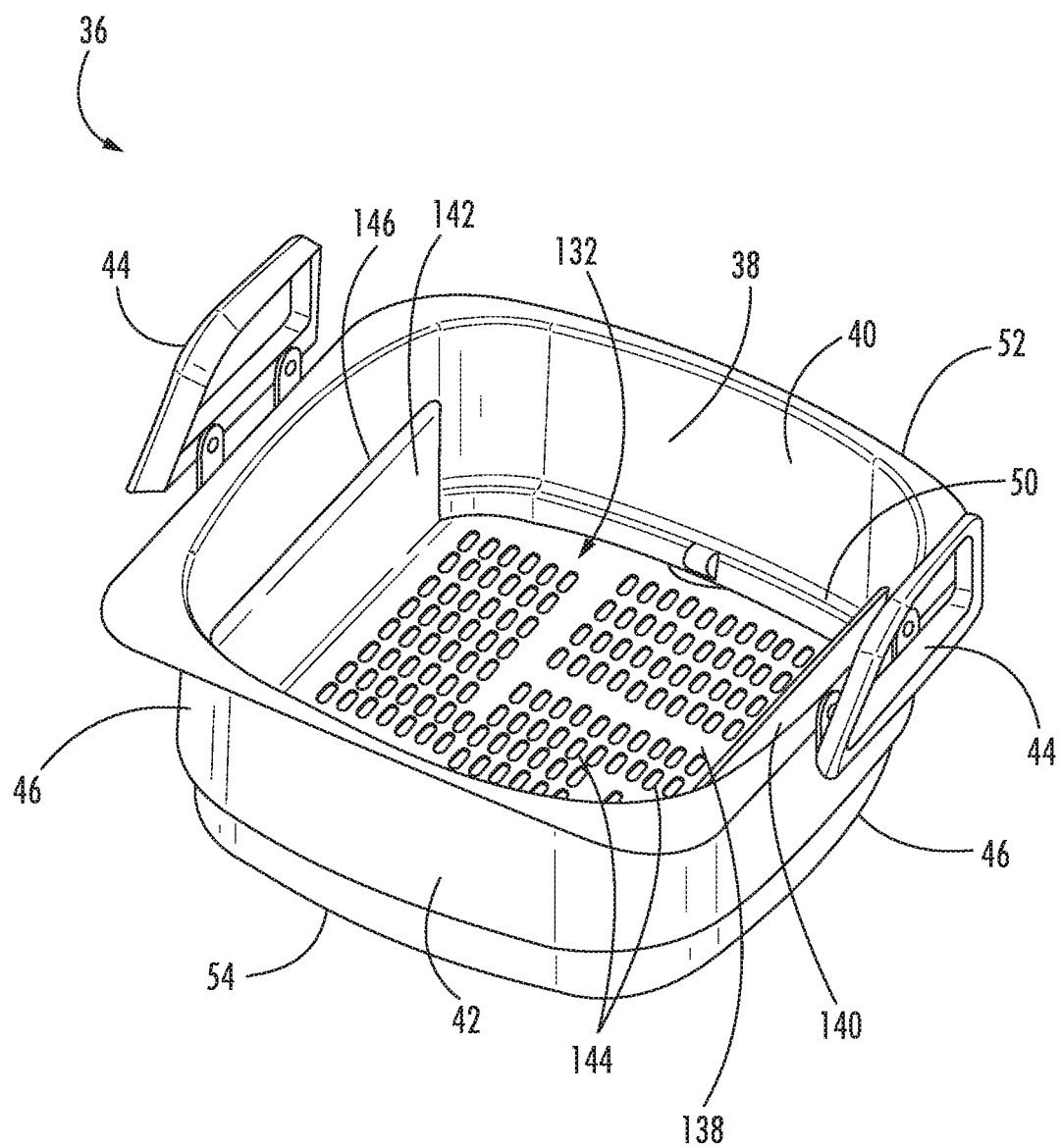
FIG. 5 is a perspective view of a cooking container having an accessory located therein according to an embodiment.
Figure 14:
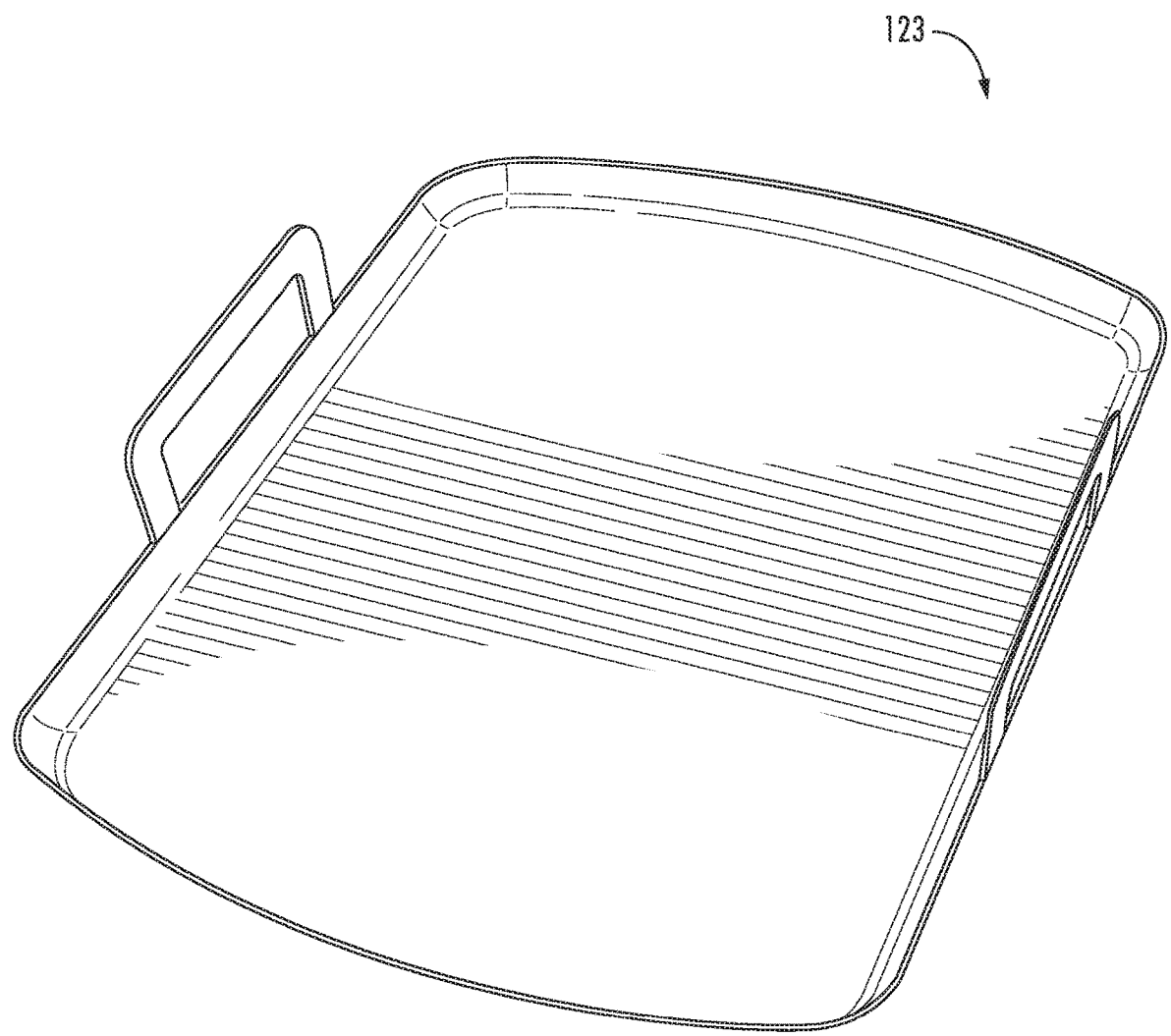
FIG. 14 is a perspective view of another accessory receivable within a cooking container of the cooking system according to an embodiment.
Figure 15:
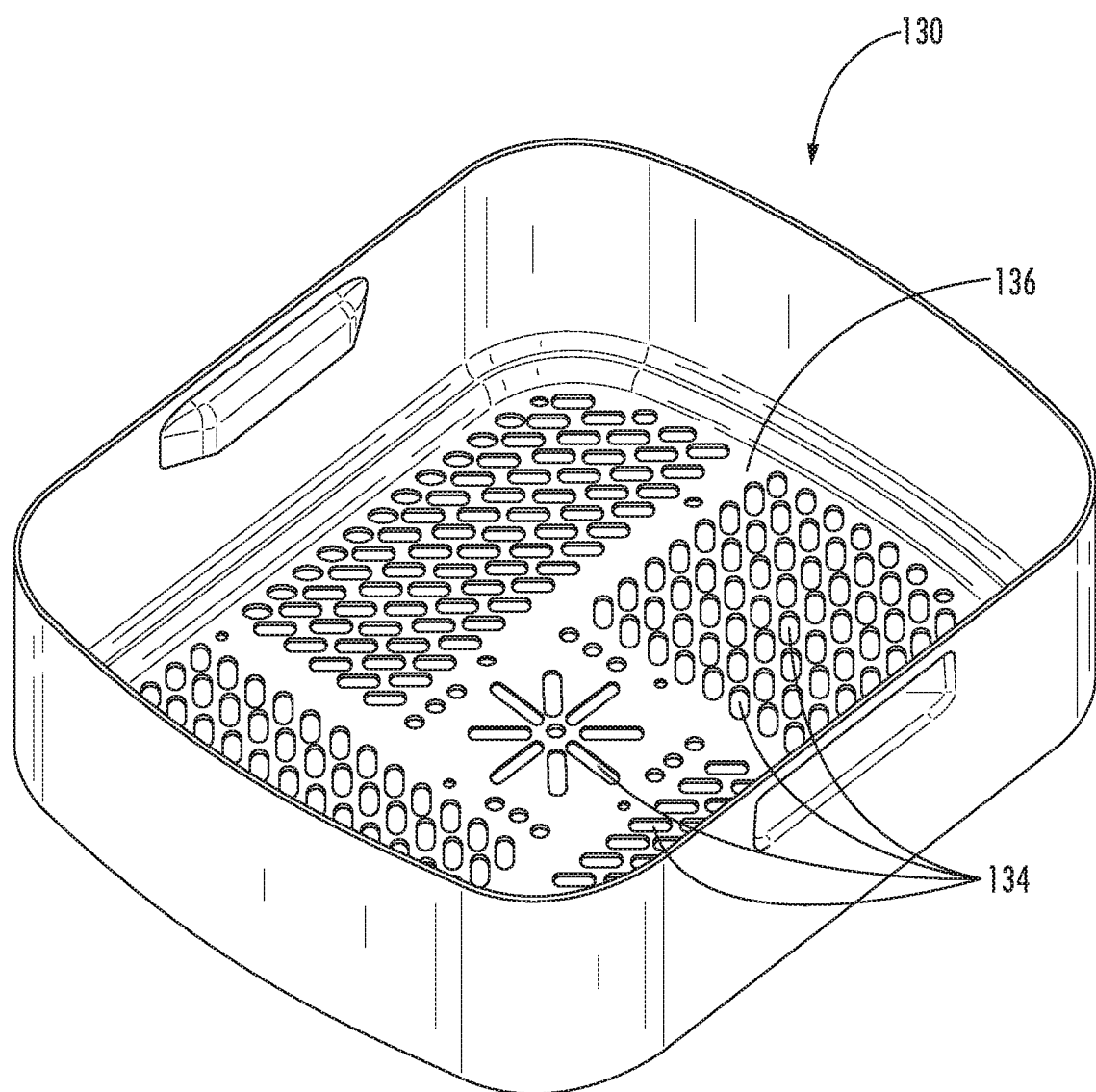
FIG. 15 is a perspective view of another support body receivable within a cooking container of the cooking system according to an embodiment.

Further, the first cooking mode may additionally be used to perform cooking operations other than "grilling." As previously described, an accessory may be mounted in overlapping arrangement with the upper surface 114 of the grill plate 100 such that heat is transferred from the grill plate 100 to the accessory. Alternatively, the accessory may be mounted within the interior 38 of the cooking container 36 absent the grill plate 100, such that the accessory functions as a support body as described herein. Examples of such accessories include a griddle 123 as shown in FIG. 14, a crisping basket 130 shown in FIG. 15, and crisping plate 132 (FIGS. 3 & 5).

In an embodiment, the cooking system 20 is additionally operable in a second cooking mode where the heating element 82 is employed to perform a non-contact heating operation, such as a convective or radiative heating operation. Accordingly, in embodiments where the cooking system 20 additionally includes heating element 122, in the second cooking mode, heating element 122 is not operable. Suitable cooking operations in the second cooking mode may include, but are not limited to air frying, broiling, baking/roasting, and dehydrating. In the second cooking mode, the grill plate 100 is typically not positioned within the interior 38 of the cooking container 36. However, embodiments where the grill plate 100 is disposed within the interior 38 of the cooking container 36 in the second mode are also contemplated herein.

In the second cooking mode, in embodiments absent the grill plate 100, any suitable accessory may be mounted within the cooking container 36 to define the support surface of the cooking zone Z. For example, the crisping basket 130 is positionable within the interior 38 of the cooking container 36, and may be supported by the step 50, or alternatively, by the bottom 54 of the cooking container 36. One or more dimensions of the crisping basket 130 are smaller than the interior 38 of the cooking container 36 such that an annulus is defined between a sidewall of the crisping basket 130 and an interior surface 40 of the cooking container 36. A plurality of openings 134 formed in a bottom 136 of the crisping basket 130 allow a flow of air to circulate there through.

The crisping plate 132 (FIGS. 3 and 5) may have a configuration similar to the crisping basket 130. As shown, the crisping plate 132 includes a base 138 having a first side 140 and a second side 142 extending from the base 138, and a plurality of openings 144 formed in the base 138. An annulus 146 may similarly be formed between the first and second sides 140, 142 of the crisping plate 132 and an interior surface 40 of the cooking container 36.

In the embodiment of FIG. 3, a diffuser 148 having one or more vanes 150 is positioned adjacent or integrated with the crisping plate 132. As shown, the vanes 150 extend generally perpendicular from the bottom of the base 138. In instances including a plurality of vanes 150, the vanes 150 may have similar or different configurations. Further, the plurality of vanes 150 may be spaced about the base 138 of the crisping plate 132 and may have similar or have varying orientations. In the illustrated, non-limiting embodiment, the crisping plate 132 includes four vanes 150, and adjacent vanes 150 are spaced equidistantly about a center of the base 138 and are rotated ninety degrees relative to one another. However, it should be understood that in other embodiments, the crisping plate 132 need not have a diffuser 148 associated therewith.

During operation in the second cooking mode, the air movement device 84 may be operable to circulate a heated air flow through the cooking volume. As previously described, the air movement device 84 is operable to draw air upwards, through the adjacent heating element 82 and expel the hot air outwardly, where it is redirected downwardly toward the cooking volume. The hot air flows to the bottom 54 of the cooking container 36, such as through an annulus formed between an accessory, such as the crisping plate 132 or the crisping basket 130 and the cooking container 36. The hot air is deflected off the bottom 54 of the cooking container 36, and drawn by the air movement device 84 through the openings formed in the accessory. In some embodiments where the accessory includes a lower diffuser, such as the crisping plate 132 for example, the hot air may flow over the vanes of the diffuser, and a rotational motion may be imparted to the hot air, thereby creating a vortex as the air passes through the openings of the accessory. After flowing over an exterior of the food items within the cooking container 36, the air is drawn back through the heating element 82 and into the air movement device 84 for further circulation.

In an embodiment, the air movement device 84 of the cooking system 20 is a variable speed fan operable at a plurality of rotational speeds. In an embodiment, the operational speed of the air movement device 84 may vary based on the cooking mode selected. For example, the speed of the air movement device 84 during operation in a first cooking mode may be different than the speed of the air movement device 84 during operation in a second air-fry mode. The operational speed of the air movement device 84 may be controlled by the processor 98 in response to one or more inputs 92, including selection of a cooking mode. However, the processor 98 may also be configured to adjust the operational speed of the air movement device 84, or alternatively, the power supplied to the one or more heating elements 82, 122, to control the temperature and/or pressure within the interior 38 of the cooking container 36.

In some embodiments, the cooking system 20 is operable in more than two cooking modes. For example, in embodiment where the cooking system 20 includes a heating element 122 operably coupled to the grill plate 100 and separate from heating element 82, the cooking system 20 may be operable in a third cooking mode. In the third cooking mode, the heating element 122 is operational and the heating element 82 is generally de-energized. In the third cooking mode, the heating element 122 is operable to perform a contact heating operation, such as slow cooking, searing, and sautéing for example. In such embodiments, the heating element 122 may be operable to a heat the cooking container 36 absent the grill plate 100, and alternatively or in addition, heat one or more accessories positioned in overlapping arrangement with the grill plate 100.

The cooking system 20 illustrated and described herein provides an enhanced user experience by combining the functionality of several conventional household products into a single user-friendly device.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system comprising:
   a housing having a hollow interior including a bottom surface, the hollow interior defining a container cavity for receiving food to be cooked;
   a fan coupled to the housing above the hollow interior, wherein the fan is configured to generate an air flow through the hollow interior;
   a support body removably mounted within the hollow interior to support the food, the hollow interior including a clearance area between a bottom of the support body and the bottom surface of the hollow interior, wherein the support body has a support surface including a diffusing structure configured to diffuse the air flow generated by the fan; and
   a heating element embedded within the support body.

2. The cooking system of claim 1, further including another heating element disposed above said support body.

3. The cooking system of claim 2, further including a lid associated with said housing, said another heating element being disposed in said lid.

4. The cooking system of claim 3, wherein said support body has a thermal mass sufficient to maintain a temperature required to achieve a Maillard reaction of said food.

5. The cooking system of claim 4, wherein said Maillard reaction is achievable via one or both of said heating element and said another heating element.

6. The cooking system of claim 2, wherein said another element is operable to heat said support body via radiation.

7. The cooking system of claim 2, wherein the fan is disposed with the another heating element, and wherein the another heating element is operable to heat the support body via convection.

8. The cooking system of claim 2, wherein said heating element and said another heating element are operable jointly or independently to heat said support body.

9. The cooking system of claim 1, wherein said support body includes a grilling surface.

10. The cooking system of claim 9, wherein said grilling surface includes a plurality of grilling ribs.

11. The cooking system of claim 1, wherein said support body has a mass between about 200 g and about 3 kg.

12. The cooking system of claim 1, wherein the cooking system is operable in a plurality of modes including a first cooking mode and a second cooking mode, wherein the first cooking mode is different from the second cooking mode.

13. The cooking system of claim 1, wherein said support body includes a plurality of openings.

* * * * *